United States Patent
Papo et al.

(10) Patent No.: US 12,516,130 B2
(45) Date of Patent: Jan. 6, 2026

(54) SINGLE-DOMAIN ANTIBODY FOR TARGETING PROSTATE SPECIFIC MEMBRANE ANTIGEN (PSMA)

(71) Applicant: NATIONAL INSTITUTE FOR BIOTECHNOLOGY IN THE NEGEV LTD., Beer-Sheva (IL)

(72) Inventors: Niv Papo, Raanana (IL); Lior Rozenfeld, Beer Sheva (IL)

(73) Assignee: NATIONAL INSTITUTE OF BIOTECHNOLOGY IN THE NEGEV LTD., Beer-Sheva (IL)

( * ) Notice: Subject to any disclaimer, the term of this patent is extended or adjusted under 35 U.S.C. 154(b) by 985 days.

(21) Appl. No.: 17/639,103

(22) PCT Filed: Aug. 30, 2020

(86) PCT No.: PCT/IL2020/050940
§ 371 (c)(1),
(2) Date: Feb. 28, 2022

(87) PCT Pub. No.: WO2021/038571
PCT Pub. Date: Mar. 4, 2021

(65) Prior Publication Data
US 2022/0306764 A1 Sep. 29, 2022

Related U.S. Application Data

(60) Provisional application No. 62/893,264, filed on Aug. 29, 2019.

(51) Int. Cl.
*C07K 16/30* (2006.01)
*A61P 35/00* (2006.01)

(52) U.S. Cl.
CPC .......... *C07K 16/3069* (2013.01); *A61P 35/00* (2018.01); *C07K 2317/22* (2013.01); *C07K 2317/569* (2013.01); *C07K 2317/76* (2013.01); *C07K 2317/77* (2013.01); *C07K 2317/92* (2013.01)

(58) Field of Classification Search
CPC .......... C07K 16/3069; C07K 2317/22; C07K 2317/569; C07K 2317/76; C07K 2317/77; C07K 2317/92; C07K 2317/34; C07K 2317/567; A61P 35/00; A61P 25/00; A61K 2039/505; A61K 47/64
See application file for complete search history.

(56) References Cited

FOREIGN PATENT DOCUMENTS

| CN | 109862784 A | 6/2019 |
| WO | WO-2009080764 A2 * | 7/2009 .......... C07K 16/283 |
| WO | 2018039180 A1 | 3/2018 |

OTHER PUBLICATIONS

Rudikoff et al Proc Natl Acad Sci USA 1982 vol 79 p. 1979-1983 (Year: 1982).*
"Theranostic" definition from Law Insider Dictionary, Jun. 9, 2025 (Year: 2025).*
"Theranostics", Wikipedia.com, Jun. 9, 2025 (Year: 2025).*
Noël et. al. "Global analysis of VHHs framework regions with a structural alphabet." Biochimie 131 (2016): 11-19 (Year: 2016).*
Stockgard, R., 2018. Generation of affinity maturation libraries of PSMA targeting affibody molecules and selections to find improved binders (Year: 2018).*
Aggarwal, S., et al., 2006. A dimeric peptide that binds selectively to prostate-specific membrane antigen and inhibits its enzymatic activity. Cancer research, 66(18), pp. 9171-9177 (Year: 2006).*
Chatalic KL, Veldhoven-Zweistra J, Bolkestein M, Hoeben S, Koning GA, Boerman OC, de Jong M, van Weerden WM. A Novel $^{111}$In-Labeled Anti-Prostate-Specific Membrane Antigen Nanobody for Targeted SPECT/CT Imaging of Prostate Cancer. J Nucl Med. Jul. 2015; 56(7):1094-9. doi: 10.2967/jnumed.115.156729. Epub May 14, 2015. PMID: 25977460.
Evazalipour M, D'Huyvetter M, Tehrani BS, Abolhassani M, Omidfar K, Abdoli S, Arezumand R, Morovvati H, Lahoutte T, Muyldermans S, Devoogdt N. Generation and characterization of nanobodies targeting PSMA for molecular imaging of prostate cancer. Contrast Media Mol Imaging. May-Jun. 2014;9(3):211-20. doi: 10.1002/cmmi.1558. PMID: 24700748.
Zare H, Rajabibazl M, Rasooli I, Ebrahimizadeh W, Bakherad H, Ardakani LS, Gargari SL. Production of nanobodies against prostate-specific membrane antigen (PSMA) recognizing LnCaP cells. Int J Biol Markers. Jun. 25, 2014;29(2):e169-79. doi: 10.5301/jbm.5000063. PMID: 24425321.
Thompson I, Leach RJ, Pollock BH, Naylor SL. Prostate cancer and prostate-specific antigen: the more we know, the less we understand. J Natl Cancer Inst. Jul. 16, 2003;95(14): 1027-8. doi: 10.1093/jnci/95.14.1027. PMID: 12865440.
Yao V, Bacich DJ. Prostate specific membrane antigen (PSMA) expression gives prostate cancer cells a growth advantage in a physiologically relevant folate environment in vitro. Prostate. Jun. 1, 2006;66(8):867-75. doi: 10.1002/pros.20361. PMID: 16496414.

(Continued)

*Primary Examiner* — Anand U Desai
*Assistant Examiner* — Kathleen Cunningchen
(74) *Attorney, Agent, or Firm* — The Roy Gross Law Firm, LLC; Roy D. Gross

(57) ABSTRACT

The present invention, in some embodiments thereof, is directed to an antigen-binding polypeptide having increased binding affinity to prostate specific membrane antigen (PSMA). In some embodiments, the present invention is further directed to the use of the antigen-binding polypeptide in the diagnosis and treatment of diseases associated with elevated expression of PSMA, such as prostate cancer.

6 Claims, 17 Drawing Sheets

Specification includes a Sequence Listing.

(56) References Cited

OTHER PUBLICATIONS

Yao V, Berkman CE, Choi JK, O'Keefe DS, Bacich DJ. Expression of prostate-specific membrane antigen (PSMA), increases cell folate uptake and proliferation and suggests a novel role for PSMA in the uptake of the non-polyglutamated folate, folic acid. Prostate. Feb. 15, 2010;70(3):305-16. doi: 10.1002/pros.21065. PMID: 19830782.
Muyldermans S, Baral TN, Retamozzo VC, De Baetselier P, De Genst E, Kinne J, Leonhardt H, Magez S, Nguyen VK, Revets H, Rothbauer U, Stijlemans B, Tillib S, Wernery U, Wyns L, Hassanzadeh-Ghassabeh G, Saerens D. Camelid immunoglobulins and nanobody technology. Vet Immunol Immunopathol. Mar. 15, 2009;128(1-3):178-83. doi: 10.1016/j.vetimm.2008.10.299. Epub Oct. 17, 2008. PMID: 19026455.
Massa S, Xavier C, De Vos J, Caveliers V, Lahoutte T, Muyldermans S, Devoogdt N. Site-specific labeling of cysteine-tagged camelid single-domain antibody-fragments for use in molecular imaging. Bioconjug Chem. May 21, 2014;25 (5):979-88. doi: 10.1021/bc500111t. Epub May 9, 2014. PMID: 24815083.
Vaneycken I, D'huyvetter M, Hernot S, De Vos J, Xavier C, Devoogdt N, Caveliers V, Lahoutte T. Immuno-imaging using nanobodies. Curr Opin Biotechnol. Dec. 2011;22(6):877-81. doi: 10.1016/j.copbio.2011.06.009. Epub Jul. 2, 2011. PMID: 21726996.
Rosenfeld L, Sananes A, Zur Y, Cohen S, Dhara K, Gelkop S, Ben Zeev E, Shahar A, Lobel L, Akabayov B, Arbely E, Papo N. Nanobodies Targeting Prostate-Specific Membrane Antigen for the Imaging and Therapy of Prostate Cancer. J Med Chem. Jul. 23, 2020;63(14):7601-7615. doi: 10.1021/acs.jmedchem.0c00418. Epub Jun. 8, 2020. PMID: 32442375; PMCID: PMC7383930.
Von Eyben FE, Baumann GS, Baum RP. PSMA diagnostics and treatments of prostate cancer become mature. Clin Transl Imaging. 2018;6(2):145-148. doi: 10.1007/s40336-018-0270-2. Epub Mar. 7, 2018. PMID: 29670866; PMCID: PMC5886992.
Perner S, Hofer MD, Kim R, Shah RB, Li H, Moller P, Hautmann RE, Gschwend JE, Kuefer R, Rubin MA. Prostate-specific membrane antigen expression as a predictor of prostate cancer progression. Hum Pathol. May 2007;38(5):696-701. doi: 10.1016/j.humpath.2006.11.012. Epub Feb. 22, 2007. PMID: 17320151.
Cimadamore A, Cheng M, Santoni M, Lopez-Beltran A, Battelli N, Massari F, Galosi AB, Scarpelli M, Montironi R. New Prostate Cancer Targets for Diagnosis, Imaging, and Therapy: Focus on Prostate-Specific Membrane Antigen. Front Oncol. Dec. 21, 2018;8:653. doi: 10.3389/fonc.2018.00653. PMID: 30622933; PMCID: PMC6308151.
Benešová M, Schafer M, Bauder-Wust U, Afshar-Oromieh A, Kratochwil C, Mier W, Haberkorn U, Kopka K, Eder M. Preclinical Evaluation of a Tailor-Made DOTA-Conjugated PSMA Inhibitor with Optimized Linker Moiety for Imaging and Endoradiotherapy of Prostate Cancer. J Nucl Med. Jun. 2015;56(6):914-20. doi: 10.2967/jnumed.114.147413. Epub Apr. 16, 2015. PMID: 25883127.
Rowe SP, Macura KJ, Mena E, Blackford AL, Nadal R, Antonarakis ES, Eisenberger M, Carducci M, Fan H, Dannals RF, Chen Y, Mease RC, Szabo Z, Pomper MG, Cho SY. PSMA-Based [(18)F]DCFPyL PET/CT Is Superior to Conventional Imaging for Lesion Detection in Patients with Metastatic Prostate Cancer. Mol Imaging Biol. Jun. 2016;18(3):411-9. doi: 10.1007/s11307-016-0957-6. PMID: 27080322; PMCID: PMC5261857.

Chatalic KL, Heskamp S, Konijnenberg M, Molkenboer-Kuenen JD, Franssen GM, Clahsen-van Groningen MC, Schottelius M, Wester HJ, van Weerden WM, Boerman OC, de Jong M. Towards Personalized Treatment of Prostate Cancer: PSMA I&T, a Promising Prostate-Specific Membrane Antigen-Targeted Theranostic Agent. Theranostics. Apr. 12, 2016;6(6):849-61. doi: 10.7150/thno.14744. PMID: 27162555; PMCID: PMC4860893.
Duan X, Liu F, Kwon H, Byun Y, Minn I, Cai X, Zhang J, Pomper MG, Yang Z, Xi Z, Yang X. (S)-3-(Carboxyformamido)-2-(3-(carboxymethyl)ureido)propanoic Acid as a Novel PSMA Targeting Scaffold for Prostate Cancer Imaging. J Med Chem. Apr. 9, 2020;63(7):3563-3576. doi: 10.1021/acs.jmedchem.9b02031. Epub Mar. 30, 2020. PMID: 32207938.
Liu H, Moy P, Kim S, Xia Y, Rajasekaran A, Navarro V, Knudsen B, Bander NH. Monoclonal antibodies to the extracellular domain of prostate-specific membrane antigen also react with tumor vascular endothelium. Cancer Res. Sep. 1, 1997;57(17):3629-34. PMID: 9288760.
Chang SS, Reuter VE, Heston WD, Bander NH, Grauer LS, Gaudin PB. Five different anti-prostate-specific membrane antigen (PSMA) antibodies confirm PSMA expression in tumor-associated neovasculature. Cancer Res. Jul. 1, 1999;59(13):3192-8. PMID: 10397265.
Smith-Jones PM, Vallabahajosula S, Goldsmith SJ, Navarro V, Hunter CJ, Bastidas D, Bander NH. In vitro characterization of radiolabeled monoclonal antibodies specific for the extracellular domain of prostate-specific membrane antigen. Cancer Res. Sep. 15, 2000;60(18):5237-43. PMID: 11016653.
Ganguly T, Dannoon S, Hopkins MR, Murphy S, Cahaya H, Blecha JE, Jivan S, Drake CR, Barinka C, Jones EF, VanBrocklin HF, Berkman CE. A high-affinity [(18)F]-labeled phosphoramidate peptidomimetic PSMA-targeted inhibitor for PET imaging of prostate cancer. Nucl Med Biol. Oct. 2015;42(10):780-7. doi: 10.1016/j.nucmedbio.2015.06.003. Epub Jun. 9, 2015. PMID: 26169882; PMCID: PMC4624265.
Han D, Wu J, Han Y, Wei M, Han S, Lin R, Sun Z, Yang F, Jiao D, Xie P, Zhang L, Yang AG, Zhao A, Wen W, Qin W. A novel anti-PSMA human scFv has the potential to be used as a diagnostic tool in prostate cancer. Oncotarget. Sep. 13, 2016;7(37):59471-59481. doi: 10.18632/oncotarget.10697. PMID: 27448970; PMCID: PMC5312325.
Tagawa ST, Milowsky MI, Morris M, Vallabhajosula S, Christos P, Akhtar NH, Osborne J, Goldsmith SJ, Larson S, Taskar NP, Scher HI, Bander NH, Nanus DM. Phase II study of Lutetium-177-labeled anti-prostate-specific membrane antigen monoclonal antibody J591 for metastatic castration-resistant prostate cancer. Clin Cancer Res. Sep. 15, 2013;19(18):5182-91. doi: 10.1158/1078-0432.CCR-13-0231. Epub May 28, 2013. PMID: 23714732; PMCID: PMC3778101.
UniProt accession No. Q04609•FOLH1_Human https://www.uniprot.org/uniprotkb/Q04609/entry. accessed Jan. 24, 2023.
Evans JC, Malhotra M, Cryan JF, O'Driscoll CM. The therapeutic and diagnostic potential of the prostate specific membrane antigen/glutamate carboxypeptidase II (PSMA/GCPII) in cancer and neurological disease. Br J Pharmacol. Nov. 2016;173(21):3041-3079. doi: 10.1111/bph.13576. Epub Sep. 23, 2016. PMID: 27526115; PMCID: PMC5056232.
PCT International Search Report for International Application No. PCT/IL2020/050940, mailed Dec. 7, 2020, 6pp.
PCT Written Opinion for International Application No. PCT/IL2020/050940, mailed Dec. 7, 2020, 8pp.

* cited by examiner

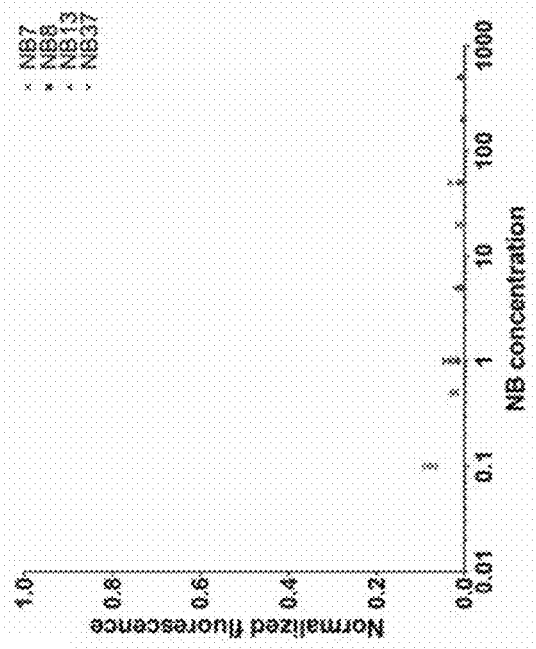
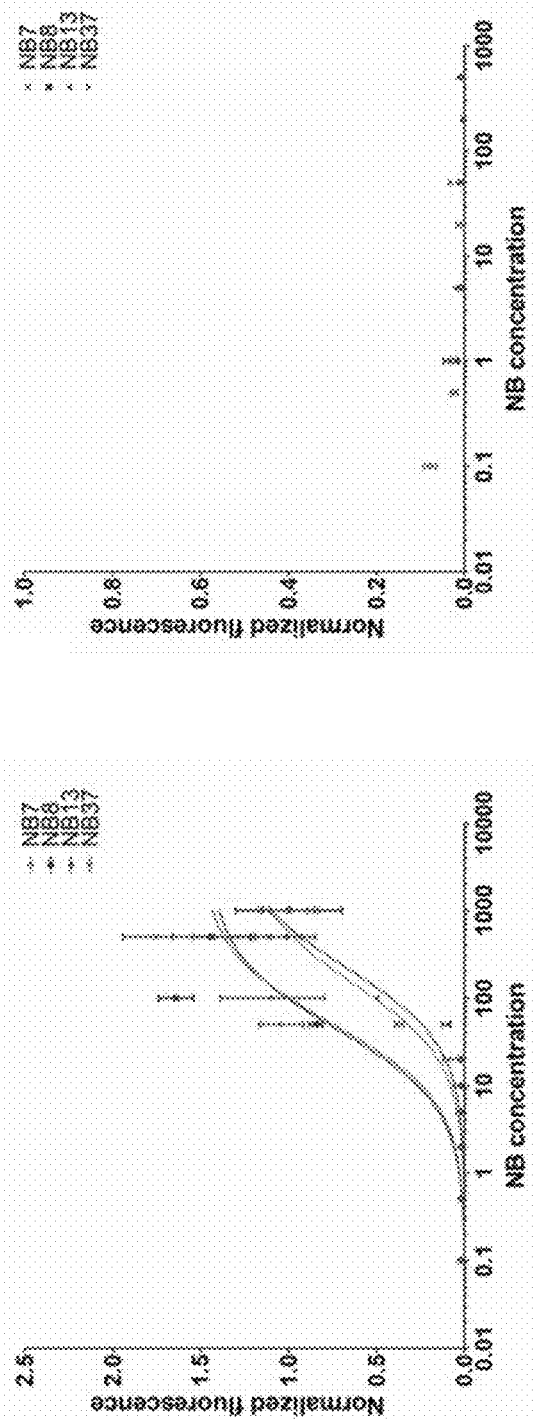
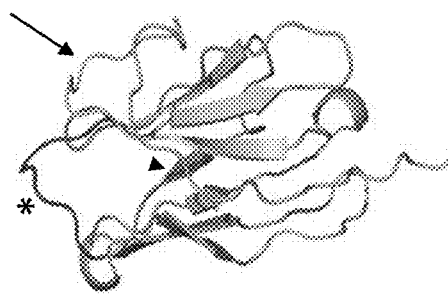
FIGURE 2C
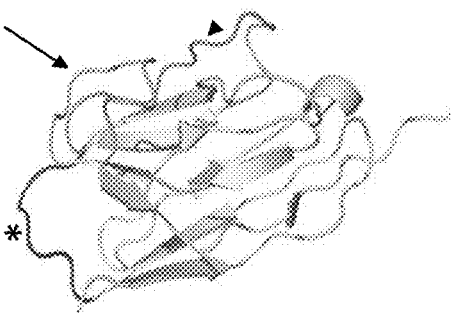
FIGURE 2B
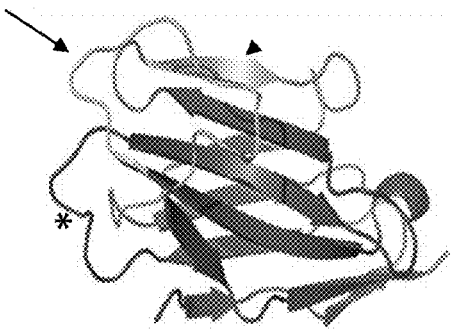
FIGURE 2A

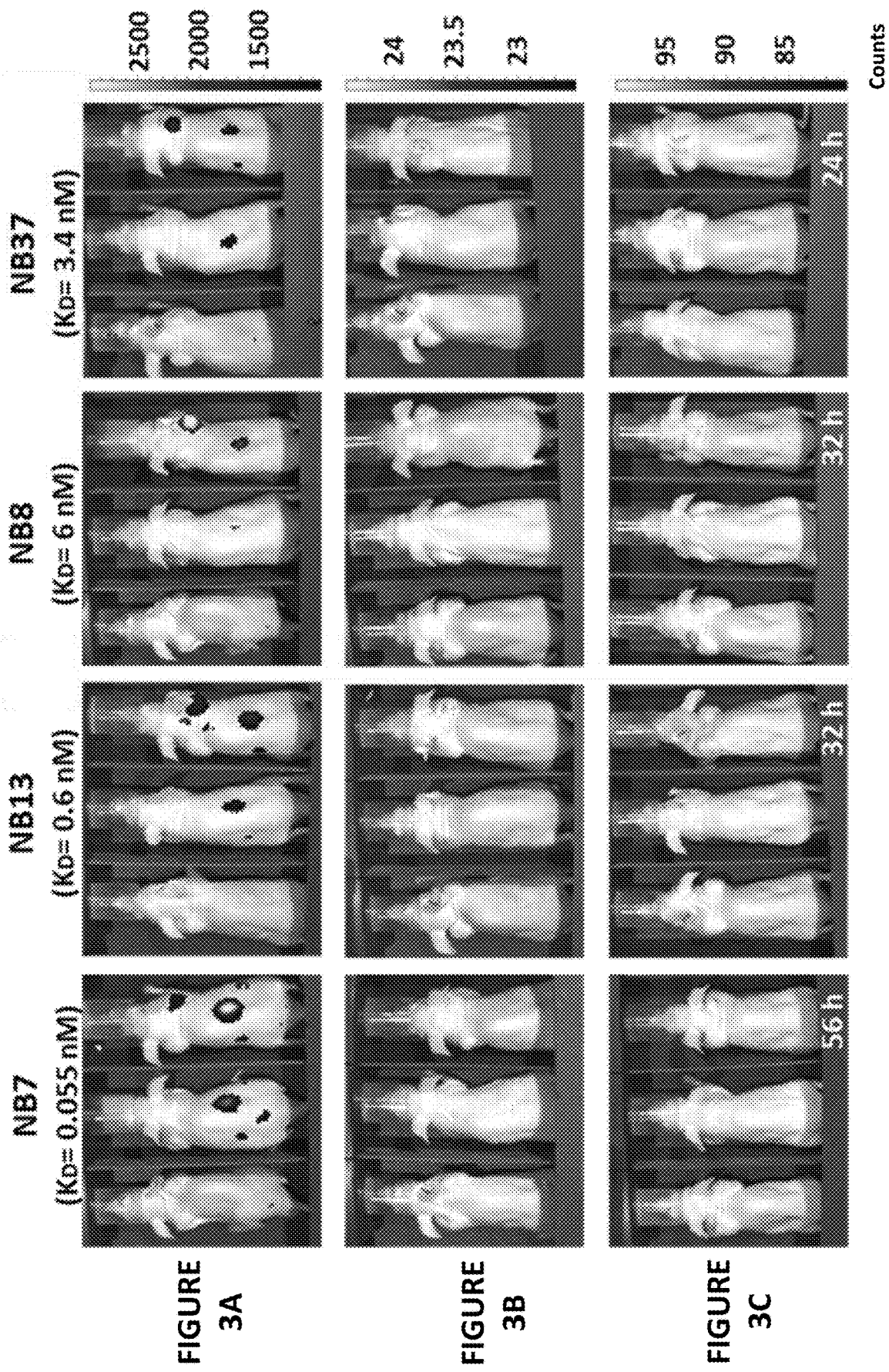

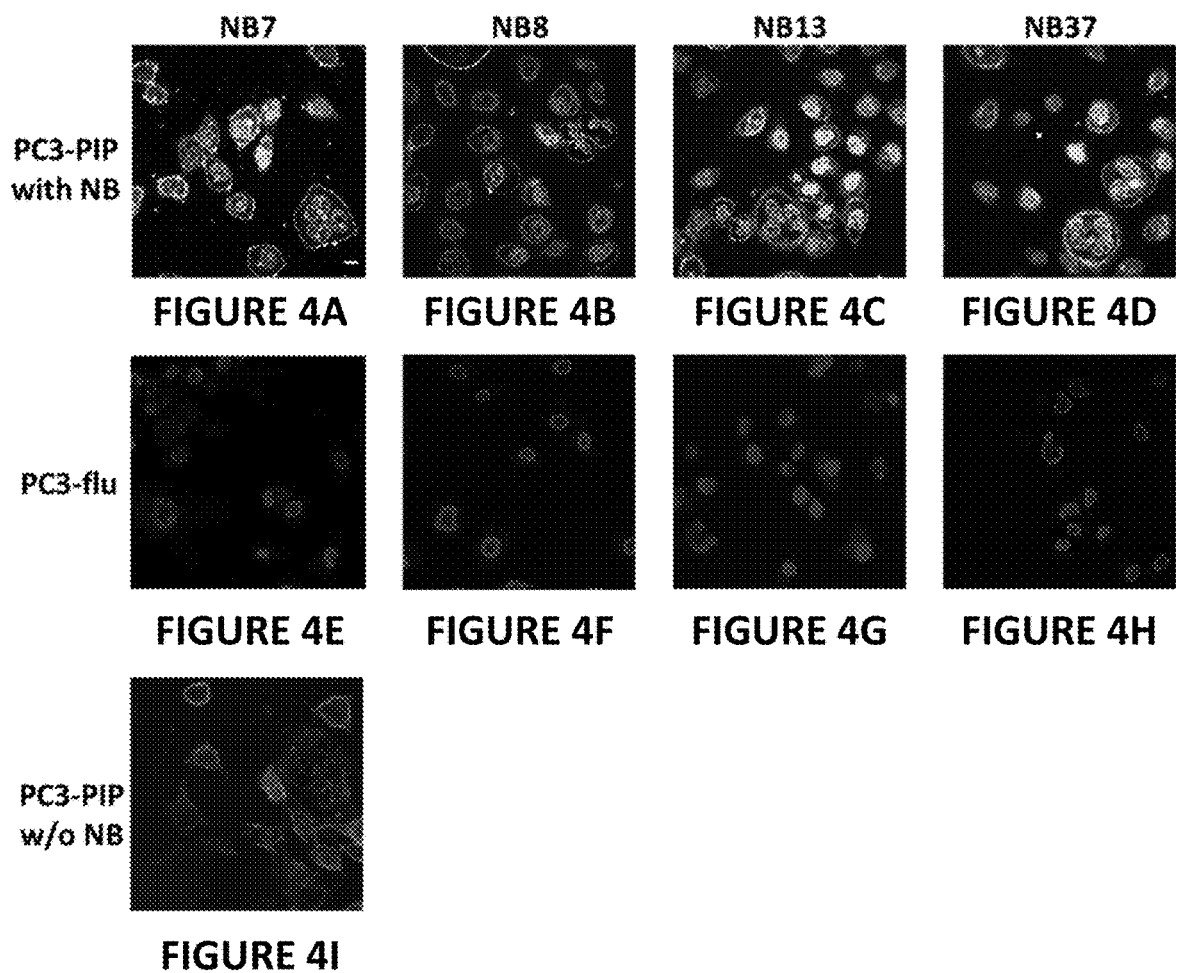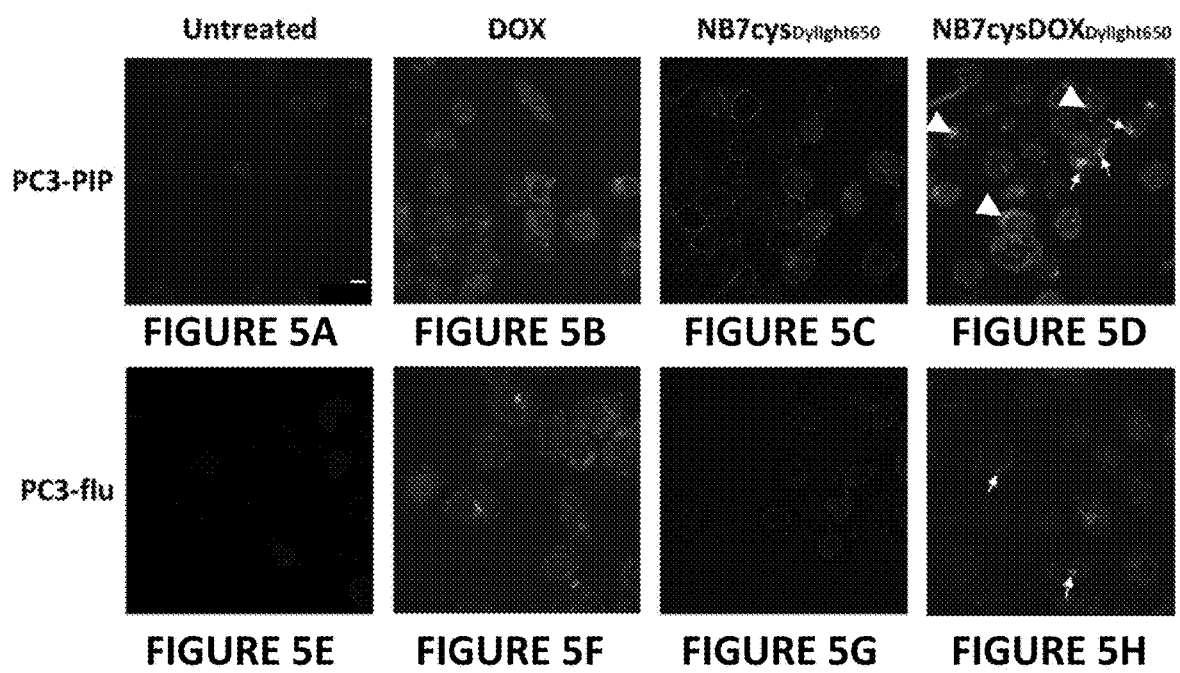

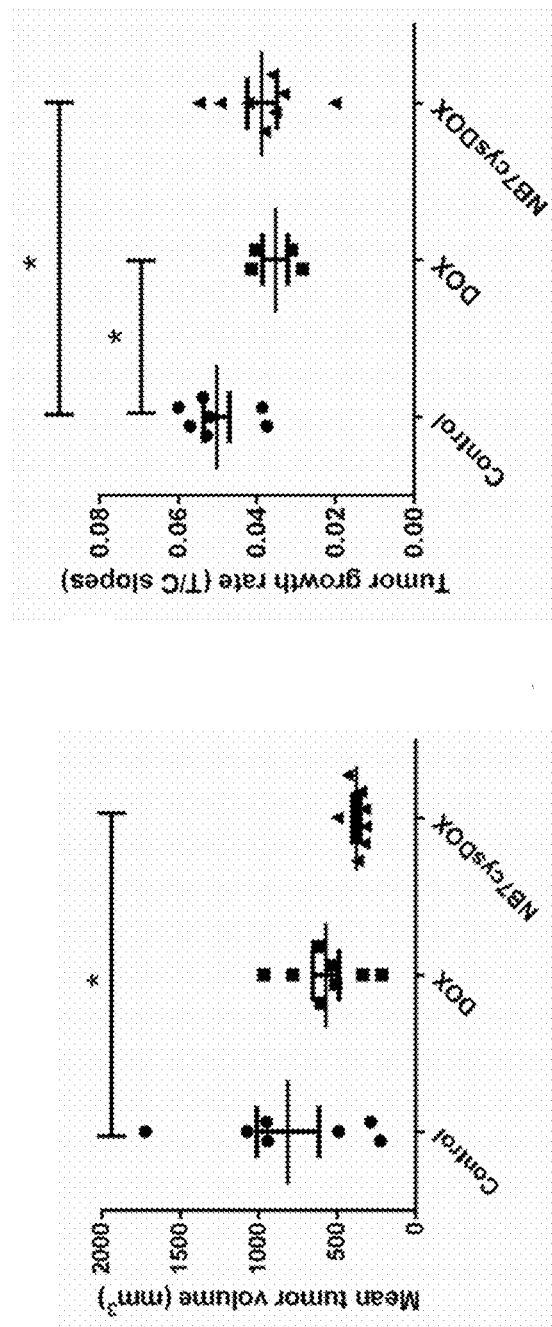
FIGURE 6A
FIGURE 6B
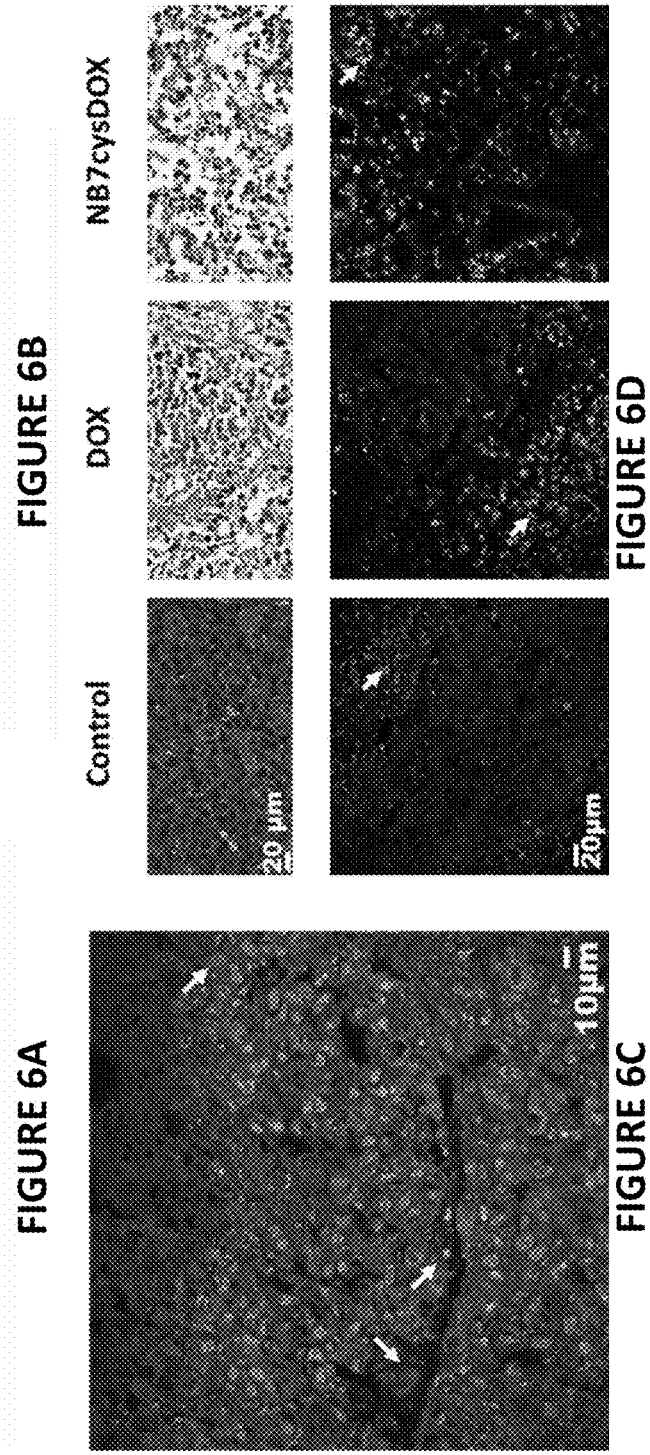
FIGURE 6C
FIGURE 6D

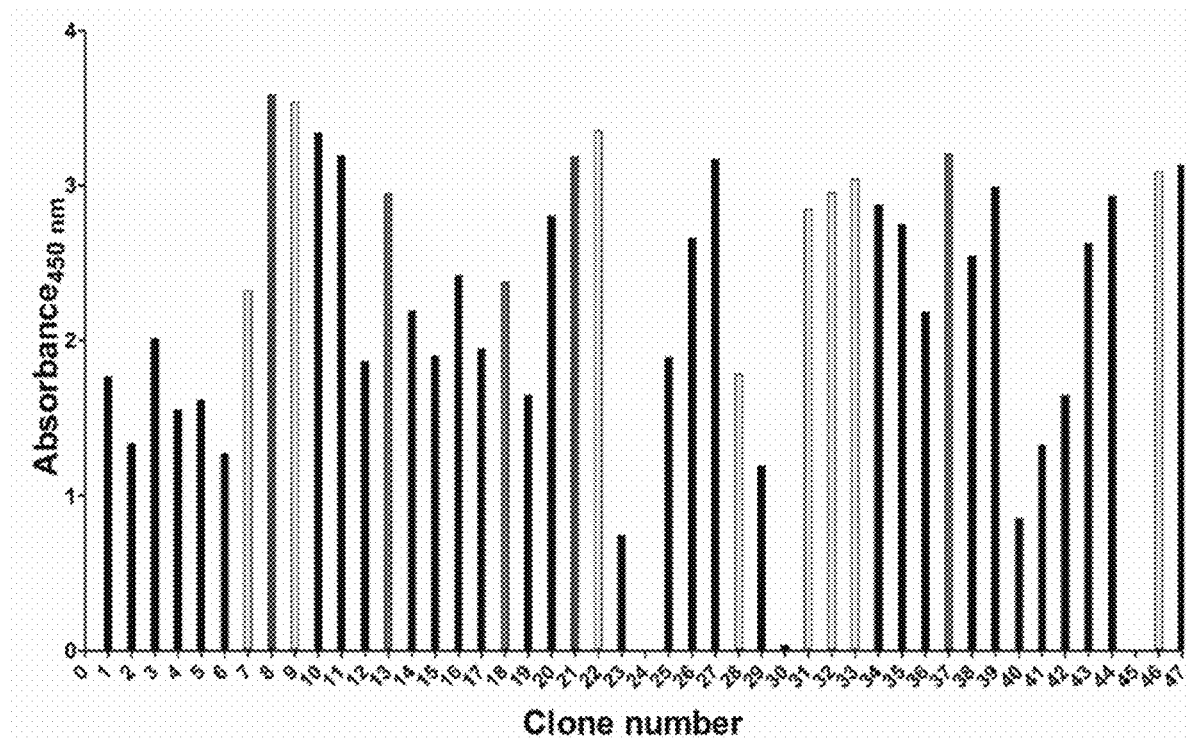
FIGURE 7A
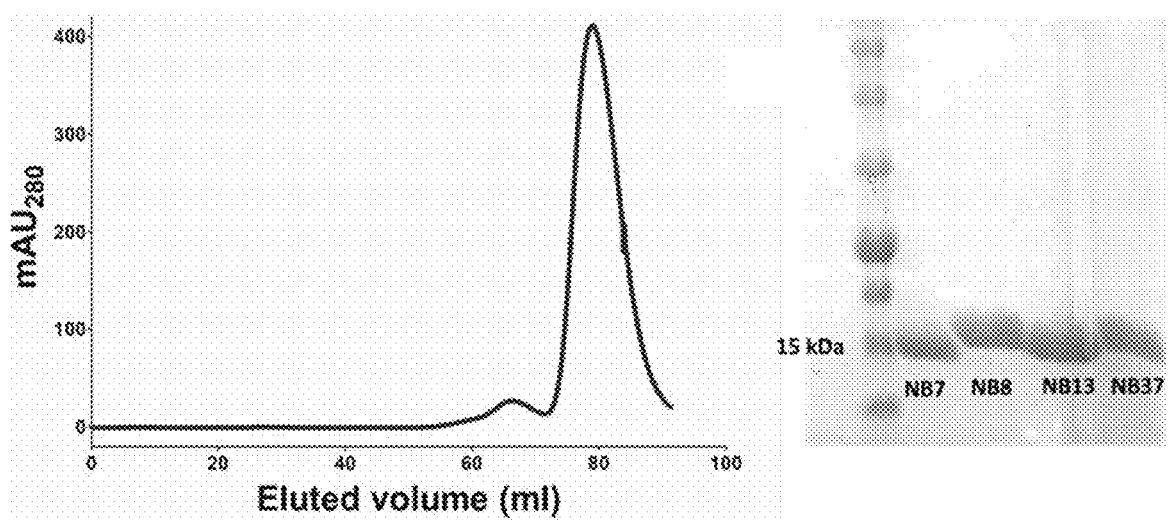
FIGURE 7B          FIGURE 7C

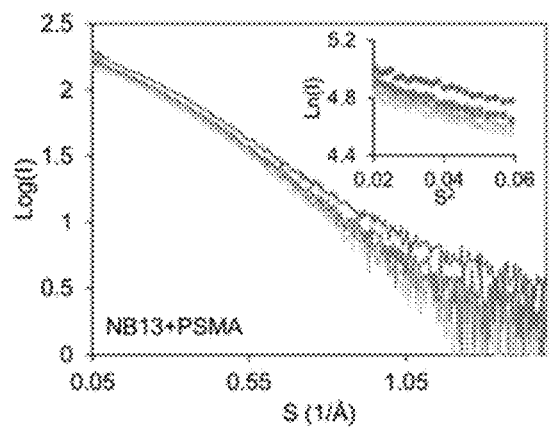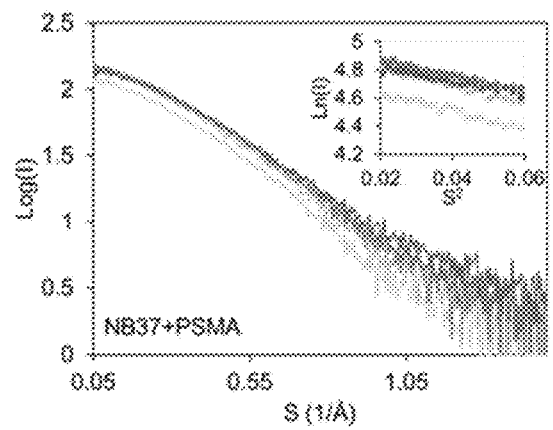
FIGURE 10C                     FIGURE 10D
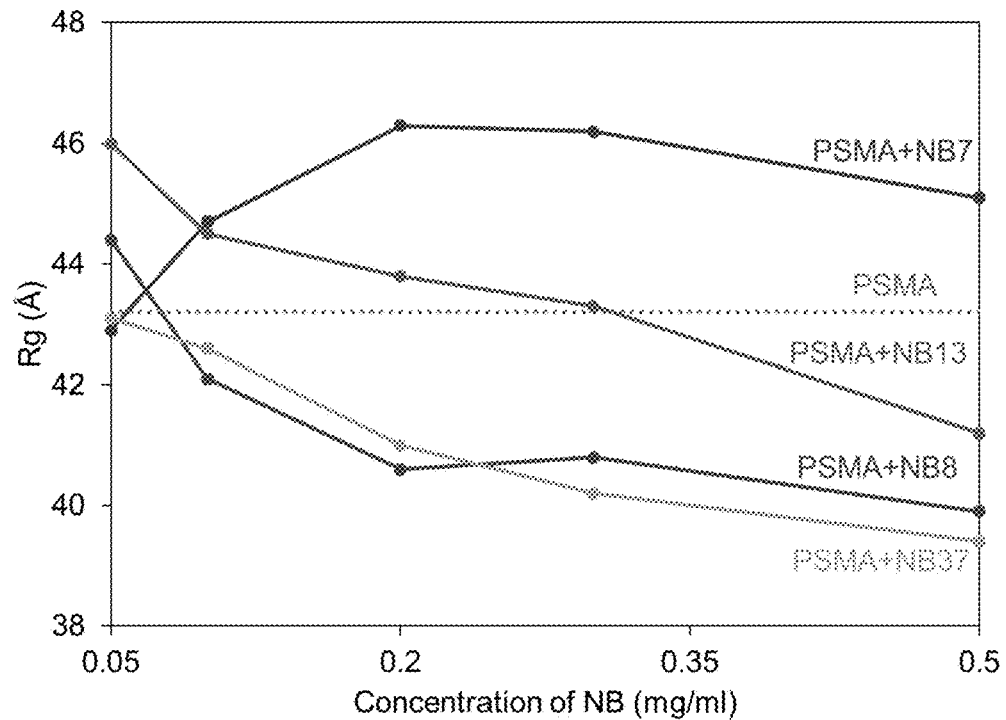
FIGURE 11
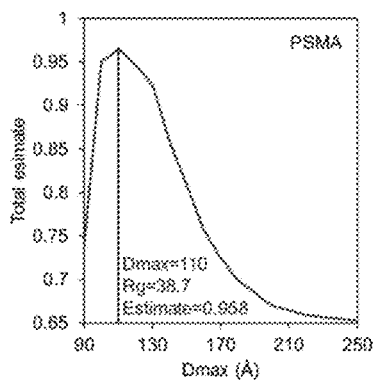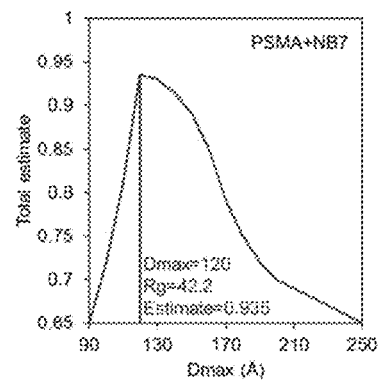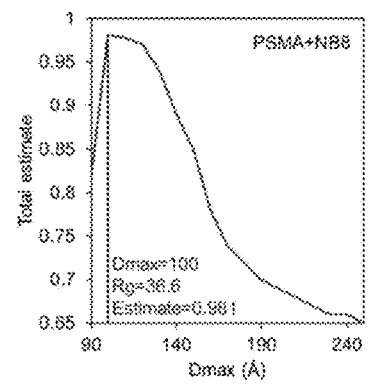
FIGURE 12A                FIGURE 12B                FIGURE 12C

| PSMA Residue | NB7 Residue | PSMA Chain Interacting with NB7 | CDR | Interaction Type |
|---|---|---|---|---|
| ASP683 | ARG45 | B | | Hydrogen Bond;Electrostatic |
| LYS215 | GLU89 | A | | Electrostatic |
| LYS718 | ASP62 | A | 2 | Electrostatic |
| LYS223 | ASP29 | B | 1 | Electrostatic |
| ARG281 | GLU113 | B | 3 | Electrostatic |
| GLU285 | LYS109 | B | 3 | Electrostatic |
| LYS215 | GLU89 | A | | Conventional Hydrogen Bond |
| ASN262 | GLU89 | A | | Conventional Hydrogen Bond |
| ARG281 | PRO41 | A | | Conventional Hydrogen Bond |
| ARG281 | PRO41 | A | | Conventional Hydrogen Bond |
| ARG281 | GLY42 | A | | Conventional Hydrogen Bond |
| LYS223 | LEU107 | A | 3 | Conventional Hydrogen Bond |
| LYS718 | SER69 | A | 2 | Conventional Hydrogen Bond |
| LYS215 | ASP112 | B | 3 | Conventional Hydrogen Bond |
| LYS215 | TYR114 | B | 3 | Conventional Hydrogen Bond |
| LYS223 | ASP29 | B | 1 | Conventional Hydrogen Bond |
| ASN262 | ASP112 | B | 3 | Conventional Hydrogen Bond |
| GLY263 | ASP112 | B | 3 | Conventional Hydrogen Bond |
| ARG281 | THR110 | B | 3 | Conventional Hydrogen Bond |
| LYS773 | THR124 | B | | Conventional Hydrogen Bond |
| ARG730 | PRO41 | B | | Conventional Hydrogen Bond |
| ASP683 | GLN39 | B | | Conventional Hydrogen Bond |
| ASP683 | SER63 | A | 2 | Conventional Hydrogen Bond |
| ALA284 | THR91 | A | | Conventional Hydrogen Bond |
| GLN167 | HIS102 | B | 3 | Conventional Hydrogen Bond |
| GLU285 | LYS109 | B | 3 | Conventional Hydrogen Bond |
| GLU285 | THR110 | B | 3 | Conventional Hydrogen Bond |
| ASP683 | GLN111 | B | 3 | Conventional Hydrogen Bond |
| GLU285 | GLN122 | A | | Conventional Hydrogen Bond |
| GLU285 | THR124 | A | | Conventional Hydrogen Bond |
| ALA284 | VAL125 | A | | Conventional Hydrogen Bond |
| ALA284 | VAL125 | A | | Carbon Hydrogen Bond |
| LEU219 | ILE115 | B | 3 | Carbon Hydrogen Bond |
| GLY221 | GLN3 | B | | Carbon Hydrogen Bond |
| ASP683 | GLN111 | B | 3 | Carbon Hydrogen Bond |
| ASP683 | ARG45 | B | | Carbon Hydrogen Bond |
| GLN218 | SER85 | A | | Carbon Hydrogen Bond |
| GLN218 | LYS87 | A | | Carbon Hydrogen Bond |
| LEU289 | PRO88 | A | | Carbon Hydrogen Bond |
| ALA286 | GLU89 | A | | Carbon Hydrogen Bond |
| GLU285 | SER106 | B | 3 | Carbon Hydrogen Bond |
| GLU285 | LYS109 | B | 3 | Carbon Hydrogen Bond |
| GLU285 | THR124 | A | | Carbon Hydrogen Bond |
| PRO290 | SER127 | A | | Carbon Hydrogen Bond |
| LYS215 | LYS87 | A | | Hydrophobic |
| ALA284 | PRO108 | B | 3 | Hydrophobic |
| LEU219 | ARG67 | A | 2 | Hydrophobic |
| ALA284 | TYR33 | B | | Hydrophobic |

FIGURE 20

| PSMA Residue | NB37 Residue | CDR | Interaction Type |
|---|---|---|---|
| ARG363 | GLU62 | 2 | Electrostatic |
| ARG411 | GLU62 | 2 | Electrostatic |
| ASP654 | ARG19 |  | Electrostatic |
| ASN57 | SER103 | 3 | Conventional Hydrogen Bond |
| ARG363 | GLU62 | 2 | Conventional Hydrogen Bond |
| ALA365 | SER63 | 2 | Conventional Hydrogen Bond |
| HIS56 | LEU104 | 3 | Conventional Hydrogen Bond |
| GLU408 | SER106 | 3 | Conventional Hydrogen Bond |
| GLY409 | SER106 | 3 | Conventional Hydrogen Bond |
| ARG363 | GLU62 | 2 | Carbon Hydrogen Bond |
| ARG411 | PHE60 | 2 | Carbon Hydrogen Bond |
| ARG413 | GLY57 | 2 | Carbon Hydrogen Bond |
| SER656 | SER71 |  | Carbon Hydrogen Bond |
| SER590 | SER56 | 2 | Carbon Hydrogen Bond |
| VAL366 | ALA65 | 2 | Carbon Hydrogen Bond |
| GLY409 | SER106 | 3 | Carbon Hydrogen Bond |
| ALA365 | ILE59 | 2 | Hydrophobic |
| VAL366 | ILE59 | 2 | Hydrophobic |
| TRP410 | ILE58 | 2 | Hydrophobic |

FIGURE 21

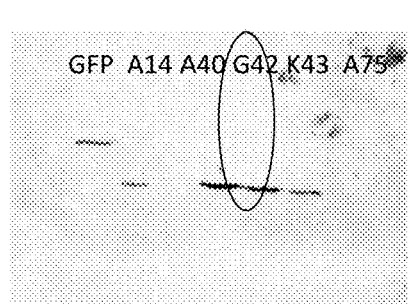

FIGURE 22A

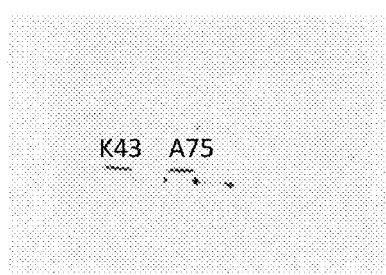

FIGURE 22B

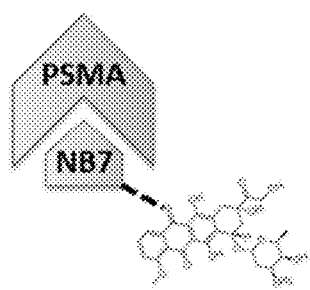
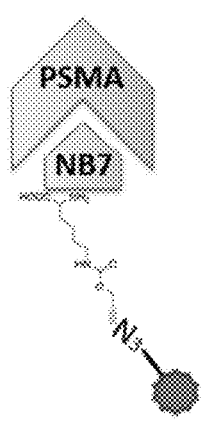
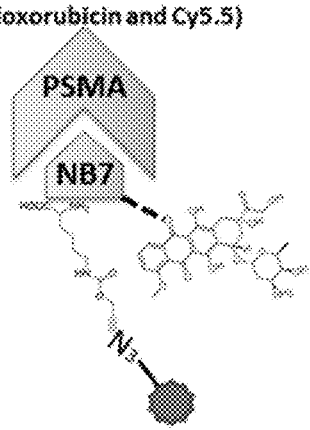

FIGURE 22C

SINGLE-DOMAIN ANTIBODY FOR TARGETING PROSTATE SPECIFIC MEMBRANE ANTIGEN (PSMA)

CROSS-REFERENCE TO RELATED APPLICATIONS

This application is a National Phase of PCT Patent Application No. PCT/IL2020/050940 having International filing date of Aug. 30, 2020, which claims the benefit of priority of U.S. Provisional Patent Application No. 62/893,264 titled "SINGLE-DOMAIN ANTIBODY FOR TARGETING PROSTATE SPECIFIC MEMBRANE ANTIGEN (PSMA)", filed Aug. 29, 2019, the contents of which are incorporated herein by reference in their entirety.

FIELD OF INVENTION

The present invention is in the field of single-domain antibodies.

BACKGROUND

Prostate cancer (PCa) is commonly detected by antibody-based assays that measure the serum concentration of the prostate-specific antigen (PSA), but these assays are prone to high error rates. In addition, although chemotherapies are often used to treat castration-resistant PCa, some potentially effective chemotherapies against PCa, such as doxorubicin (DOX), do not sufficiently accumulate within tumors and have a large distribution volume, resulting in low treatment efficacy and high non-specific toxicity. Novel means for both the detection of PCa and the targeted delivery of cytotoxic agents are, therefore, urgently required. One promising target that can be employed to address both these issues is the prostate-specific membrane antigen (PSMA); a transmembrane protein that is overexpressed in PCa, possibly due to its folate hydrolase activity, which induces cell proliferation. PSMA is mostly expressed on the membranes of PCa cells, although it is also expressed on the neovasculature of many carcinomas, including PCa. Importantly, the overexpression of PSMA is associated with malignant, castration-resistant PCa, reduced androgen-receptor expression, and poor PCa prognosis; therefore, it can be used to detect PCa, identify the stage of the disease, and promote personalized, tumor-specific medicine. Notably, targeting PSMA can be especially important in the treatment of aggressive, androgen-independent PCa tumors, where its expression increases while that of PSA decreases, and where first-line treatments often fail making chemotherapeutic drugs a necessity.

PSMA has been extensively exploited as a target by multiple research groups, which presented promising compounds for PSMA-targeted diagnostics and inhibition, mostly in the field of nuclear medicine. Yet, to date, most proteins that were found to bind the extracellular region of PSMA with a sufficiently high affinity (nanomolar range) are monoclonal antibodies or antibody fragments, which have several caveats for both molecular imaging and cancer treatment purposes. For instance, the long serum half-life and broad biodistribution of antibodies often reduce the signal-to-noise ratio and maintain them in the circulation for long periods of time. These effects increase toxic side effects when the antibody is conjugated to a cytotoxic radioisotope or decrease specificity when the antibody is conjugated to a drug because the antibody-drug conjugate may internalize into non-tumor cells. Moreover, the large size of antibodies often hinders their ability to penetrate into the core of the abnormal tumor tissue, thus dramatically reducing their drug-delivering efficiency. Antibody fragments may solve some of these caveats, but they often show weaker binding and low stability, and they may expose previously masked immunogenic epitopes. While some non-antibody PSMA binders and inhibitors have been described and show promising results, other engineered PSMA-binding peptides show low affinities, namely, at the high-nanomolar to micromolar range.

Nanobodies® (NBs), also known as VHHs, are the single-chain variable domains of heavy-chain antibodies (HCAb). As the NB is the only fragment of the HCAb that mediates antigen binding, it can be expressed separately from the rest of the HCAb without reducing affinity, resulting in a minute (~15 kDa), non-immunogenic, highly target-specific protein, which is an excellent candidate for use as scaffold for in vivo imaging and targeted therapy applications.

There is still a great need for clinically applicable NB-drug conjugate that can specifically target PSMA. The structure of such compounds, their effects on PSMA activity and cell viability, and their potential as drug carriers, is yet to be determined.

SUMMARY

The present invention in some embodiments thereof, is directed to an antigen-binding polypeptide having increased binding affinity to prostate specific membrane antigen (PSMA). In some embodiments, the antigen-binding polypeptide is a single-domain antibody. In some embodiments, the single-domain antibody of the present invention comprises three complementary-determining regions (CDRs).

According to a first aspect, there is provided an antigen-binding polypeptide comprising three complementary-determining region (CDRs) selected from the group consisting of: (i) GYTDSNYYMS (CDR-H1; SEQ ID NO: 1), GVNTGRGSTSYADSVKG (CDR-H2; SEQ ID NO: 2), and AACHFCDSLPKTQDEYIL (CDR-H3; SEQ ID NO: 3); (ii) GWPYSTYSMN (CDR-H1; SEQ ID NO: 4), GISSTMSGIIFAES (CDR-H2; SEQ ID NO: 5), and RRDYSLSSSSDDFDY (CDR-H3; SEQ ID NO: 6); and (iii) GYTASFS (CDR-H1; SEQ ID NO: 7), GVAVINVGVGSTYYADSV (CDR-H2; SEQ ID NO: 8) and SLRWSRPPNPISEDAYNY (CDR-H3; SEQ ID NO: 9).

According to another aspect, there is provided a pharmaceutical composition comprising a therapeutic or diagnostic effective amount of the antigen-binding polypeptide of the invention, and a pharmaceutically acceptable carrier.

According to another aspect, there is provided a method of targeting PSMA, the method comprising contacting a sample comprising the PSMA with the antigen-binding polypeptide of the invention, thereby targeting PSMA.

In some embodiments, the CDR-H2 comprises the amino acid sequence as set forth in SEQ ID NO: 10 (GISSTMSGIIFAESKAGQFTISQDNA).

In some embodiments, the antigen-binding polypeptide is a single-domain antibody.

In some embodiments, the antigen-binding polypeptide comprises the amino acid sequence:

(SEQ ID NO: 11)
QVQLQESGGGSVQAGGSLRLSCTAPGYTDSNYYMSWFRQAPGKEREWVAG

VNTGRGSTSYADSVKGRFTISQDNAKNTMFLQMNSLKPEDTAIYYCAVAA

CHFCDSLPKTQDEYILWGQGTQVTVSSAAAYPYDVPDYGS.

In some embodiments, the antigen-binding polypeptide comprises the amino acid sequence:

(SEQ ID NO: 12)
QVQLQESGGGSVQAGGSLRLSCARSGWPYSTYSMNWFRQAPGKEREAVAG

ISSTMSGIIFAESKAGQFTISQDNAKNTVYLQMNNLKPEDTAIYYCAARR

DYSLSSSSDDFDYWGQGTQVTVSSAAAYPYDVPDYGS.

In some embodiments, the antigen-binding polypeptide comprises the amino acid sequence:

(SEQ ID NO: 13)
QVQLQESGGGSVQTGGSLRLSCAASGYTASFSWIGYFRQAPGKEREGVAV

INVGVGSTYYADSVKGRFTISRDNTENTISLEMNSLKPEDTGLYYCAGSL

RWSRPPNPISEDAYNYWGQGTQVTVSSAAAYPYDVPDYGS.

In some embodiments, the antigen-binding polypeptide comprises the amino acid sequence:

(SEQ ID NO: 14)
QVQLQESGGGSVEAGGSLRLSCARSGWPYSTYSMNWFRQAPGKEREAVAG

ISSTMSGIIFAESKAGQFTISQDNAKNTVYLQMNNLKPEDTAIYYCAARR

DYSLSSSSDDFDYWGQGTQVTVSSAAAYPYDVPDYGS.

In some embodiments, the antigen-binding polypeptide has a specific binding affinity to a prostate specific membrane antigen (PSMA).

In some embodiments, the antigen-binding polypeptide is characterized by binding constant ($K_a$) of at least $10^4$ $Molar^{-1}$ $sec^{-1}$ to said PSMA.

In some embodiments, the antigen-binding polypeptide is characterized by binding constant ($K_a$) of $7.1 \times 10^5$ $Molar^{-1}$ $sec^{-1}$ to the PSMA.

In some embodiments, the antigen-binding polypeptide is characterized by binding constant ($K_a$) of $2 \times 10^4$ $Molar^{-1}$ $sec^{-1}$ to the PSMA.

In some embodiments, the antigen-binding polypeptide is characterized by binding constant ($K_a$) of $3.6 \times 10^4$ $Molar^{-1}$ $sec^{-1}$ to the PSMA.

In some embodiments, the antigen-binding polypeptide is characterized by binding constant ($K_a$) of $2.2 \times 10^4$ $Molar^{-1}$ $sec^{-1}$ to the PSMA.

In some embodiments, the antigen-binding polypeptide is characterized by dissociation constant ($K_D$) of less than 15 nM to the PSMA.

In some embodiments, the antigen-binding polypeptide is characterized by dissociation constant ($K_D$) of 55 pM to the PSMA.

In some embodiments, the antigen-binding polypeptide is characterized by dissociation constant ($K_D$) of 6 nM to the PSMA.

In some embodiments, the antigen-binding polypeptide is characterized by dissociation constant ($K_D$) of 0.6 nM to the PSMA.

In some embodiments, the antigen-binding polypeptide is characterized by dissociation constant ($K_D$) of 3.4 nM to the PSMA.

In some embodiments, the antigen-binding polypeptide is characterized by molecular weight of less than 25 kDa.

In some embodiments, the antigen-binding polypeptide has a specific binding affinity to a non-catalytic site of said PSMA enzyme.

In some embodiments, the antigen-binding polypeptide further comprises at least one non-naturally occurring amino acid.

In some embodiments, the pharmaceutical composition further comprises a therapeutic or diagnostic effective amount of at least one agent selected from a therapeutic agent, a diagnostic agent, and a theranostic agent.

In some embodiments, the method is used for imaging the PSMA in a subject afflicted by or suspected of being afflicted by a PSMA-associated disorder, the method comprising: (a) administering to the subject an effective amount of antigen-binding polypeptide of the invention, and an imaging agent; and (b) detecting the PSMA in the subject, thereby imaging cells comprising PSMA.

In some embodiments, the method is used for treating a PSMA-associated disorder in a subject in need thereof, the method comprising: administering to the subject a pharmaceutical composition comprising an effective amount of the antigen-binding polypeptide of the invention, a cytotoxic agent or a theranostic agent, and an acceptable carrier, thereby treating the PSMA-associated disorder in a subject in need thereof.

In some embodiments, the PSMA-associated disorder is prostate cancer.

In some embodiments, the PSMA-associated disorder is a neurological disorder selected from the group consisting of: Parkinson disease, Alzheimer disease, Huntington disease, amyotrophic lateral sclerosis (ALS), schizophrenia, and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description together with the drawings makes apparent to those skilled in the art how embodiments of the invention may be practiced.

FIGS. 1A-1F include graphs showing that nanobodies (NBs) bind to prostate-specific membrane antigen (PSMA) in vitro and to PSMA-expressing prostate cancer cells. The response units (RU), measured using surface plasmon resonance (SPR) and a 1:1 Langmuir kinetic model, were used to calculate the affinity ($K_D$) of immobilized NB7 (1A), NB8 (1B), NB13 (1C), and NB37 (1D) to PSMA. The PSMA concentrations were 25, 50, 100, 1,600, or 3,200 pM for the NB7 sensograms, and 2.94, 5.88, 11.75, 23.50, or 47.00 nM for the NB8, NB13, and NB37 sensograms. The bottom curve in each sensogram represents the lowest concentration, while the top curve represents the highest concentration. A FACS analysis (n=3) was used to determine the binding of these NBs (0.1-1,000 nM) to PC3-PIP (PSMA$^+$) cells (1E) and to PC3-flu (PSMA$^-$) cells (1F). For convenience, each fluorescence value was normalized to the fluorescence values at the highest and lowest concentrations of PC3-PIP cells.

FIGS. 2A-2H include illustration showing structural analysis of NBs and their PSMA-binding epitopes. (2A-2C) The solved crystal structures of NB7 (2A, 2.65 Å, PDB 6XXN), NB8 (2B, 1.5 Å, PDB 6XXO), and NB37 (2C, 1.5 Å, PDB 6XXP). CDRs 1, 2, and 3 are labeled with an asterisk (*), an arrowhead (▲), and an arrow (↑), respectively. (2D-2F) Structural reconstruction of protein complexes, based on their SAXS-resolved low-resolution structures (grey mesh), fitted with the crystal structure of PSMA (0.5 mg/ml), either alone (2D; PDB 1Z8L) or with 0.2 mg/ml NB7 (2E, pointed by an arrow; PDB 6XXN) or NB37 (2F, pointed by an arrow; PDB 6XXP). The PSMA monomers are labeled individually by Roman numerals; biological dimers are formed by I+II and III+IV, while non-biological dimers are formed by I+III and II+IV. (2G-2H) Computational docking analyses of PSMA and NB7 (2G) and of PSMA and NB37 (2H). (2G) NB7 is encircled in full black line. Key interactions (according to FIG. 20) are shown as black dashed lines. (2H) NB37 is encircled in full black line. Key interactions (FIG. 21) are shown as black dashed lines.

FIGS. 3A-3G include micrographs and graphs showing in vivo whole-body NIR imaging of labeled NBs. PC3-flu (PSMA$^-$) and PC3-PIP (PSMA$^+$) PCa cells were co-injected as xenografts into the left and right upper flanks, respectively, of athymic nude mice. Nine days later, the mice were intravenously injected with fluorescently labeled NBs (from left to right: NB7, NB13, NB8, and NB37; the $K_D$ of each NB is shown in parentheses for convenience) and whole-body images were captured 3 h (3A) and 6 h (3B) post-injection, and again when the signal was no longer detectable (3C); 32 h for NB8 and NB13, and 24 h for NB37; mice injected with NB7 still showed a fluorescent signal 56 h post-injection, at which point they were imaged and then euthanized). In each individual image, the left mouse was injected with tumor cells but not with NBs, the middle mouse was injected with NBs but not with tumor cells, and the right mouse was injected with both tumor cells and NBs. (3D-3G) Quantification of the $AF_{680}$ fluorescent signals from the dissected organs at each time point for NB7 (3D), NB8 (3E), NB13 (3F), and NB37 (3G). PC3-PIP tumors express PSMA, whereas PC3-flu tumors do not.

FIGS. 4A-4I include fluorescent micrographs showing confocal imaging of the internalization of NBs into prostate cancer cells. PC3-PIP (PSMA$^+$) cells (4A-4D) and PC3-flu (PSMA$^-$) cells (4E-4H) were incubated for 10 min with a Hoechst reagent (nuclei staining), a PE-anti-PSMA antibody, and 100 nM of either NB7 (4A, 4E), NB8 (4B, 4F), NB13 (4C, 4G), or NB37 (4D, 4H), each labeled with Dylight 488. Alternatively, PC3-PIP cells were incubated for 10 min with the PE-anti-PSMA antibody without any NB (4I). Scale bar=10 μm.

FIGS. 5A-5H include fluorescent micrographs showing confocal imaging of the internalization of NB7cys, DOX, and the NB7cysDOX conjugate into PCa cells. PC3-PIP (PSMA$^+$; 5A-5D) and PC3-flu (PSMA$^-$; 5E-5H) cells were incubated with either DOX (auto-fluorescence; 5B, 5F), NB7cys labeled with Dylight 650 (5C, 5G), or NB7cysDOX labeled with Dylight 650 (5D, 5H). Un-treated control cells (5A, 5E). Images were taken after 15 min of incubation. The non-overlapping colocalization of NB7 and DOX is indicative of the cleavage of DOX from the NB7cysDOX conjugate. Some of the DOX molecules were found separate from NB7cys (arrows), while others co-localized with NB7cys (arrowheads). Scale bar=10 μm.

FIGS. 6A-6D include graphs and micrographs showing in vivo and in-situ effects of NB7cysDOX on PC3-PIP (PSMA$^+$) tumors. PC3-PIP xenografts in athymic nude mice were treated with either saline (control), 2 mg/kg commercial DOX, or 1.4 mg/kg NB7cysDOX. (6A) Mean tumor volume after 8 d of treatment (before any mouse was excluded from the experiment due to ethical considerations). *$p<0.05$ versus control (Student's t-test; n=7 for controls and n=8 for DOX and NB7cysDOX). (6B) The slope of calculated logarithmic tumor growth in the treated versus control (T/C) groups. *$p<0.05$ versus control (Student's t-test; n=7 for controls, n=4 for DOX, and n=8 for NB7cysDOX; (6C) A representative tissue section from a tumor, obtained 4 d after treatment termination, from one mouse treated with NB7cysDOX and labeled with PE-anti-PSMA and FITC-anti-His to identify PSMA and NB7, respectively, and nuclei were also stained (Hoechst). White arrows point to colocalization of PSMA and NB7. (6D) Hematoxylin and Eosin (H&E) staining (top row) and terminal deoxynucleotidyl transferase dUTP nick end labeling (TUNEL) and propidium iodide (PI) staining (bottom row) of tissue sections from tumors obtained 4 d after treatment termination. White arrows indicate the colocalization of TUNEL and PI. Scale bars apply to all three images in the same row.

FIGS. 7A-7C include graphs and a micrograph showing NB selection and purification. (7A) Enzyme-linked immunosorbent assay (ELISA) results demonstrating the binding of PSMA by individual bacterial colonies expressing different NB sequences. Sequences that were chosen for purification: NB7 (clones 7, 9, 22, 28, 31-33, and 46), NB8 (clones 8 and 21), NB13 (clones 13 and 18), and NB37 (clone 37). (7B) A representative size-exclusion chromatography for NB7 (the chromatograms for NB8, NB13, and NB37 were similar to the one shown here). (7C) SDS-PAGE gel results showing the four purified NBs. All proteins were in the expected size of ~16 kDa.

FIGS. 10A-10D include graphs showing SAXS curves and the corresponding Guinier plots of PSMA with increasing concentrations of NBs. PSMA (0.5 mg/ml) was pre-mixed with increasing concentrations of NBs (10A: NB7, 10B: NB8, 10C: NB13, and 10D: NB37), ranging from 0.1 mg/ml to 0.5 mg/ml, which represent PSMA:NB molar ratios from 1:0.5 to 1:5. Colors reflect the NB concentrations (darker=higher).

FIG. 11 includes a graph showing the effect of NBs on the $R_g$ of PSMA. SAXS results showing the $R_g$ values of PSMA (0.5 mg/ml) at increasing concentrations of NBs (0.05-0.58 mg/ml). The dashed line indicates the $R_g$ of PSMA without NBs.

FIGS. 12A-12E include graphs showing the results of the custom-made script analysis of the SAXS data. The analysis was done using an automated procedure based on a script and the computer program GNOM. The "Total estimate" score was used to choose the best result. PSMA (12A), PSMA+NB7 (12B), PSMA+NB8 (12C), PSMA+NB13 (12D), and PSMA+NB37 (12E).

FIG. 20 includes a table showing predicted interactions between NB7 and PSMA (A: monomer A of PSMA; B: monomer B of PSMA). CDR1 shows an electrostatic interaction with monomer B, between aspartic acid 29 of the NB and lysine 223 of PSMA. CDR2 shows an electrostatic interaction with monomer A, between aspartic acid 62 of the NB and lysine 718 of PSMA. CDR3 shows two electrostatic interactions to monomer B: one between glutamic acid 113 of the NB and arginine 281 of PSMA, and the other between lysine 109 of the NB and glutamic acid 285 of PSMA.

FIG. 21 includes a table showing predicted interactions between NB37 and PSMA. CDRs display electrostatic interactions between glutamic acid 62 with two arginine residues of PSMA (arginine 363 and arginine 411). Another electrostatic interaction is between arginine 19 (a non-CDR residue) and aspartic acid 654 of PMSA.

FIG. 22A-22F include micrographs, illustration, and graphs, showing the incorporation of non-natural amino acids into NB7. (22A) Western blot analysis showing the incorporation of the unnatural amino acid BOC Lysine in different positions on NB7 (A14, A40, G42, K43, and A75). (22B) Western blot analysis showing incorporation of the unnatural amino acid BOC Lysine in different positions of NB7-Cys (K43, and A75). (22C) an illustration of a non-limiting scheme showing binding interaction between PSMA and NB7 cys (+doxorubicin), NB7 K43prop (+Cy5.5), or NB7 cys K43prop (+doxorubicin and Cy5.5). (22D) is a graph showing size-exclusion chromatography. The absorbance of 280 nm for NB7 (1), NB7cys (2), and NB7 K43prop (3) is presented. (22E) Mass-spectrometry of NB7 (1), NB7cys (2), and NB7 K43prop (3), analyzed using MALDI-TOF. (22F) a vertical bar graph showing the binding of NB7 and NB7 K43PrK to PC3-PIP cells, as was determined using FACS analysis. The results show no significant change in binding following the K43PrK mutation.

DETAILED DESCRIPTION

Figure 1A:
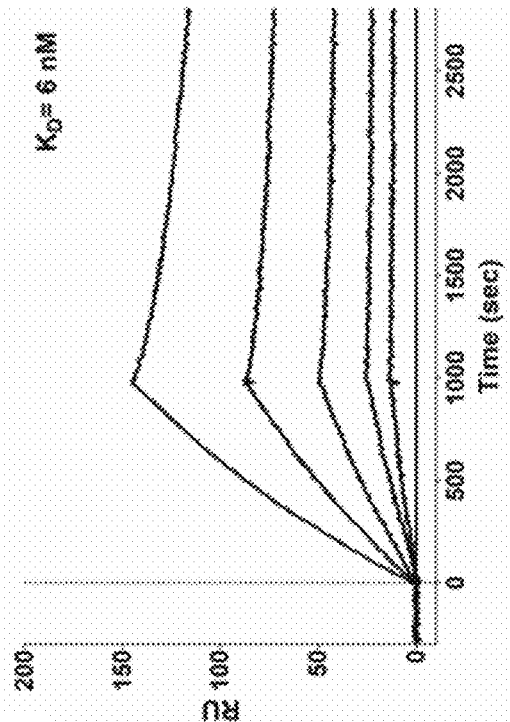
Figure 1B:
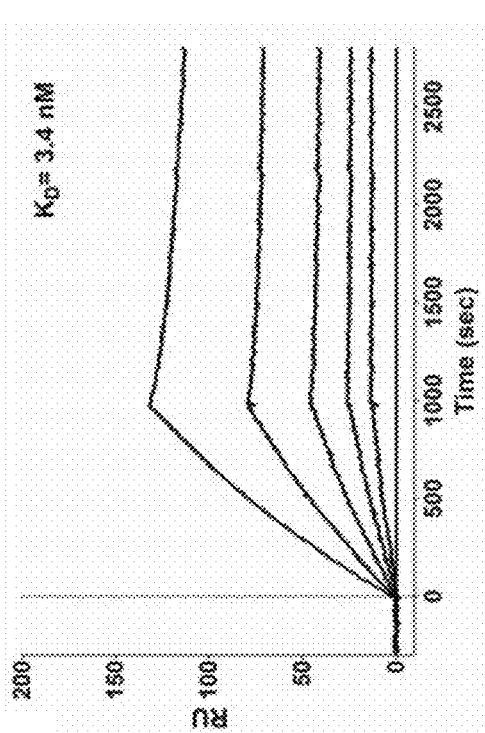
Figure 1C:
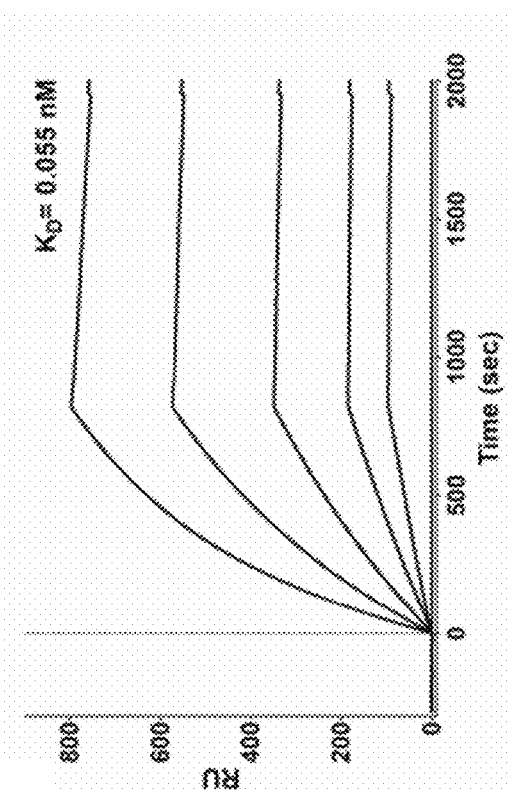
Figure 1D:
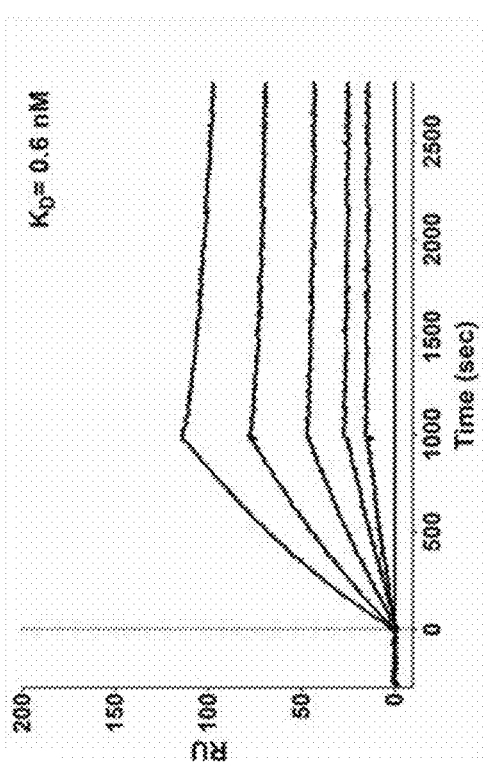

In some embodiments, the present invention is directed to an antigen-binding polypeptide having increased binding affinity to prostate specific membrane antigen (PSMA). In some embodiments, the antigen-binding polypeptide is a single-domain antibody.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The term "prostate specific membrane antigen" or PSMA, as used herein, refers to glutamate carboxypeptidase II, also known as N-acetyl-L-aspartyl-L-glutamate peptidase I (NAALADase I or NAAG peptidase). As a non-limiting example, human PSMA has the UniProt accession no. Q04609.

The terms "antibody" and "antigen-binding polypeptide" (also referred to as an "immunoglobulin" or "Ig") refer to a polypeptide or group of polypeptides that include at least one binding domain that is specific for one antigen. In certain embodiments, the use of a chimeric antibody or a humanized antibody is also encompassed by the invention.

In some embodiments, the term "antibody fragments" refers to a portion of an intact antibody, preferably comprising the antigen binding region thereof.

The terms "single-domain antibody" refers to an antibody fragment consisting of a single variable domain ($V_HH$). Single-domain antibody is a smaller functional fragment of the antibody that also can bind a specific antigen. In some embodiments, the single-domain antibody has better tissue penetration than conventional antibodies and therefore they are beneficial for clinical/diagnostic use.

In some embodiments, the single-domain antibody of the present invention comprises three complementary-determining regions (CDRs).

In some embodiments, the term "complementary-determining region" refers to variable heavy chain. In some embodiments, the variable heavy chain comprises an amino acid sequence capable of binding a specific PSMA.

Kabat et al. defined a numbering system for variable domain sequences that is applicable to any antibody. One of ordinary skill in the art can unambiguously assign this system of "Kabat numbering" to any variable domain sequence, without reliance on any experimental data beyond the sequence itself. As used herein, "Kabat numbering" refers to the numbering system set forth by Kabat et al, U.S. Dept. of Health and Human Services, "Sequence of Proteins of Immunological Interest" (1983).

In some embodiments, the antigen-binding polypeptide comprises three CDRs comprising: GYTDSNYYMS (CDR-H1; SEQ ID NO: 1), GVNTGRGSTSYADSVKG (CDR-H2; SEQ ID NO: 2), and AACHFCDSLPKTQDEYIL (CDR-H3; SEQ ID NO: 3).

In some embodiments, the antigen-binding polypeptide comprises three CDRs comprising: GWPYSTYSMN (CDR-H1; SEQ ID NO: 4), GISSTMSGIIFAES (CDR-H2; SEQ ID NO: 5), and RRDYSLSSSSDDFDY (CDR-H3; SEQ ID NO: 6).

In some embodiments, the antigen-binding polypeptide comprises three CDRs comprising: GYTASFS (CDR-H1; SEQ ID NO: 7), GVAVINVGVGSTYYADSV (CDR-H2; SEQ ID NO: 8) and SLRWSRPPNPISEDAYNY (CDR-H3; SEQ ID NO: 9).

In some embodiments, the antigen-binding polypeptide comprises three CDRs comprising: GWPYSTYSMN (CDR-H1; SEQ ID NO: 4), GISSTMSGIIFAESKAGQFTISQDNA (CDR-H2; SEQ ID NO: 10), and RRDYSLSSSSDDFDY (CDR-H3; SEQ ID NO: 6).

In some embodiments, the antigen-binding polypeptide comprises the amino acid sequence:

(SEQ ID NO: 15)
QVQLQESGGGSVQX₁GGSLRLSCTAPGYTDSNYYMSWFRQX₂PX₃X₄ERE

WVAGVNTGRGSTSYADSVKGRFTISQDNX₅KNTMFLQMNSLKPEDTAIYY

CAVAACHFCDSLPKTQDEYILWGQGTQVTVSSAAAYPYDVPDYGS, wherein: $X_1$ is selected from Alanine or an artificial or non-naturally occurring amino acid, $X_2$ is selected from Alanine or an artificial or non-naturally occurring amino acid, $X_3$ is selected from Glycine or an artificial or non-naturally occurring amino acid, $X_4$ is selected from Lysine or an artificial or non-naturally occurring amino acid, and $X_5$ is selected from Alanine or an artificial or non-naturally occurring amino acid. In some embodiments, the artificial or non-naturally occurring amino acid comprises or consists of the amino acid BOC-Lysine.

In some embodiments, the antigen-binding polypeptide comprises the amino acid sequence:

(SEQ ID NO: 11)
QVQLQESGGGSVQAGGSLRLSCTAPGYTDSNYYMSWFRQAPGKEREWVAG

VNTGRGSTSYADSVKGRFTISQDNAKNTMFLQMNSLKPEDTAIYYCAVAA

CHFCDSLPKTQDEYILWGQGTQVTVSSAAAYPYDVPDYGS.

In some embodiments, the antigen-binding polypeptide comprises the amino acid sequence:

(SEQ ID NO: 16)
QVQLQESGGGSVQX₁GGSLRLSCARSGWPYSTYSMNWFRQX₂PX₃X₄ERE

AVAGISSTMSGIIFAESKAGQFTISQDNX₅KNTVYLQMNNLKPEDTAIYY

CAARRDYSLSSSSDDFDYWGQGTQVTVSSAAAYPYDVPDYGS, wherein: $X_1$ is selected from Alanine or an artificial or non-naturally occurring amino acid, $X_2$ is selected from Alanine or an artificial or non-naturally occurring amino acid, $X_3$ is selected from Glycine or an artificial or non-naturally occurring amino acid, $X_4$ is selected from Lysine or an artificial or non-naturally occurring amino acid, and $X_5$ is selected from Alanine or an artificial or non-naturally occurring amino acid. In some embodiments, the artificial or non-naturally occurring amino acid comprises or consists of the amino acid BOC-Lysine.

In some embodiments, the antigen-binding polypeptide comprises the amino acid sequence:

(SEQ ID NO: 12)
QVQLQESGGGSVQAGGSLRLSCARSGWPYSTYSMNWFRQAPGKEREAVAG

ISSTMSGIIFAESKAGQFTISQDNAKNTVYLQMNNLKPEDTAIYYCAARR

DYSLSSSSDDFDYWGQGTQVTVSSAAAYPYDVPDYGS.

In some embodiments, the antigen-binding polypeptide comprises the amino acid sequence:

QVQLQESGGGSVQTGGSLRLSCAASGYTASFSWIGYFRQX$_1$PX$_2$X$_3$EREG (SEQ ID NO: 17)

VAVINVGVGSTYYADSVKGRFTISRDNTENTISLEMNSLKPEDTGLYYCA

GSLRWSRPPNPISEDAYNYWGQGTQVTVSSAAAYPYDVPDYGS, wherein: X$_1$ is selected from Alanine or an artificial or non-naturally occurring amino acid, X$_2$ is selected from Glycine or an artificial or non-naturally occurring amino acid, and X$_3$ is selected from Lysine or an artificial or non-naturally occurring amino acid. In some embodiments, the artificial or non-naturally occurring amino acid comprises or consists of the amino acid BOC-Lysine.

In some embodiments, the antigen-binding polypeptide comprises the amino acid sequence:

QVQLQESGGGSVQTGGSLRLSCAASGYTASFSWIGYFRQAPGKEREGVAV (SEQ ID NO: 13)

INVGVGSTYYADSVKGRFTISRDNTENTISLEMNSLKPEDTGLYYCAGSL

RWSRPPNPISEDAYNYWGQGTQVTVSSAAAYPYDVPDYGS.

In some embodiments, the antigen-binding polypeptide comprises the amino acid sequence:

QVQLQESGGGSVEX$_1$GGSLRLSCARSGWPYSTYSMNWFRQX$_2$PX$_3$X$_4$ERE (SEQ ID NO: 18)

AVAGISSTMSGIIFAESKAGQFTISQDNX$_5$KNTVYLQMNNLKPEDTAIYY

CAARRDYSLSSSSDDFDYWGQGTQVTVSSAAAYPYDVPDYGS, wherein: X$_1$ is selected from Alanine or an artificial or non-naturally occurring amino acid, X$_2$ is selected from Alanine or an artificial or non-naturally occurring amino acid, X$_3$ is selected from Glycine or an artificial or non-naturally occurring amino acid, X$_4$ is selected from Lysine or an artificial or non-naturally occurring amino acid, and X$_5$ is selected from Alanine or an artificial or non-naturally occurring amino acid. In some embodiments, the artificial or non-naturally occurring amino acid comprises or consists of the amino acid BOC-Lysine.

In some embodiments, the antigen-binding polypeptide comprises the amino acid sequence:

QVQLQESGGGSVEAGGSLRLSCARSGWPYSTYSMNWFRQAPGKEREAVAG (SEQ ID NO: 14)

ISSTMSGIIFAESKAGQFTISQDNAKNTVYLQMNNLKPEDTAIYYCAARR

DYSLSSSSDDFDYWGQGTQVTVSSAAAYPYDVPDYGS.

In some embodiments, the antigen-binding polypeptide has a specific binding affinity to PSMA.

As used herein, the term "specific binding" refers to a non-covalent physical association of a first and a second moiety of two entities. In some embodiments, the association between the first and second moieties is at least 10 times as strong, at least 50 times as strong, or at least 100 times as strong as the association of other moieties present in the environment in which binding occurs.

In some embodiments, the binding of two or more entities may be considered specific if the equilibrium "dissociation constant", $K_D$, is less than $10^{-3}$ M, less than $10^{-4}$ M, less than $10^{-5}$ M, less than $10^{-6}$ M, less than $10^{-7}$ M, less than $10^{-8}$ M, less than $10^{-9}$ M, less than $10^{-10}$ M, less than $10^{-11}$ M, or less than $10^{-12}$ M, or any value and range therebetween. Each possibility represents a separate embodiment of the invention. In some embodiments, the binding of two or more entities may be considered specific if the equilibrium "dissociation constant", $K_D$, is $10^{-10}$ M-$10^{-3}$ M, $10^{-12}$ M-$10^{-4}$ M. Each possibility represents a separate embodiment of the invention. In some embodiments, specific binding can be accomplished by a plurality of weaker interactions. Calculation of a peptide's dissociation constant ($K_D$) is known to a skilled artisan and is also show in the Examples section herein below.

In some embodiments, the term "binding constant", or "association constant", refers to a special case of the equilibrium constant $K_a$, which is the inverse of the dissociation constant.

In some embodiments, the antigen-binding polypeptide is characterized by binding constant ($K_a$) of at least $10^3$, at least $10 \times 10^3$, at least $10^4$, at least $2 \times 10^4$, at least $10^5$, or at least $5 \times 10^5$ Molar$^{-1}$ sec$^{-1}$ (M$^{-1}$ s$^{-1}$) to PSMA, or any value and range therebetween. Each possibility represents a separate embodiment of the invention.

In non-limiting exemplary embodiments, the antigen-binding polypeptide comprising the amino acid sequence as set forth in SEQ ID NO: 11 is characterized by binding constant ($K_a$) of about $7.1 \times 10^5$ M$^{-1}$ s$^{-1}$ to PSMA.

In non-limiting exemplary embodiments, the antigen-binding polypeptide comprising the amino acid sequence as set forth in SEQ ID NO: 12 is characterized by binding constant ($K_a$) of about $2 \times 10^4$ M$^{-1}$ s$^{-1}$ to PSMA.

In non-limiting exemplary embodiments, the antigen-binding polypeptide comprising the amino acid sequence as set forth in SEQ ID NO: 13 is characterized by binding constant ($K_a$) of about $3.6 \times 10^4$ M$^{-1}$ s$^{-1}$ to PSMA.

In non-limiting exemplary embodiments, the antigen-binding polypeptide comprising the amino acid sequence as set forth in SEQ ID NO: 14 is characterized by binding constant ($K_a$) of about $2.2 \times 10^4$ M$^{-1}$ s$^{-1}$ to PSMA.

In some embodiments, the antigen-binding polypeptide is characterized by dissociation constant ($K_D$) of less than 10 pM, less than 50 pM, less than 500 pM, less than 15 nM, less than 50 nM, or less than 500 nM to PSMA, or any value and range therebetween. Each possibility represents a separate embodiment of the invention.

In non-limiting exemplary embodiments, the antigen-binding polypeptide comprising the amino acid sequence as set forth in SEQ ID NO: 11 is characterized by dissociation constant ($K_D$) of about 55 pM to PSMA.

In non-limiting exemplary embodiments, the antigen-binding polypeptide comprising the amino acid sequence as set forth in SEQ ID NO: 12 is characterized by dissociation constant ($K_D$) of about 6 nM to PSMA (as calculated herein below in the Examples section).

In non-limiting exemplary embodiments, the antigen-binding polypeptide comprising the amino acid sequence as set forth in SEQ ID NO: 13 is characterized by dissociation constant ($K_D$) of about 0.6 nM to PSMA.

In non-limiting exemplary embodiments, the antigen-binding polypeptide comprising the amino acid sequence as set forth in SEQ ID NO: 14 is characterized by dissociation constant ($K_D$) of about 3.4 nM to PSMA.

In some embodiments, the polypeptide binds to a non-catalytic site of PSMA. In one embodiment, the polypeptide binds to an extracellular domain of PSMA.

As used herein, the terms "peptide", "polypeptide" and "protein" are used interchangeably to refer to a polymer of amino acid residues. In another embodiment, the terms "peptide", "polypeptide" and "protein" as used herein encompass native peptides, peptidomimetics (typically including non-peptide bonds or other synthetic modifications) and the peptide analogues peptoids and semipeptoids or any combination thereof.

In some embodiments, the polypeptide binding to PSMA is characterized by allowing further interaction to PSMA. In some embodiments, the polypeptide binding to PSMA is characterized by retaining PSMA enzyme activity. Methods of determining PSMA activity are known in the art and are also exemplified herein below, as a non-limiting example.

In some embodiments, the antigen-binding polypeptide is characterized by molecular weight of less than 15 kDa, less than 20 kDa, less than 25 kDa, less than 35 kDa, or less than 50 kDa, or any value and range therebetween. Each possibility represents a separate embodiment of the invention.

In some embodiments, the antigen-binding polypeptide is characterized by thermal stability ($T_m$) of at least 60° C., at least 70° C., at least 90° C., or at least 95° C., or any value and range therebetween. Each possibility represents a separate embodiment of the invention.

As used herein, the term "thermal stability", refers to a substance resistance to irreversible change in its chemical or physical structure at an elevated temperature. In some embodiments, $T_m$ indicates the thermal energy that caused the denaturation/unfolding of a protein or a peptide.

In some embodiments, the N- or C-terminus of the antigen-binding polypeptide comprises a tag motif. In some embodiments, the tag motif comprises at least six amino acids. In some embodiments, the antigen-binding polypeptide comprises histidine (His)-tag. In some embodiments, the antigen-binding polypeptide comprises human influenza hemagglutinin (HA)-tag.

According to another embodiment, the polypeptides of the invention encompass truncated forms and/or fragments of any one of SEQ ID NOs: 1-14 as long as they are capable of binding PSMA.

Conservative substitution of amino acids as known to those skilled in the art are within the scope of the present invention. Conservative amino acid substitutions include replacement of one amino acid with another having the same type of functional group or side chain e.g. aliphatic, aromatic, positively charged, negatively charged. One of skill will recognize that individual substitutions, deletions or additions to peptide, polypeptide, or protein sequence which alters, adds or deletes a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art.

The following six groups each contain amino acids that are conservative substitutions for one another: 1) Alanine (A), Serine (S), Threonine (T); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); and 6) Phenylalanine (F), Tyrosine (Y), Tryptophan (W) (see, e.g., Creighton, Proteins, 1984).

The term "conservative substitution" also includes the use of a chemically derivatized residue in place of a non-derivatized residue provided that such peptide displays the requisite function of modulating the immune system's innate response as specified herein.

In some embodiments, the polypeptide of the invention comprises a non-naturally occurring amino acid.

Methods for integrating a non-naturally occurring amino acid into a polypeptide are common and would be apparent to one of ordinary skill in the art.

In some embodiments, any non-naturally occurring amino acid is envisioned by the current invention as long as the resulting polypeptide comprising the non-naturally occurring amino acid maintains its activity, e.g., high affinity binding to PSMA, or any other activity such as disclosed herein.

In some embodiments, a non-naturally occurring amino acid is selected from: 3-Iodo-L-tyrosine, $N^\varepsilon$-Benzyloxycarbonyllysine (ZLys), $N^\varepsilon$-Acetyllysine (AcLys), $N^\varepsilon$-Cyclopentyloxycarbon yl-L-lysine (Cyc), $N^\varepsilon$-(((1R,2R)-2-azidocyclopentyloxy)carbonyl)-L-lysine (ACPK), o-Nitrobenzyl-Otyrosine, o-Nitrobenzyloxycarbonyl-$N^\varepsilon$-Llysine, $N^\varepsilon$-[(1-(6-Nitrobenzo [d][1,3]dioxol-5yl) ethoxy)carbonyl]-L-lysine, $N^\varepsilon$-[(2-(3-Methyl-3Hdiazirin-3-yl)ethoxy)carbonyl]-Llysine, (3-(3-Methyl-3Hdiazirine-3-yl)-propaminocarbonyl$N^\varepsilon$-L-lysine (DiZPK), BCN (exo isomer), BCN (endo isomer), TCO, $N^\varepsilon$-(1-Methylcycloprop-2-enecarboxamido)lysine (CpK), $N^\varepsilon$-Acryloyl-L-lysine, pNO$_2$ZLys, TmdZLys, $N^\varepsilon$-Crotonyl-L-lysine (Kcr), 2-Chloro-L-phenylalanine, 2-Bromo-L-phenylalanine, 2-Iodo-L-phenylalanine, 2-Methyl-L-phenylalanine, 2-Methoxy-L-phenylalanine, 2-Nitro-L-phenylalanine, 2-Cyano-L-phenylalanine, and $N^\varepsilon$-(tert-Butoxycarbonyl)-L-lysine (BOC-Lysine).

In some embodiments, a non-naturally occurring amino acid comprises or consists of BOC-Lysine.

Methods for Treatment and Diagnosis

In another embodiment, the present invention provides a method for targeting PSMA by contacting a sample comprising PSMA with an antigen-binding polypeptide of the invention, thereby targeting PSMA.

In one embodiment, the present invention provides a method for treating, diagnosing, prognosticating or determining the suitability for treatment of a subject suffering from a PSMA-associated disorder, the method comprising administering to the subject a pharmaceutical composition comprising an effective amount of the antigen-binding polypeptide of the invention, a cytotoxic agent or a theranostic agent, and a pharmaceutical acceptable carrier, thereby treating diagnosing, prognosticating or determining the suitability for treatment of a subject suffering from a PSMA-associated disorder in said subject.

In one embodiment, there is provided a method for imaging PSMA in a subject, such as a subject suffering from or suspected to suffer from a PSMA-associated disorder, the method comprising administering to the subject a composition comprising an effective amount of the antigen-binding polypeptide of the invention, and an imaging agent; and detecting the PSMA in the subject, thereby imaging PSMA in a subject.

In some embodiments, the imaging agent is selected from, without being limited thereto, a fluorescent label (e.g., fluorescein isothiocyanate), a chromophore, a radioactive label, a paramagnetic ion (e.g., $Gd^{+3}$), and any combination thereof.

In some embodiments, the term "chromophore" refers to a material that absorbs certain wavelength of light from UV to near infrared region and may be or may not be emissive.

In one embodiment, the imaging agent is a radioactive label (e.g., isotope). In another embodiment, the therapeutic agent is a radioactive label (e.g., isotope). In some embodiments, the isotope is selected from, but not limited to: $^{18}$F, $^{47}$Sc, $^{51}$Cr, $^{52}$Fe, $^{52m}$Mn, $^{56}$Ni, $^{57}$Ni, $^{62}$Cu, $^{64}$Cu, $^{67}$Ga, $^{68}$Ga, $^{72}$As, $^{75}$Br, $^{76}$Br, $^{77}$Br, $^{82}$Br, $^{89}$Zr, $^{94m}$Tc, $^{97}$Ru, $^{99m}$Tc, $^{111}$In, $^{123}$I, $^{124}$I, $^{131}$I, $^{191}$Pt, $^{197}$Hg, $^{201}$Tl, $^{203}$Pb, $^{110m}$In, $^{120}$I, $^{11}$C, $^{18}$F, and $^{13}$N.

In some embodiments, the imaging techniques are selected from, without being limited thereto, computed X-ray tomography (CT), ultrasound (US), and magnetic resonance imaging (MRI), positron emission tomography (PET), single-photon emission computed tomography (SPECT), fluorescence and radio assays, cytofluorimetry, and fluorescence activated cell sorting. The principles of such techniques can be found in immunochemistry handbooks, for example: A Johnstone and R. Thorpe, Immunochemistry in practice, $2^{nd}$ Edition (1987), blackwell Scientific publications, Oxford London Edinburgh Boston Palo Alto Melbourne.

Non-limiting exemplary embodiments demonstrate the diagnosis of prostate tumors in vivo by near infra-red (NIR) imaging after 24 hours from the administration of the antigen-binding polypeptide conjugated to a fluorescent label.

In one embodiment, the method further comprises determining the relative percentage of the PSMA subpopulations by the administration of antigen-binding polypeptide.

In some embodiments, the antigen-binding polypeptide of the present invention can be used in conjunction with other therapeutic treatment modalities, including surgery, cryosurgery, radiation, thermotherapy, hormone treatment, chemotherapy, immunotherapy, vaccines, and any combination thereof.

In some embodiments, the therapeutic agent can include any agent (e.g., molecule, drug, pharmaceutical composition, etc.) capable of preventing, inhibiting, or arresting the symptoms and/or progression of a disease.

In some embodiments, the therapeutic agent is selected from, but not limited to: a chemotherapeutic agent (e.g., methotrexate, cisplatin and paclitaxel), an anti-oncogenic agent, an anti-angiogenic agent, a tumor suppressor agent, an anti-microbial agent, or an expression construct comprising a nucleic acid encoding a therapeutic protein.

In some embodiments, the PSMA-associated disorder is prostate cancer.

In some embodiments, the PSMA-associated disorder is a neurological disorder. In some embodiments, the neurological disorder is selected from, but not limited to: Parkinson disease, Alzheimer disease, Huntington disease, amyotrophic lateral sclerosis (ALS), and schizophrenia.

Pharmaceutical Compositions

The present invention also contemplates pharmaceutical compositions for human medical use, the composition comprising at least one antigen-binding polypeptide as described herein.

The present invention also contemplates the use of an antigen-binding polypeptide as described herein, for the manufacture of a pharmaceutical composition for the treatment, diagnosis, theranostic or prophylaxis of cancer or neurological disorder.

In some embodiments, the pharmaceutical composition comprises a therapeutic or diagnostic effective amount of the antigen-binding polypeptide described herein, with optionally any one of additional therapeutic ingredient(s), imaging agent(s), and combination thereof, and one or more pharmaceutically acceptable carriers.

The pharmaceutical compositions of the invention can be formulated in the form of a pharmaceutically acceptable salt of the polypeptide of the invention or their analogs thereof. Pharmaceutically acceptable salts include those salts formed with free amino groups such as salts derived from non-toxic inorganic or organic acids such as hydrochloric, phosphoric, acetic, oxalic, tartaric acids, and the like, and those salts formed with free carboxyl groups such as salts derived from non-toxic inorganic or organic bases such as sodium, potassium, ammonium, calcium, ferric hydroxides, isopropylamine, triethylamine, 2-ethylamino ethanol, histidine, procaine, and the like. In one embodiment, pharmaceutical compositions of the present invention are manufactured by processes well known in the art, e.g., by means of conventional mixing, dissolving, granulating, dragee-making, levigating, emulsifying, encapsulating, entrapping or lyophilizing processes.

The term "analog" includes any peptide having an amino acid sequence substantially identical to one of the sequences specifically shown herein in which one or more residues have been conservatively substituted with a functionally similar residue and which displays the abilities as described herein. Examples of conservative substitutions include the substitution of one non-polar (hydrophobic) residue such as isoleucine, valine, leucine or methionine for another, the substitution of one polar (hydrophilic) residue for another such as between arginine and lysine, between glutamine and asparagine, between glycine and serine, the substitution of one basic residue such as lysine, arginine or histidine for another, or the substitution of one acidic residue, such as aspartic acid or glutamic acid for another. Each possibility represents a separate embodiment of the present invention.

The term "pharmaceutically acceptable" means suitable for administration to a subject, e.g., a human. For example, the term "pharmaceutically acceptable" can mean approved by a regulatory agency of the Federal or a state government or listed in the U. S. Pharmacopeia or other generally recognized pharmacopeia for use in animals, and more particularly in humans. The term "carrier" refers to a diluent, adjuvant, excipient, or vehicle with which the therapeutic compound is administered. Such pharmaceutical carriers can be sterile liquids, such as water and oils, including those of petroleum, animal, vegetable or synthetic origin, such as peanut oil, soybean oil, mineral oil, sesame oil and the like, polyethylene glycols, glycerin, propylene glycol or other synthetic solvents. Water is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene glycol, water, ethanol and the like. The composition, if desired, can also contain minor amounts of wetting or emulsifying agents, or pH buffering agents such as acetates, citrates or phosphates. Antibacterial agents such as benzyl alcohol or methyl parabens; antioxidants such as ascorbic acid or sodium bisulfate; and agents for the adjustment of tonicity such as sodium chloride or dextrose are also envisioned. The carrier may constitute, in total, from about 0.1% to about 99.99999% by weight of the pharmaceutical compositions presented herein.

The compositions can take the form of solutions, suspensions, emulsions, tablets, pills, capsules, powders, gels, creams, ointments, foams, pastes, sustained-release formulations and the like. The compositions can be formulated as a suppository, with traditional binders and carriers such as triglycerides, microcrystalline cellulose, gum tragacanth or gelatin. Oral formulation can include standard carriers such as pharmaceutical grades of mannitol, lactose, starch, magnesium stearate, sodium saccharine, cellulose, magnesium carbonate, etc. Examples of suitable pharmaceutical carriers are described in: "Remington's Pharmaceutical Sciences" by E. W. Martin, the contents of which are hereby incorporated by reference herein. Such compositions will contain a therapeutically effective amount of the active agent and the antigen-binding polypeptide of the invention, preferably in a substantially purified form, together with a suitable amount of carrier so as to provide the form for proper administration to the subject.

An embodiment of the invention relates to an antigen-binding polypeptide presented in unit dosage form and is prepared by any of the methods well known in the art of pharmacy. In an embodiment of the invention, the unit dosage form is in the form of a tablet, capsule, lozenge, wafer, patch, ampoule, vial or pre-filled syringe. In addition, in vitro assays may optionally be employed to help identify optimal dosage ranges. The precise dose to be employed in the formulation will also depend on the route of administration, and the nature of the disease or disorder, and should be decided according to the judgment of the practitioner and each patient's circumstances. Effective doses can be extrapolated from dose-response curves derived from in-vitro or in-vivo animal model test bioassays or systems.

Depending on the location of the tissue of interest, the antigen-binding polypeptide of the present invention can be supplied in any manner suitable for the provision of the antigen-binding polypeptide to cells within the tissue of interest. Thus, for example, a composition comprising the antigen-binding polypeptide can be introduced, for example, into the systemic circulation, which will distribute the antigen-binding polypeptide to the tissue of interest. Alternatively, a composition can be applied topically to the tissue of interest (e.g., injected, or pumped as a continuous infusion, or as a bolus within a tissue, applied to all or a portion of the surface of the skin, etc.).

In an embodiment of the invention, the antigen-binding polypeptide is administered via oral, rectal, vaginal, topical, nasal, ophthalmic, transdermal, subcutaneous, intramuscular, intraperitoneal or intravenous routes of administration. The route of administration of the pharmaceutical composition will depend on the disease or condition to be treated. Suitable routes of administration include, but are not limited to, parenteral injections, e.g., intradermal, intravenous, intramuscular, intralesional, subcutaneous, intrathecal, and any other mode of injection as known in the art. Although the bioavailability of antigen-binding polypeptides administered by other routes can be lower than when administered via parenteral injection, by using appropriate formulations it is envisaged that it will be possible to administer the compositions of the invention via transdermal, oral, rectal, vaginal, topical, nasal, inhalation and ocular modes of treatment. In addition, it may be desirable to introduce the pharmaceutical compositions of the invention by any suitable route, including intraventricular and intrathecal injection; intraventricular injection may be facilitated by an intraventricular catheter, for example, attached to a reservoir.

For topical application, the antigen-binding polypeptide of the present invention, or analog thereof, can be combined with a pharmaceutically acceptable carrier, an imaging agent, and one or more therapeutic agents, so that an effective dosage is delivered, based on the desired activity. The carrier can be in the form of, for example, and not by way of limitation, an ointment, cream, gel, paste, foam, aerosol, suppository, pad or gelled stick.

For oral applications, the pharmaceutical composition may be in the form of tablets or capsules, which can contain any of the following ingredients, or compounds of a similar nature: a binder such as microcrystalline cellulose, gum tragacanth or gelatin; an excipient such as starch or lactose; a disintegrating agent such as alginic acid, Primogel, or corn starch; a lubricant such as magnesium stearate; or a glidant such as colloidal silicon dioxide. When the dosage unit form is a capsule, it can contain, in addition to materials of the above type, a liquid carrier such as fatty oil. In addition, dosage unit forms can contain various other materials which modify the physical form of the dosage unit, for example, coatings of sugar, shellac, or other enteric agents. The tablets of the invention can further be film coated.

For purposes of parenteral administration, solutions in sesame or peanut oil or in aqueous propylene glycol can be employed, as well as sterile aqueous solutions of the corresponding water-soluble salts. Such aqueous solutions may be suitably buffered, if necessary, and the liquid diluent first rendered isotonic with sufficient saline or glucose. These aqueous solutions are especially suitable for intravenous, intramuscular, subcutaneous and intraperitoneal injection purposes.

The compositions of the present invention are generally administered in the form of a pharmaceutical composition comprising the antigen-binding polypeptide of this invention together with a pharmaceutically acceptable carrier or diluent. Thus, the compositions of this invention can be administered either individually or together in any conventional oral, parenteral or transdermal dosage form.

Pharmaceutical compositions according to embodiments of the invention may contain 0.1%-95% of the antigen-binding polypeptide(s) of this invention and active/imaging agent(s), preferably 1%-70%. In any event, the composition or formulation to be administered may contain a quantity of antigen-binding polypeptide and active and/or imaging agents according to embodiments of the invention in an amount effective to treat or diagnose the condition or disease of the subject being administered.

The compositions also comprise preservatives, such as benzalkonium chloride and thimerosal and the like; chelating agents, such as EDTA sodium and others; buffers such as phosphate, citrate and acetate; tonicity agents such as sodium chloride, potassium chloride, glycerin, mannitol and others; antioxidants such as ascorbic acid, acetylcystine, sodium metabisulfote and others; aromatic agents; viscosity adjustors, such as polymers, including cellulose and derivatives thereof; and polyvinyl alcohol and acid and bases to adjust the pH of these aqueous compositions as needed. The compositions may also comprise local anesthetics or other actives.

In addition, the compositions may further comprise binders (e.g. acacia, cornstarch, gelatin, carbomer, ethyl cellulose, guar gum, hydroxypropyl cellulose, hydroxypropyl methyl cellulose, povidone), disintegrating agents (e.g. cornstarch, potato starch, alginic acid, silicon dioxide, croscarmellose sodium, crospovidone, guar gum, sodium starch glycolate), buffers (e.g., Tris-HCl, acetate, phosphate) of various pH and ionic strength, additives such as albumin or gelatin to prevent absorption to surfaces, detergents (e.g., Tween 20, Tween 80, Pluronic F68, bile acid salts), protease inhibitors, surfactants (e.g. sodium lauryl sulfate), permeation enhancers, solubilizing agents (e.g., glycerol, polyethylene glycerol), anti-oxidants (e.g., ascorbic acid, sodium metabisulfite, butylated hydroxyanisole), stabilizers (e.g. hydroxypropyl cellulose, hydroxypropylmethyl cellulose), viscosity increasing agents (e.g. carbomer, colloidal silicon dioxide, ethyl cellulose, guar gum), sweeteners (e.g. aspartame, citric acid), preservatives (e.g., Thimerosal, benzyl alcohol, parabens), lubricants (e.g. stearic acid, magnesium stearate, polyethylene glycol, sodium lauryl sulfate), flow-aids (e.g. colloidal silicon dioxide), plasticizers (e.g. diethyl phthalate, triethyl citrate), emulsifiers (e.g. carbomer, hydroxypropyl cellulose, sodium lauryl sulfate), polymer coatings (e.g., poloxamers or poloxamines), coating and film forming agents (e.g. ethyl cellulose, acrylates, polymethacrylates) and/or adjuvants.

The antigen-binding polypeptide of the present invention or analog thereof can be delivered in a controlled release system. Thus, an infusion pump can be used to administer the antigen-binding polypeptide such as the one that is used, for example, for delivering insulin or chemotherapy to specific organs or tumors. In one embodiment, the antigen-binding polypeptide of the invention is administered in combination with a biodegradable, biocompatible polymeric implant, which releases the antigen-binding polypeptide over a controlled period of time at a selected site. Examples of preferred polymeric materials include, but are not limited to, polyanhydrides, polyorthoesters, polyglycolic acid, polylactic acid, polyethylene vinyl acetate, copolymers and blends thereof (See, Medical applications of controlled release, Langer and Wise (eds.), 1974, CRC Pres., Boca Raton, Fla., the contents of which are hereby incorporated by reference in their entirety). In yet another embodiment, a controlled release system can be placed in proximity to a therapeutic target, thus requiring only a fraction of the systemic dose.

In one embodiment, compositions of the present invention are presented in a pack or dispenser device, such as an FDA approved kit, which contain one or more unit dosage forms containing the active ingredient. In one embodiment, the pack or dispenser device is accompanied by instructions for administration.

In one embodiment, it will be appreciated that the antigen-binding polypeptide of the present invention can be provided to the individual with active agents to achieve an improved therapeutic effect as compared to treatment without a targeting agent. In another embodiment, measures (e.g., dosing and selection of the complementary agent) are taken to adverse side effects which are associated with combination therapies.

A "therapeutically effective amount" of the active agent and the antigen-binding polypeptide is the amount sufficient to provide a beneficial effect to the subject to which the composition is administered. More specifically, a therapeutically effective amount means an amount of the active agent and the antigen-binding polypeptide effective to prevent, alleviate or ameliorate tissue damage or symptoms of a disease of the subject being treated.

In some embodiments, preparation of effective amount or dose can be estimated initially from in vitro assays. In one embodiment, a dose can be formulated in animal models and such information can be used to more accurately determine useful doses in humans.

In one embodiment, toxicity and therapeutic efficacy of the active/targeting agents described herein can be determined by standard pharmaceutical procedures in vitro, in cell cultures or experimental animals. In one embodiment, the data obtained from these in vitro and cell culture assays and animal studies can be used in formulating a range of dosage for use in human. In one embodiment, the dosages vary depending upon the dosage form employed and the route of administration utilized. In one embodiment, the exact formulation, route of administration and dosage can be chosen by the individual physician in view of the patient's condition. [See e.g., Fingl, et al., (1975) "The Pharmacological Basis of Therapeutics", Ch. 1 p. 1].

In one embodiment, depending on the severity and responsiveness of the condition to be treated, dosing can be of a single or a plurality of administrations, with course of treatment lasting from several days to several weeks or until cure is effected or diminution of the disease state is achieved. In one embodiment, the amount of a composition to be administered will, of course, be dependent on the subject being treated, the severity of the affliction, the manner of administration, the judgment of the prescribing physician, etc. In one embodiment, compositions including the preparation of the present invention formulated in a compatible pharmaceutical carrier are also prepared, placed in an appropriate container, and labeled for treatment of an indicated condition.

General

As used herein the term "about" refers to ±10%.

The terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Generally, the nomenclature used herein, and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N.Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Strategies for Protein Purification and Characterization—A Laboratory Course Manual" CSHL Press (1996).

Reference is now made to the following examples which, together with the above descriptions, illustrate the invention in a non-limiting fashion.

Materials and Methods

Animal Procedures

All animal experiments were approved by the Ethical Committee for Animal Experiments of Israel (authorization numbers 11-220-6 and 48-07-2012 for camel and mouse procedures, respectively). Extensive efforts were made to minimize the number and suffering of animals used in this study.

Generation and Purification of Anti PSMA NBs

The protocol for NB generation was adapted from Pardon et al. and Vincke et al. Briefly, a camel (Camelus dromedarius) was immunized seven times, with two weeks between successive injections, with 1 mg of the purified extracellular domain of PSMA [residues 44-750; purchased from Caltech Protein Expression Center, CA]. The RNA from camel lymphocytes was then isolated and converted to DNA, and the DNA encoding for variable heavy homodimer (VHH) was amplified and ligated to a pMECS vector. This DNA library was transformed to TG1 Escherichia coli competent cells and the resulting library ($10^7$ clones) was subjected to selection using phage display through infection with an M13 helper phage. After two rounds of panning against PSMA, 47 bacterial colonies were individually evaluated for PSMA binding using ELISA, and then sequenced (NIBN sequencing laboratory, Ben-Gurion University of the Negev, Israel). The DNA encoding for the four selected NBs (NB7, NB8, NB13, and NB37), and for NB7 with an added cysteine in the C-terminus (NB7cys), was transformed to WK6 E. coli. The bacteria were grown a TB medium (17 mM $KH_2PO_4$, 94 mM $K_2HPO_4$, 12 g/l peptone, 24 g/l yeast extract, 0.4% glycerol) at 37° C. and 250 rpm, until they reached $OD_{600}$=0.5. Then, 1 mM of IPTG was added to the medium and the temperature was adjusted to 28° C. overnight, followed by a periplasmic extraction using 12 ml of TES buffer (500 mM sucrose, 200 mM Tris-HCl, 0.5 mM EDTA, pH 8) for 3 h, and then using 24 ml of TES buffer (diluted 1:4) overnight. The NBs were further purified using affinity chromatography on Ni-NTA gravitational beads (Invitrogen, CA). The eluted fraction was subjected to FPLC purification using a Superdex 75 16/600 column (GE Healthcare, MA). The size and purity of the proteins was evaluated by using SDS-PAGE gel electrophoresis and mass spectrometry, confirming the expected size of ~16 kDa and >95% purity.

Surface Plasmon Resonance Binding Assay

The affinity of each NB to PSMA was determined by using surface plasmon resonance (SPR) spectroscopy on a ProteOn XPR36 chip (Bio-Rad, CA). The chip was activated by using sulfo-NHS (0.1 M N-hydroxysuccinimide) and EDC [0.4 M 1-ethyl-3-(3-dimethylaminopropyl)-carbodiimide]. Each NB (0.2 µg) was immobilized in a 10 mM sodium acetate buffer, pH 5.0, at a flow rate of 30 µl/min. Bovine serum albumin (BSA) (3 µg) was immobilized on the chip as a negative control. Unbound esters were deactivated with 1 M ethanolamine HCl at pH 8.5. The soluble PSMA was then applied over the chip at concentrations of 2.94, 5.88, 11.75, 23.50, or 47.00 nM (for NBs 8, 13, and 37) or of 25, 50, 100, 1,600, or 3,200 pM (for NB7), at a flow rate of 25 µl/min. During this time, the association between the NBs and PSMA was measured. The dissociation was measured while flowing 50 µl/min PBST (namely, a phosphate-buffered saline with 0.005% Tween). For each protein complex, a binding sensogram was generated by subtracting the values of the PSMA response to BSA from those of the PSMA response to the NBs. The dissociation constant ($K_D$) was determined from the Langmuir 1:1 kinetic model. The temperature throughout the binding measurements was set at 25° C.

PSMA Activity Assay

The enzymatic N-acetylated-alpha-linked-acidic dipeptidase (NAALADase) activity of PSMA was determined by using the assay protocol suggested by R&D systems for recombinant PSMA. Briefly, PSMA was diluted to 0.4 µg/ml and an Ac-Asp-Glu substrate (Sigma Aldrich) was diluted to 40 µM in 50 mM HEPES, 0.1 M NaCl, pH 7.5. A working solution was generated by combining 125 µl of the PSMA and substrate solutions. For a negative control, the PSMA was deactivated by thermal denaturation. As a control for inhibition, 0.5 nM of a commercial PSMA inhibitor (PMPA, Tocris, Israel) was added to the solution containing the PSMA and the substrate. NB7, NB8, NB13, and NB37 (100 nM each) were added to this solution and incubated for 1 h at 37° C. and then for 5 min at 95° C. Next, 250 µl of 15 mM phthaldialdehyde (Sigma Aldrich) in 0.2 M NaOH and 0.1% beta-mercaptoethanol were added to each sample. The samples were incubated at room temperature for 10 min and their fluorescence was measured (excitation: 330 nm, emission: 450 nm). The fluorescence value of the untreated PSMA sample was set as 1, and all other samples were normalized accordingly.

Cell Binding Assay

PC3-PIP (PSMA-positive, $PSMA^+$) cells and PC3-flu (PSMA-negative, $PSMA^-$) cells were grown in RPMI 1640 medium supplemented with 10% fetal bovine serum (FBS), L-glutamine, penicillin, and streptomycin (Biological Industries, Israel). Once the cells reached 70% confluence, $10^5$ cells were added to each well of 96-well U-shaped bottom plates (Greiner Bio-One, Austria), centrifuged at 150 g for 5 min, and washed with PBSA (namely, PBS+1 g/l BSA). NBs were added to the cells in concentrations of 0.1, 0.5, 2, 5, 10, 20, 50, 100, 500, or 1000 nM. The cells were incubated with the NBs for 2 h, followed by three PBSA washing steps. An anti-His antibody conjugated to fluorescein isothiocyanate (FITC) (Invitrogen) was then added at a dilution of 1:100, incubated with the cells for 1 h, and washed three times with PBSA. The cells were kept on ice throughout the experiment. The fluorescence of each sample was measured using an Accuri C6 flow cytometry analyzer (BD Biosciences, CA). Each experimental condition was repeated three times. To generate a titration curve, the value for each sample was determined using the equation:

$$\frac{F_{sample} - F_{low}}{F_{high} - F_{low}}, \quad [1]$$

where $F_{sample}$ is the mean fluorescence value, $F_{low}$ is the fluorescence at the lowest concentration for PC3-PIP cells, and $F_{high}$ is the fluorescence at the highest concentration for PC3-PIP cells. A binding curve was generated using GraphPad Prism 5.0.

Protein Crystallization, Data Collection, Structure Determination, and Refinement NB7, NB8, and NB37 (5 mg/ml) were mixed at a 1:1 (v/v) ratio with a reservoir solution and crystallized, at room temperature, by the sitting-drop vapor diffusion method over a reservoir containing either 1.7 M ammonium sulfate and 6.57% 2-propanol (for NB7); 0.1 M trisodium citrate, pH 3.5, and 3 M NaCl (for NB8); or 0.1 M trisodium citrate, pH 3.5, and 25% polyethylene glycol 3350 (for NB37). The crystals were then harvested, cryo-protected, and flash-cooled in liquid nitrogen. X-ray diffraction (XRD) data were collected at beamline ID30B of the European Synchrotron Radiation Facility (ESRF, Grenoble, France). Data were collected at 100 K from one crystal of each NB that diffracted to a maximum resolution of 1.5 Å for NB8 and NB37 and of 2.65 Å for NB7. The NB7 crystal belongs to the space group P21, with unit cell dimensions of a 53.563, b 171.716, and c 83.479, and it contains eight copies of the protein in the asymmetric unit. The NB8 crystal belongs to the space group I222, with unit cell dimensions of a 55.945, b 68.857, and c 75.647, and it contains one copy of the protein in the asymmetric unit. The NB37 crystal belongs to the space group I222, with unit cell dimensions of a 55.949, b 69.087, and c 75.869, and it contains one copy of the protein in the asymmetric unit. X-ray data were merged and scaled using XDS and solved by molecular replacement using Phaser in CCP4. Protein Data Bank (PDB) ID: 5M7Q was used as a search model. Refinement included alternating cycles of manual rebuilding in COOT and automated refinement using Phenix. The coordinates and structure factors were submitted to the PDB under the accession codes 6XXN (NB7), 6XXO (NB8), and 6XXP (NB37).

Small-Angle X-Ray Scattering, Analysis, and Three-Dimensional Structure Reconstruction The small-angle X-ray scattering (SAXS) of monomeric PSMA was measured in PBS at a final concentration of 0.5-3 mg/ml. For PSMA-NB complex samples, the concentration of PSMA was 0.5 mg/ml and the concentrations of the NBs were 0.1-0.5 mg/ml. Measurements were performed in beamline BM29 at the ESRF. The X-ray wavelength was 1.5 Å and the temperature was 4° C. The detector was Pilatus 1 M and the sample-to-detector distance was set at 2.86 m, with a scattering vector (q) range of 0.0025-0.5 Å$^{-1}$. At a scattering angle of 2θ, the magnitude of the scattering vector (q) is defined as:

$$q = \frac{4\pi \sin\theta}{\lambda} \quad [2]$$

The experimental SAXS data for all samples were linear in the low q, Guinier region. The radii of gyration ($R_g$) were derived from data in the $qR_g$<1 region by using the Guinier approximation:

$$I(q) = I(0)\exp\frac{R_g^2 q^2}{3} \quad [3]$$

The inventors analyzed the small-angle region (0.012<q<0.08 Å$^{-1}$) of the scattering profiles using the Guinier approximation embedded in the GNOM method.

The scattering curve reflects structural characteristics in reciprocal space. Scattering profiles were translated into real space by Fourier transformation, resulting in the pairwise-distance distribution function P(r). This function reflects the distances between pairs of scattering points within the macromolecule, allowing the determination of the maximum dimension of the particle ($D_{max}$). To obtain a reliable quantification of $D_{max}$, the inventors incorporated GNOM with in-house scripts. The $R_g$ of monomeric PSMA extracted from SAXS data was compared to the calculated $R_g$ from the crystal structure of monomeric PSMA (PDB 3D7D) using CRYSOL. The overall three-dimensional ab initio models of PSMA and PSMA-NB complexes were restored from the experimental scattering data by using Dammin. Shape reconstruction was performed to represent the molecular shape as a closely packed sphere assembly within a search volume defined by $D_{max}$, chosen with a $\chi^2 < 1.3$ for all models. For all samples, 20 low-resolution models were averaged using the program DAMAVER to yield an averaged model representing the general structural features of each reconstruction.

Computational Analysis of Binding Epitopes

The protein crystal structure of PSMA was selected for the docking procedure (PDB 1Z8L). NB37 (PDB 6XXP) and NB7 (PDB 6XXN) were docked to a monomer form and to a homodimer form of the PSMA crystal structure by using Discovery Studio 4.5 (Biovia, Dassault Systems, San Diego, CA) with ZDOCK. The ZRANK method was then used to quickly and accurately re-rank the docked protein complexes predicted by ZDOCK. For each docking simulation, the final top 2000 complexes of docking solution orientations were clustered into groups. Classification was based on the spatial proximities of the solution, using a maximal ligand interface RMSD cutoff of 6 Å from the cluster center and an interface cutoff of 9 Å, which defines the interface region between PSMA and the NB, to obtain better defined clusters. This process allowed us to select the most promising docking solutions for further analysis. The geometry of the selected docking solution was optimized by using an energy minimization protocol and the Biovia Smart Minimizer algorithm. For the selected minimized solution, the binding interface between two protein domains was identified and the interactions between the domains were calculated. The interface residues—namely, residues whose solvent-accessible surface area is different when the proteins are in a complex versus isolated—were identified and the types of interaction (hydrogen bonds, electrostatic and hydrophobic interactions, etc.) were determined. Prior to docking all proteins, PSMA and the NB s were subjected to the Prepare Protein protocol, which corrects the enumeration of hydrogens by using either standard or predicted pKa values for Asp, Glu, Arg, Lys, His, Tyr, Cys, and the N-termini and C-termini of each chain, which are titratable. The outcomes of using this protocol are the preferred hydrogen representations and protonation states of chain termini and side-chains.

In Vivo Optical Imaging

Tumor xenografts were generated in 6-week old male athymic nude mice by using PC3-PIP and PC3-flu cells. Each mouse was simultaneously injected subcutaneously with $2 \times 10^6$ cells of each line, diluted 1:1 with Matrigel (Corning, USA); PC3-PIP cells were injected above the right upper flank, while PC3-flu cells were injected above the left one. Nine days after the inoculation, as the tumors reached a size of ~200 mm$^3$, these mice were injected intravenously with 1.5 nmole of either NB7, NB8, NB13, or NB37 (four mice per group) labeled with NHS-ester AlexaFluor680 (Invitrogen). In addition to these 16 mice, four tumor-bearing mice were not injected with any NB, while four other mice were injected with the labeled NBs (a different NB per mouse) but were not implanted with a xenograft. The mice were anesthetized with isoflurane at different time points (see below) and the distribution of the fluorescently labeled protein was measured in near infra-red (NIR) optical imaging using the IVIS Lumina system (PerkinElmer, USA). Exposure time was set at 1 s. The fluorescence signal was measured at the time of injection, and 0.5, 1, 2, 3, 6, 10, 18, 24, 28, 32, 36, 48 and 56 h after injection. Images of the mice were acquired 3 and 6 h after injection, and again when a signal was no longer detected (24-56 h after injection). At each time point, one mouse from each group of tumor-bearing mice that had been injected with a NB was euthanized for an ex vivo quantification of the fluorescent signal in its organs, using the Living Image software.

DOX Conjugation to NB7cys

Figure 16A:
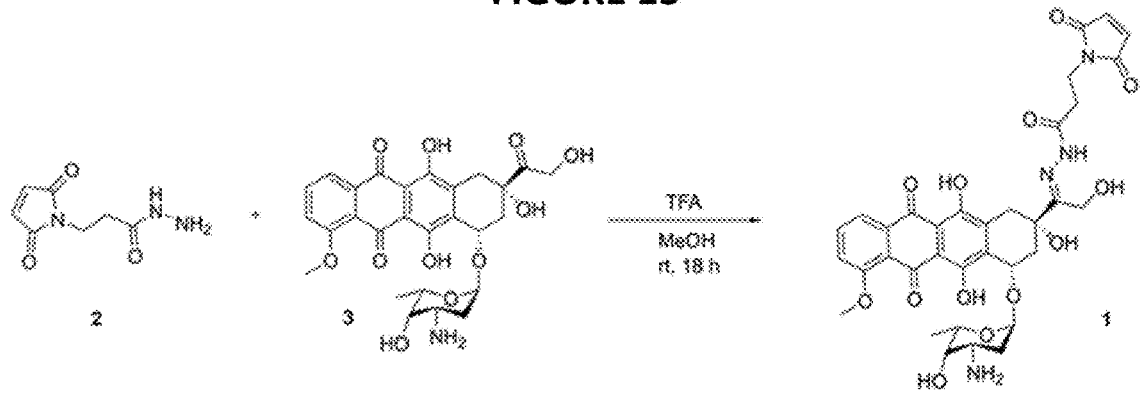
FIGS. 16A-16D include an illustration of a process and graphs showing the conjugation of NB7cys to DOX. (16A) The conjugation process. (16B) Size-exclusion chromatography for NB7cysDOX, analyzed using Superdex 75 10/300. "1" and "2" designate absorbance in 280 nm and 488 nm, respectively. (16C) Mass-spectrometry of NB7cys (1) and NB7cysDOX (2), analyzed using matrix-assisted laser desorption/ionization time-of-flight (MALDI-TOF). (16D) Flow cytometry binding of NB7cys and NB7cysDOX to PC3-PIP cells at the indicated concentrations. The experiment was performed in triplicate, and the results indicate means±SEM. A Student's t-test indicated that there were no significant differences between NB7 and NB7cysDOX at any of the examined concentrations.

The doxorubicin conjugate (presented in FIG. 16) (1) was synthesized according to standard procedures (FIG. 16A). N-(β-maleimidopropionic acid) hydrazide trifluoroacetic acid salt (2, 39 mg, 0.13 mmol) was added to a solution of doxorubicin hydrochloride (DOX, 3, 29 mg, 0.05 mmol) in 10 ml of anhydrous methanol. Trifluoroacetic acid (3 µl) was added to the reaction mixture, which was then stirred at room temperature for 18 h in the dark. The reaction mixture was concentrated to a volume of 1 ml and added dropwise to acetonitrile (20 ml) while stirring. The resulting solution was allowed to stand at 4° C. for at least 24 h. The final product (1) was isolated by centrifugation, washed with fresh 1:10 methanol/acetonitrile solution, and dried under vacuum to yield 1, 25 mg, 71% yield. $^1$H-NMR (DMSO-d$_6$) δ=10.46 (s, 1H), 7.94-7.92 (m, 2H), 7.67 (dd, J=7.4 and 3.4 Hz, 1H), 6.87 (s, 2H), 5.78 (t, J=4.9 Hz, 1H), 5.51 (s, 1H), 5.40 (d, J=3.9 Hz, 1H), 5.26 (d, J=2.0 Hz, 1H), 4.91 (t, J=7.8 Hz, 1H), 4.40 (t, J=4.4 Hz, 2H), 3.99 (s, 4H), 2.73 (d, J=15.6 Hz, 1H), 2.34-2.24 (m, 2H), 2.15-2.10 (m, 2H), 1.88-1.81 (m, 2H), 1.71-1.66 (m, 2H), 1.14 (d, J=6.8 Hz, 3H) ppm (FIG. S11). MS (ESI) calculated for $C_{34}H_{37}N_4O_{13}$ [M+H]$^+$: 709.23; observed: 709.14. Using maleimide-based chemistry, NB7cys was then conjugated to 1 at a molar ratio of 1:20 (24 h at 4° C.). NB7cysDOX was separated from the unconjugated NB7cys by FPLC using Superdex 75 10/300 (GE healthcare, MA). The conjugation of DOX to the protein was verified based on absorbance at 488 nm during the FPLC run and by mass spectrometry.

Confocal Imaging

The NBs were labeled at a 1:3 molar ratio with Dylight 488 NHS-ester (Thermo Scientific, IL). Phycoerythrin (PE)-anti PSMA antibody (BioLegend, CA) and Hoechst 33342 (Invitrogen) were incubated for 15 min with $3 \times 10^4$ PC3-PIP or PC3-flu cells, which were grown overnight in an 8-well µ-slide (ibidi GmbH, Germany) in the presence or absence of 100 nM of a labeled NB. NB7cys and NB7cysDOX were labeled at a 1:3 molar ratio with Dylight 650 NETS-ester. Hoechst 33342 and 1.5 µg/ml DOX (Teva, Israel) or an equivalent molar amount of labeled NB7cys or labeled NB7cysDOX were incubated with PC3-PIP and PC3-flu cells, grown as described above. The cells were imaged with an Olympus FV1000 confocal microscope (Olympus, Japan), with a long-working distance ×60/1.35 numerical aperture, oil-immersion objective.

Time-Dependent Quantification of NB Internalization

NB7, NB8, NB13, and NB37, each labeled with Dylight488, were individually incubated for 1 h (at 100 nM) in a 96-well plate. On each well, $1.5 \times 10^4$ PC3-PIP cells were seeded and grown overnight, and then the wells were imaged every 40 min for a total of 16 h, using the Operetta CLS high-content analysis system (Perkin Elmer). Each well was imaged as 24 fields, which were later combined to create an image of the entire well. Using the Operetta analysis software, the cells were qualitatively classified into two groups according to the distribution of NBs: (i) mostly on the cell membrane, and (ii) mostly inside the cytoplasm. The number of cells in each group was quantified at each time point and the ratio between the numbers of cells in each group was calculated.

Cell Quantification Assay

PC3-PIP cells ($5 \times 10^4$) were seeded in 24-well plates. After the cells were attached to the plate, they were either left untreated or were treated with DOX (1.5 µg/ml) or an equivalent molar amount of NB7cys or NB7cysDOX. After 24 h of treatment, the number of cells in each well was counted using the Countess II automated cell counter (Invitrogen).

Cell Viability Assay

PC3-PIP cells were grown and treated as described in the cell quantification assay section, above. The cells were harvested, incubated with 0.5 µg propidium iodide (PI; Biolegend), and their fluorescence intensity was measured in a BD C6 flow cytometer.

Mitochondrial Potential Assay

PC3-PIP cells ($2 \times 10^4$) were seeded on 96-well plates. After the cells adhered to the plate, they were treated with either 1.5 µg/ml DOX or an equivalent molar amount of NB7cys or NB7cysDOX, or they were left untreated as a control. After 24 h, tetramethylrhodamine ethyl ester (TMRE; Abcam, UK) was added according to the protocol provided by the manufacturer. Fluorescence intensity was measured at an excitation wavelength of 549 nm and an emission wavelength of 575 nm. Carbonyl cyanide 4-(trifluorornethoxy) phenythydrazone (FCCP) served as a negative control, used according to the manufacturer's protocol.

In Vivo Tumor Growth Inhibition

PC3-PIP xenografts were grown in athymic nude mice, as described in the in vivo optical imaging section, above. When the average tumor size reached 200 mm³, the mice were divided into three groups (controlled for average tumor size), each subjected to a different treatment: 150 µl saline (n=7), 2 mg/kg DOX (n=8), or 1.4 mg/kg (~40 µg) NB7cysDOX (n=8). The treatment was administered to the tail vein twice a week for three consecutive weeks. At each sample point, the tumor volume was calculated ($V = 0.5 \times L \times W \times H$), as previously described (Tomayko and Reynolds, 1989). A mouse was euthanized when tumor volume reached 1,500 mm³ or when its physical condition deteriorated, according to the guidelines of the Committee for the Ethical Care and Use of Animals in Research at BGU. The estimated tumor volume prior to euthanasia and the rate-based T/C were determined as described previously (Aston et al., 2017).

Histology

Four days following the final dose of each treatment in the in vivo tumor growth inhibition assay, the mice were euthanized, and their xenografts were fixated in 4% formaldehyde and embedded in paraffin. Tumor sections (5 µm thickness) were subjected to hematoxylin and eosin (H&E) staining, TUNEL assay, and immunofluorescence (IF), as previously described (Pittala et al., 2018, Fischer et al., 2008). For IF, anti-PSMA conjugated to PE and anti-HIS conjugated to FITC were used to detect PSMA and NB7cysDOX, respectively. 4',6-diamidino-2-phenylindole (DAPI) was used for nuclei staining. H&E-stained sections were visualized using a panoramic MIDI II scanner (3DHISTECH Kft., Hungary). TUNEL, PI, and IF were visualized in a confocal microscope.

Incorporation of Non-Natural Amino Acids

First, the inventors changed the TAG stop codon in the 3' of NB7 gene on pMECS to TAA. Then, the inventors mutated 5 different AA positions into TAG: A14, A40, G42, K43 and A75, so that each NB7 gene contains one of these stop codon options. The inventors co-transformed pMECS, containing the mutated NB7 genes, and pEVOL into WK6 bacteria. All five mutants were grown for small-scale purification at 37° C. until they reached OD0.5, induced with IPTG and the temperature was set at 28° C. for O.N. The bacteria were provided BOC-lysine in their media. Then, 1 ml of bacteria from each culture, as well as a GFP positive control, were collected, centrifuged and resuspended with 100 µl PBS. The bacteria were boiled at 95° C. for 5 minutes, pelletized and the supernatant, containing the NB s was collected. Twenty five (25) µl of the supernatant were collected for WB, using mouse anti-His followed by HRP-anti mouse Ab, and were developed using EZ-ECL kit. K43 mutant was chosen for large-scale purification as it showed good expression, and the inventors hypothesized that changing lysine (K) to PrK is not likely to compromise the stability and activity of the protein. SEC and MS chromatograms confirmed that the addition to the Mw of NB7 following the addition of PrK correlated with the theoretical Mw. Binding of NB7 and NB7 K43PrK to PC3-PIP cells was determined using FACS and revealed no significant change in binding following the K43PrK mutation.

A Similar procedure was performed on NB7cys. Two positions showed detectable levels of NB7cysBOC-lysine in WB, but no protein was detected in large scale purifications of NB7cysK43PrK.

Statistical Analyses

Unless indicated otherwise, each experiment was performed in triplicate and the results indicate means±SEM. Statistical significance was determined using Student's t-test.

Example 1

Isolation of Anti-PSMA NBs

RNA extracted from the lymphocytes of a PSMA-injected camel served as the basis for a NB phage-display library in the size of 107 variants. The phage-display panning process against PSMA yielded 47 bacterial colonies that express NB variants, wherein 32 unique NB sequences were identified. Of these, four NBs whose sequences repeated several times, and which showed the strongest binding to PSMA in ELISA, were chosen for purification (FIGS. 7A-7B). The purified NBs—termed NB7, NB8, NB13, and NB37—were of the expected size of ~16 kDa (FIG. 7C), and the yield was 4-18 mg/l culture.

Example 2

NBs Bind to PSMA with a Pico- to Nano-Molar Affinity

SPR revealed that the in vitro binding affinity of the four purified NBs to PSMA was in the pico- to nanomolar range but varied considerably between the NBs (Table 1, and FIGS. 1A-1D).

TABLE 1

Kinetic binding constants for the interaction between PSMA and the NBs, as measured by SPR.

| NB | $K_{on}$ [M$^{-1}$s$^{-1}$] | $K_{off}$ [s$^{-1}$] | $K_D$ [nM] |
|---|---|---|---|
| NB7  | $7.1 \times 10^5 \pm 4.5 \times 10^2$ | $3.9 \times 10^{-5} \pm 2.8 \times 10^{-7}$ | 0.055 |
| NB8  | $2.0 \times 10^4 \pm 4.2 \times 10^1$ | $1.2 \times 10^{-4} \pm 5.3 \times 10^{-7}$ | 6.0 |
| NB13 | $3.6 \times 10^4 \pm 8.9 \times 10^1$ | $2.2 \times 10^{-5} \pm 9.9 \times 10^{-7}$ | 0.60 |
| NB37 | $2.2 \times 10^4 \pm 5.3 \times 10^1$ | $7.5 \times 10^{-5} \pm 6.6 \times 10^{-7}$ | 3.4 |

Values represent means ± SD.

Figure 8:
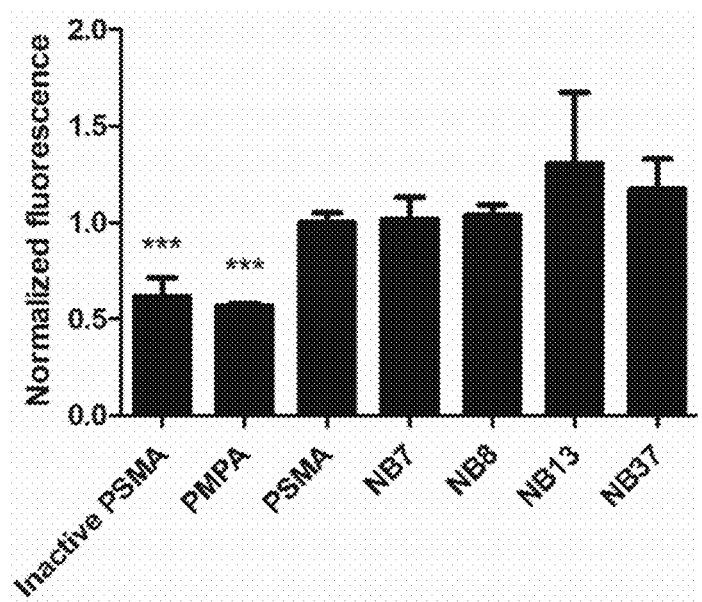
FIG. 8 includes a vertical bar graph showing PSMA activity assay. PSMA was incubated with a substrate in the presence or absence of NBs to measure glutamate carboxypeptidase activity. An inactive (denatured) PSMA and a commercial PSMA inhibitor (PMPA) served as controls. Results were compared and normalized to the fluorescence of untreated PSMA. The experiment was performed in triplicate, and results are presented as means±SEM. ***$p<0.005$ (Student's t-test, n=3).

FACS-based titration curves showed that all four NBs bind to PC3-PIP (PSMA+) prostate cancer cells in a dose-dependent manner (FIG. 1E), but they do not bind to PC3-flu (PSMA−) cells (FIG. 1F). Notably, the FACS binding curves did not reach a plateau, presumably because the NBs were internalized into the cells (see below); therefore, this dataset was not used to calculate the KD values. An enzymatic activity assay revealed that the NBs do not compromise the enzymatic NAALADase activity of PSMA (FIG. 8), suggesting that they bind to non-functional epitopes of the protein.

Example 3

NB Structures and their PSMA Binding Epitopes

Figure 9A:
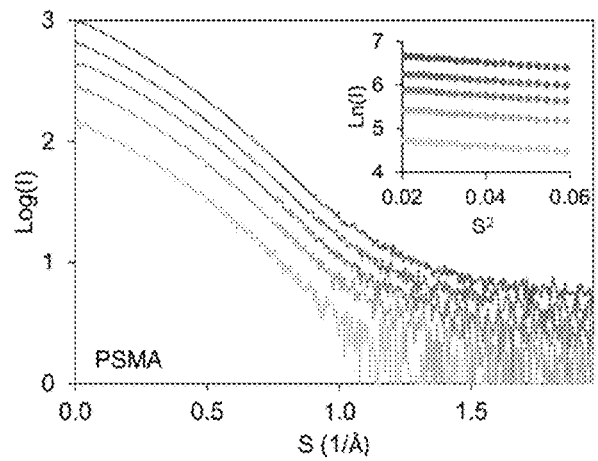
FIGS. 9A-9B include small angle X-ray scattering (SAXS) analysis and the $R_g$ of the monomeric PSMA. (9A) SAXS analysis of PSMA in PBS (0.5-3 mg/ml). (9B) The radius of gyration ($R_g$) values for free PSMA increases slightly with higher concentrations due to the interaction between species in the solution. The $R_g$ values, determined by using Guinier plots, are 43 Å at 0.5 mg/ml and 46 Å at 3 mg/ml. Colors in both panels reflect PSMA concentrations (darker=higher).
Figure 9B:
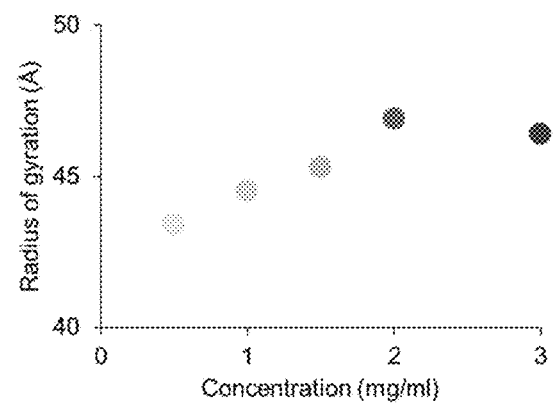
Figure 10A:
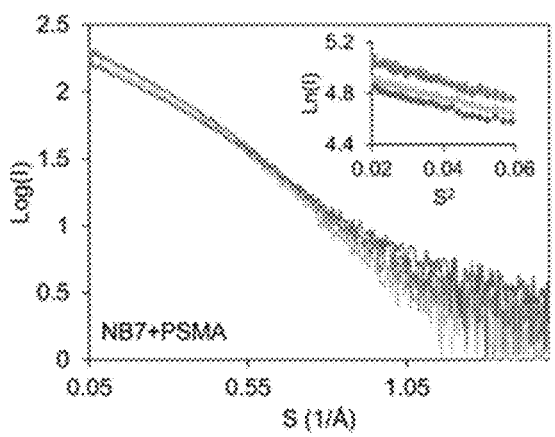
Figure 10B:
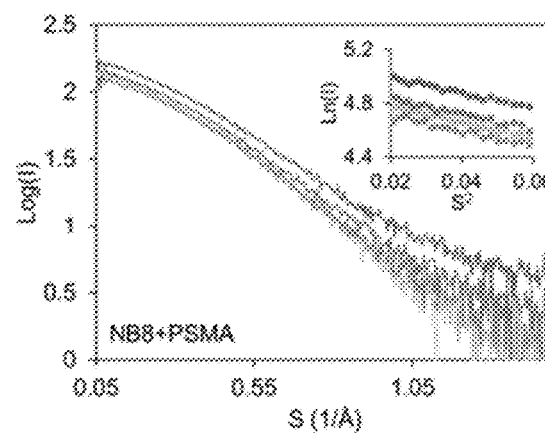
Figure 12D:
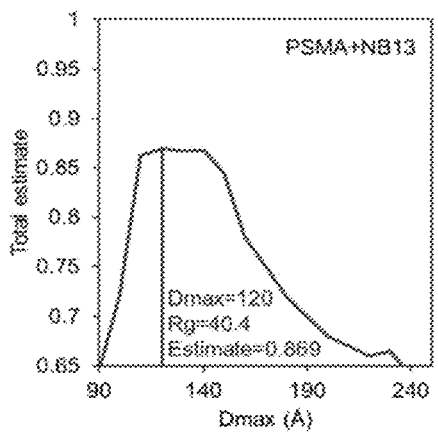
Figure 12E:
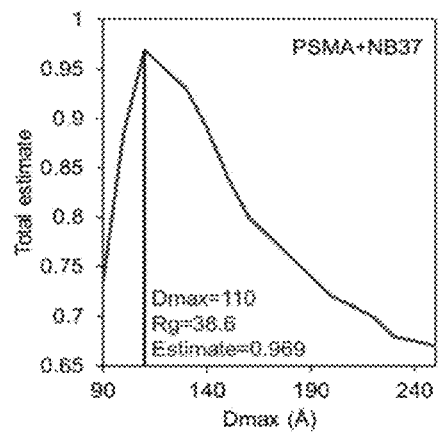
Figure 13:
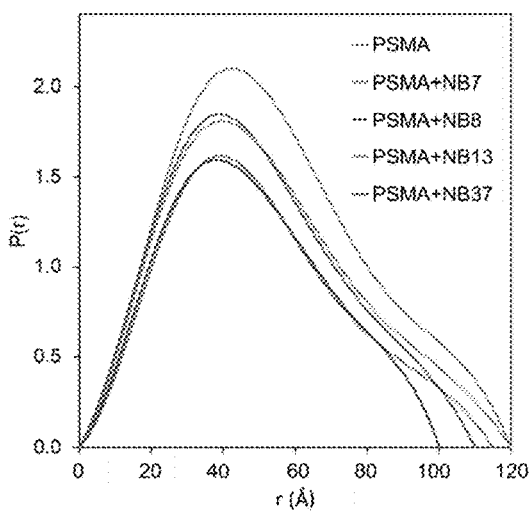
FIG. 13 includes a graph showing the distance distribution function, P(r), of PSMA and NBs at a molar ratio of 1:2. P(r) was determined using the program GNOM.
Figure 14C:
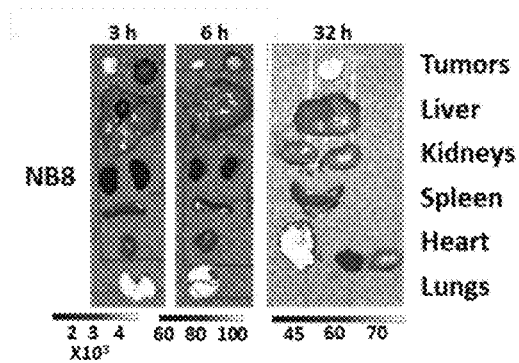
FIGS. 14A-14D include micrographs showing ex vivo optical imaging of prostate cancer xenografts. The ex-vivo signal is shown at three time points in various dissected organs of mice that were injected with either NB7 (14A), NB13 (14B), NB8 (14C), or NB37 (14D) (the data are shown in FIG. 3). Intensity bars are shown below the images of NB13 and apply to all images.
Figure 14A:
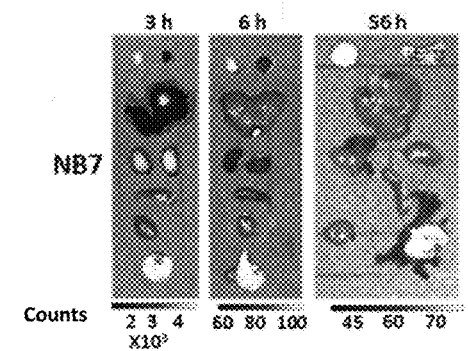
Figure 14B:
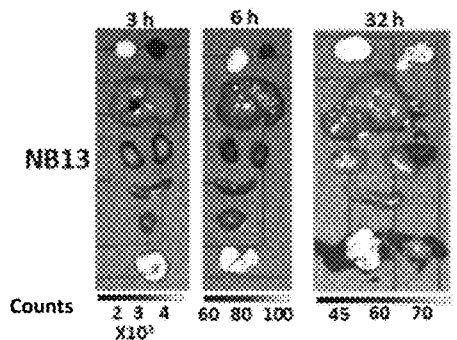
Figure 14D:
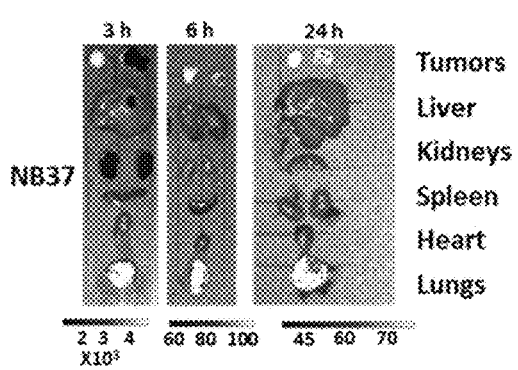

The considerable variability (up to 100-fold) in the $K_D$ values of the four NBs could stem from their potentially different PSMA-binding epitopes. To test this possibility, the crystal structures of NB7, NB8, and NB37 were solved at a resolution of 1.5 Å (NB8, NB37) or 2.65 Å (NB7) (FIGS. 2A-2C, and Tables 2-4); NB13 crystals could not be obtained under any of the attempted growth conditions. While the structures of NB8 and NB37 were very similar—in line with the high homology of their sequences, which differ in a single amino acid residue—the structure of NB7 was markedly different and included more β-sheets and fewer random regions. A SAXS analysis (FIG. 9) indicated that the monomeric PSMA is stable in PBS and shows concentration-dependent intermolecular interactions, suggesting that PSMA monomers interact with each other in the solution, which corroborates with the ability of PSMA to form dimers. Scattering curves of the monomeric PSMA in the presence of increasing NB concentrations show that the Guinier region ($S^2 \leq 0.006$ Å$^{-2}$) was linear, indicating little or no aggregation in any of the samples (FIG. 10). However, adding low concentrations of NB13 to PSMA, namely, at PSMA:NB13 ratios between 1:0.5 and 1:3, increased the radius of gyration ($R_g$) of PSMA (FIG. 11). The $R_g$ of the PSMA-NB complexes shifted from the original $R_g$ of PSMA (43 Å, FIG. 11) to a higher $R_g$ for NB7 and to a lower $R_g$ for NB8, NB13, and NB37. The $R_g$ of PSMA alone was comparable to the calculated $R_g$ value based on the crystal structure of the PSMA monomer. The distribution of pairwise distances within the particle (FIG. 12) is represented by P(r) (see Methods). The $D_{max}$ of the PSMA P(r) was 115 Å (FIG. 13), and the shape of the P(r) distribution indicates an elongated structure. The binding of PSMA to NB7 and to NB13 increased $D_{max}$, while its binding to NB8 and to NB37 decreased it (Table 5).

Figure 2F:
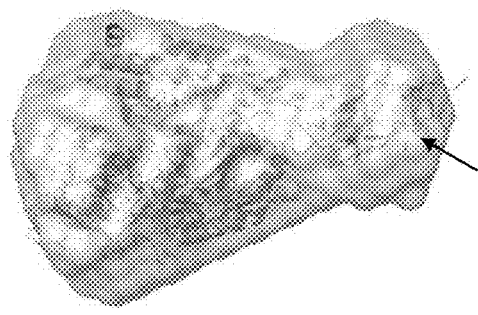
Figure 2E:
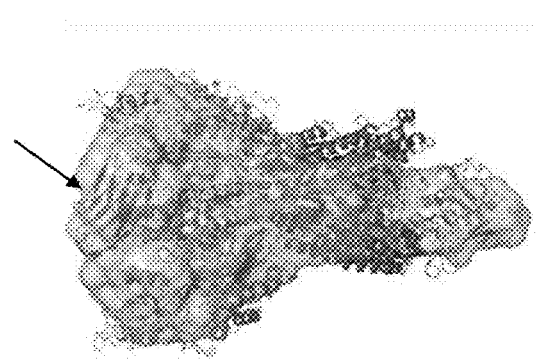
Figure 2D:
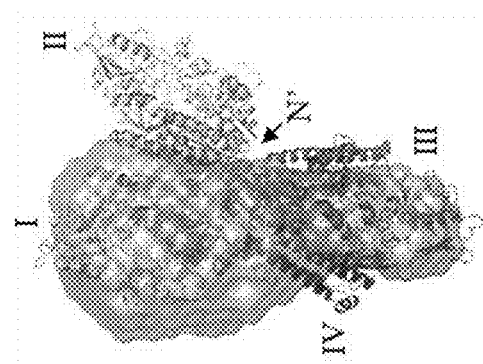

Next, the inventors calculated 20 reconstituted ab-initio models from the data that were averaged using DAMMIN and DAMAVER. The inventors used the crystal structures of PSMA, NB7, and NB37 and fit them to the reconstituted structures of a sample containing either PSMA alone (0.5 mg/ml) or PSMA (0.5 mg/ml) with NB7 or NB37 (0.2 mg/ml in each case) (FIGS. 2D-2F). The inventors assumed that the binding mechanism of NB8 is similar to that of NB37 due to their high sequence and structure homologies, and we did not generate a model of NB13 because we did not have its crystal structure.

The models suggested that PSMA forms a non-biological dimer with interactions between the N-termini of both monomers (FIG. 2D), similar to those observed in the tetrameric crystal structure of PSMA (PDB 1Z8L). The low-resolution structure is asymmetrical, such that one monomer appears to be smaller than the other; notably, however, this apparent asymmetry could have stemmed from the presence, in the solution, of both monomers and dimers, such that the average size could reflect the combined size of both species. The models suggested that, in the presence of NB7, another PSMA monomer is added to the dimer complex by forming a biological dimer with one of the PSMA monomers. According to this model, NB7 binds each monomer in the biological dimer with a different complementarity-determining region (CDR) (FIG. 2E), leading to an increase in the complex size and in $R_g$. In the case of the PSMA-NB37 complex, NB37 appears to bind to PSMA at the N-terminus (FIG. 2F), thus disrupting the non-biological dimer, leading to a decrease in $R_g$.

Example 4

Docking Analysis

Figure 2H:
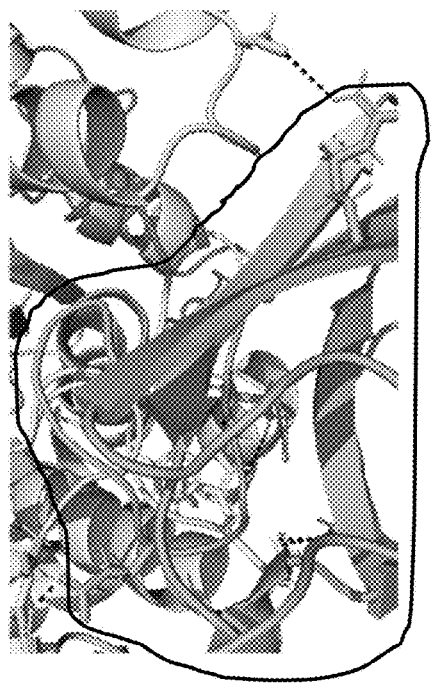
Figure 2G:
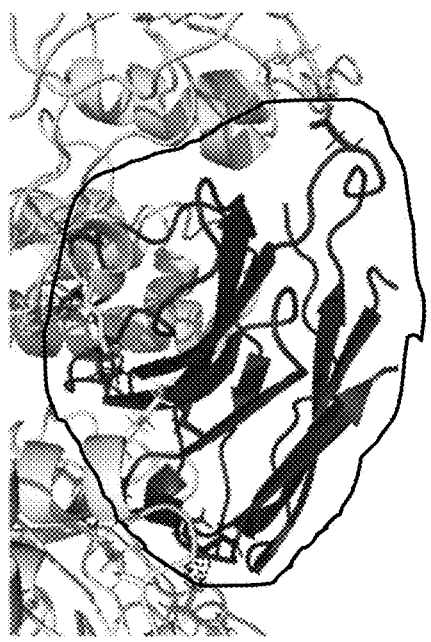

SAXS results and molecular docking simulation of NB7 (PDB 6XXN) with PSMA (PDB 1Z8L) revealed that NB7 binds to PSMA close to the dimerization interface and simultaneously interacts with both monomers (FIG. 2G, and FIG. 20). NB7 interacts with one PSMA monomer mainly via CDR3 and CDR1, while CDR2 and several non-CDR residues interact with the second monomer in the homodimer (the main contributing interactions are presented in FIG. 2G and are further detailed in FIG. 20). According to the docking simulation, NB37 (PDB 6XXP) binds to an epitope close to the N-terminus of PSMA (FIG. 2H, FIG. 21). The predicted interactions between NB37 and PSMA occur mainly via CDR2, and some occur via CDR3; the main contributing interactions are presented in FIG. 2H and are detailed further in FIG. 21. In total, NB7 has more interactions than NB37, as the ligand contact surface area of the former is 969.34 Å$^2$, as compared with 443.72 Å$^2$ of the latter (Table 8).

Example 5

NBs Accumulate in PSMA-Expressing Tumors In Vivo

Next, the inventors aimed to determine whether the NBs bind specifically to PSMA-expressing PCa tumors in vivo, and whether differences between their affinities correlate with their in vivo accumulation in tumors. To this end, the inventors acquired whole-body near infra-red (NIR) optical images of nude mice inoculated with PC3-PIP and PC3-flu xenografts. The inventors captured the images 3 h and 6 h after injecting the labeled NB (early and middle time points, respectively), and again when the fluorescent signal could no longer be detected in vivo (late time point). In some mice, the signal was still detectable 56 h after the injection; we euthanized these mice due to ethical considerations and we denote the late time point in these cases as >56 h.

Figure 3D:
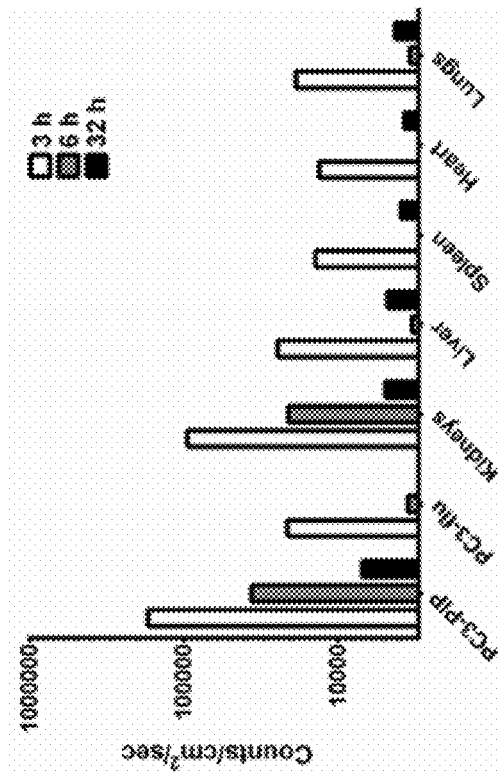
Figure 3E:
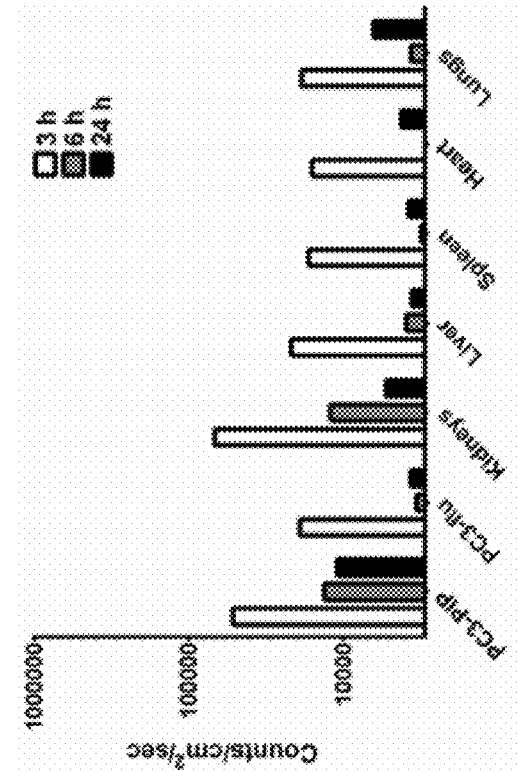
Figure 3F:
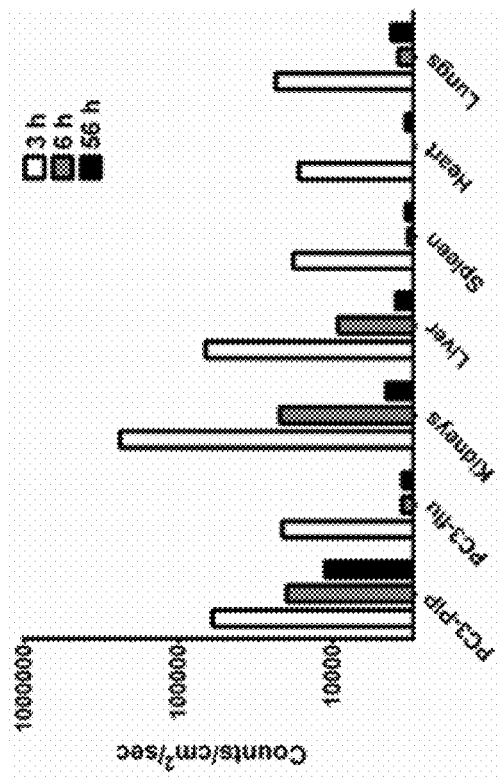
Figure 3G:
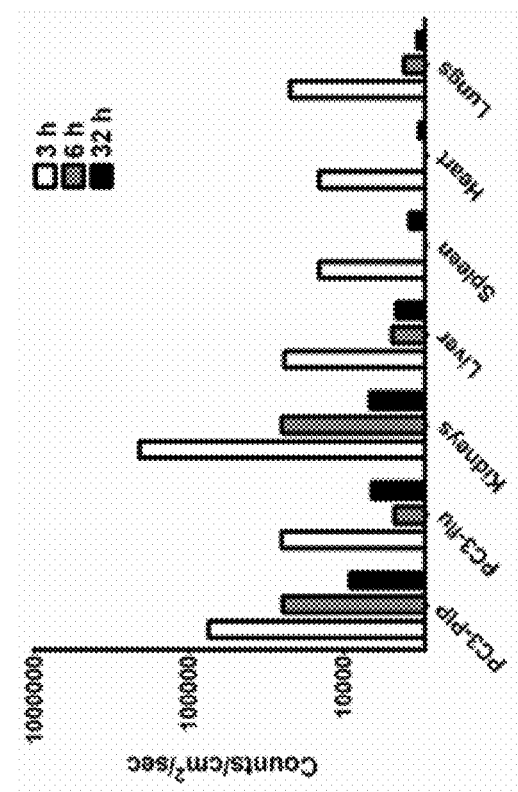

At the early imaging time point, the NBs were detected both in the kidneys and in the PC3-PIP tumors, but not in the PC3-flu tumors. At the middle imaging time point, however, they were completely cleared from the kidneys and remained only in the PC3-PIP tumors (FIG. 3). The duration until the fluorescent signal was no longer detected (late time point) depended on the affinity of the NB to PSMA, such that NBs with higher affinities (lower $K_D$) required longer durations for signal clearance (24 h for NB37, 32 h for NB8 and NB13, and >56 h for NB7). These low clearance rates suggest that all four NBs can potentially be used for in vivo applications, such as clinical imaging and tumor-specific drug delivery. In fact, even after the fluorescent signal was undetectable by whole-body imaging, it was still observed in tumors ex vivo (FIG. 14), where it increased in the PC3-PIP tumors, relative to the kidneys, over time (FIG. 3D). The signal in other organs and in the PC3-flu tumors was much weaker throughout the experiment. For example, for NB8 after 3 h, the signal intensity was 171,000 counts/cm$^2$/s in the PC3-PIP tumor and 94,700 counts/cm$^2$/s in the kidneys, as compared with 21,300 counts/cm$^2$/s in the PC3-flu tumor. This finding suggests that the NBs accumulated specifically in the PSMA$^+$ tumors and were then cleared predominantly by the kidneys, as could be expected given the small size of NBs [16 kDa, while the renal cutoff is ~60 kDa].

Example 6

NBs are Internalized into PSMA-Expressing Cells

Figure 15:
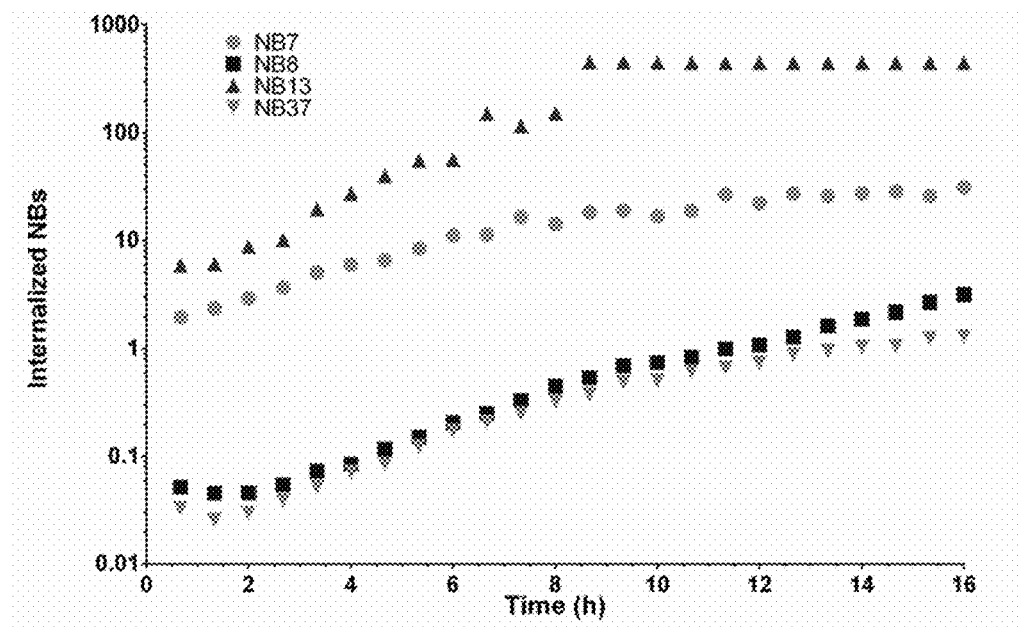
FIG. 15 includes a graph showing the internalization of the NBs into PC3-PIP cells. PC3-PIP cells were incubated in 96-wells plates for 1 h with either NB7, NB8, NB13, or NB37. Then, the wells were imaged using Operetta and the number of cells with NBs on their membranes or inside their cytoplasm was counted every 40 min, so that the first imaging round was completed 1 h and 40 min after incubation. The internalization process is reflected in the number of cells with NBs in their cytoplasm relative to the number of cells with NBs in their membrane ("cytoplasm/membrane ratio"), such that a higher ratio indicated more NBs that were internalized into the cytoplasm.

For the NBs to be able to deliver chemotherapeutic agents into PSMA$^+$ prostate tumor cells—a prerequisite for the efficacy of many existing drugs—they must be internalized specifically into PSMA$^+$ cells. To test the internalization capability of the four NBs, the inventors labeled them fluorescently and incubated them with either live PC3-PIP (PSMA$^+$) or live PC3-flu (PSMA$^-$) cells, together with a PE-anti-PSMA antibody and a Hoechst nuclear staining solution. Confocal imaging of the PC3-PIP cells revealed that the NBs colocalize with PSMA and appear both in the cell membranes and in clusters inside the cells (FIGS. 4A-4D). Notably, the anti-PSMA antibody was not found inside the cells in the absence of a NB (FIG. 4I), suggesting that the NB may prompt the internalization of PSMA while it is still bound to the anti-PSMA antibody. Imaging of the PC3-flu cells showed that neither the NBs nor the anti-PSMA antibodies bind to or internalize into the cells (FIGS. 4E-4H). A long-term internalization assay revealed that NBs with higher affinities to PSMA (namely, NB7 and NB13) were internalized into the PSMA-expressing cells much faster than those with lower affinities (FIG. 15). Based on the in vitro and in vivo affinities to PSMA and on the purification yields of each NB, the inventors chose to generate a NB-drug conjugate using NB7.

Example 7

Conjugation of NB7cys to DOX

Figure 17:
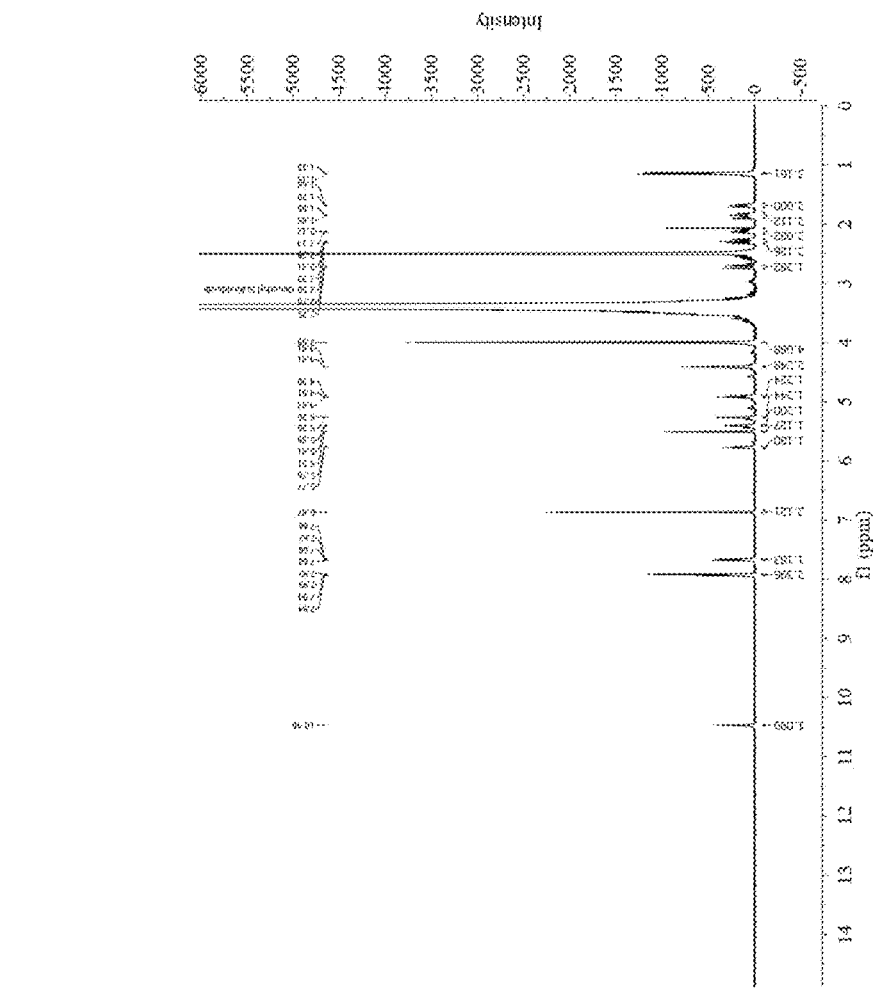
FIG. 17 includes a graph showing $^1$H-nuclear magnetic resonance (NMR) spectrum of DOX-BMPH linker.

The clustered pattern of the NBs and PSMA inside the target cells suggests that their internalization is mediated by intracellular vesicles, as was previously shown for other PSMA binders. As both intracellular vesicles are typically acidic, the inventors conjugated NB7 to DOX via the pH-sensitive linker N-(β-maleimidopropionic acid) hydrazide (BMPH) (FIGS. 16A, and 17), which is hydrolyzed at pH<6.0. The inventors hypothesized that the acidic conditions in the vesicles would hydrolyze the covalent bond between the linker and DOX, thus releasing DOX from the conjugate and enabling it to diffuse outside the vesicles and into the cytosol, where it could penetrate the nucleus and, presumably, inhibit DNA transcription.

Figure 16B:
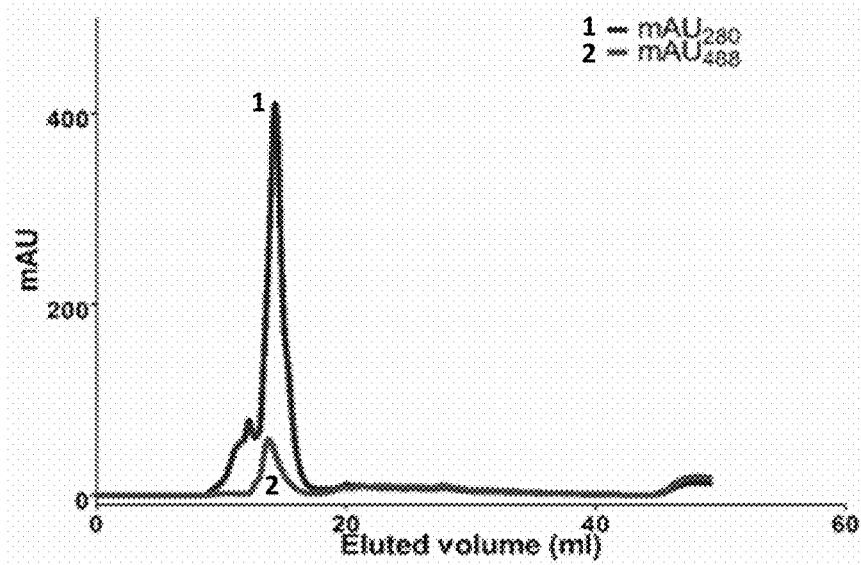
Figure 16C:
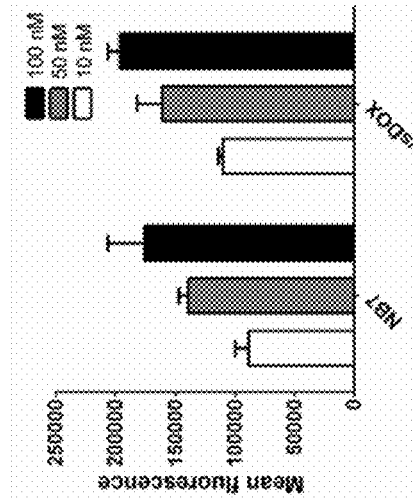
Figure 16D:
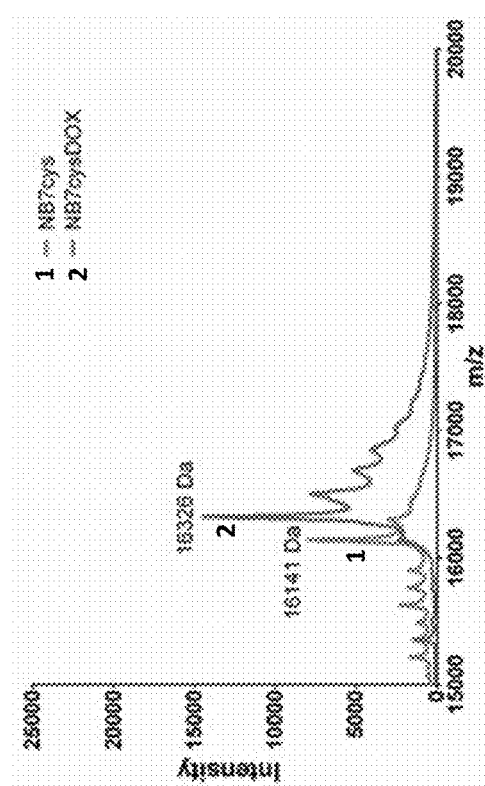

The conjugated protein, termed NB7cysDOX, was purified using size-exclusion chromatography (FIG. 16B). The addition of DOX to NB7 slightly increased its size (namely, by ~700 Da), but the hydrophobic nature of DOX reduced its elution rate, which allowed us to separate the conjugated from the non-conjugated proteins. The fluorescence of DOX (ex. 495 and em. 560) led to the absorbance of only the conjugated protein at 488 nm, which is sufficiently close to 495, and further distinguished between the conjugated and non-conjugated protein fractions. The NB7cysDOX fraction was further evaluated using mass spectrometry in acidic pH (pH=4), in which DOX is cleaved from the linker and, thereby, from the NB. This analysis revealed that the mass of the conjugated protein is higher by 185 Da than that of NB7cys alone (namely, 16,141 Da, as compared with 16,326 Da, respectively; FIG. 16C); this difference reflects the combined size of NB7cys and the BMPH linker, indicating that all NB molecules are conjugated to DOX and that DOX is released under acidic conditions. A FACS analysis of the binding of NB7cys and NB7cysDOX to the PSMA-expressing PC3-PIP cells (FIG. 16D) revealed that the conjugation of DOX does not compromise the binding of NB7cys to these cells.

Example 8

NB7cysDOX is Cytotoxic to PSMA-Expressing Cells

Figure 18A:
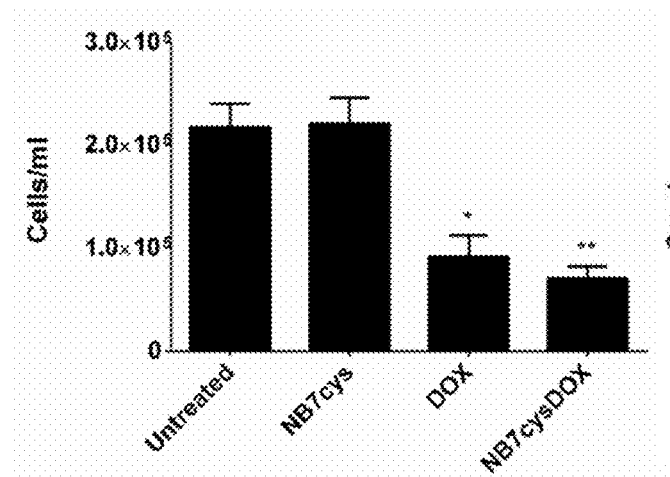
FIGS. 18A-18C include graphs showing the effect of NB7cysDOX on cell viability. (18A) The number of PC3-PIP cells was counted after a 24 h treatment with either NB7cys, DOX, or NB7cysDOX. The experiment was performed in triplicate and the results are presented as means±SEM. *$p<0.05$, **$p<0.01$ (Student's t-test, as compared with untreated cells). (18B) FACS analysis of PC3-PIP cells treated with either NB7 (1), DOX (2), or NB7cysDOX (3), or left untreated (4, partially masked by the "1" histogram), and then incubated with PI. (18C) PC3-PIP cells were treated with NB7, DOX, NB7cysDOX, or FCCP, or were left untreated, and then incubated with TMRE ("no TMRE") was used as a negative control, and the fluorescent signal of TMRE was measured by using a plate reader. The fluorescence of the untreated sample was set as 1, and all other samples were normalized and compared to it. The experiment was performed in triplicate and results are presented as means±SEM. *$p<0.05$, $p<0.01$, *$p<0.005$ (Student's t-test).
Figure 18B:
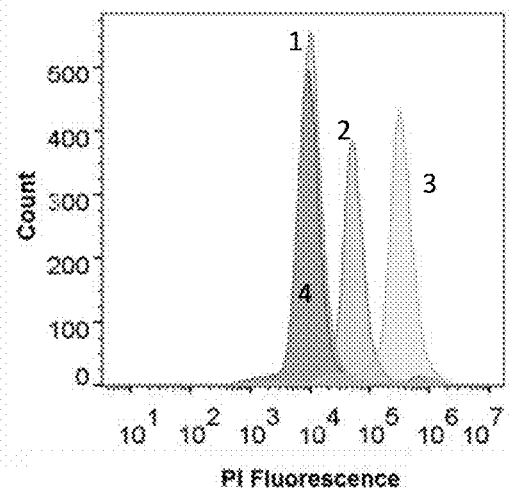
Figure 18C:
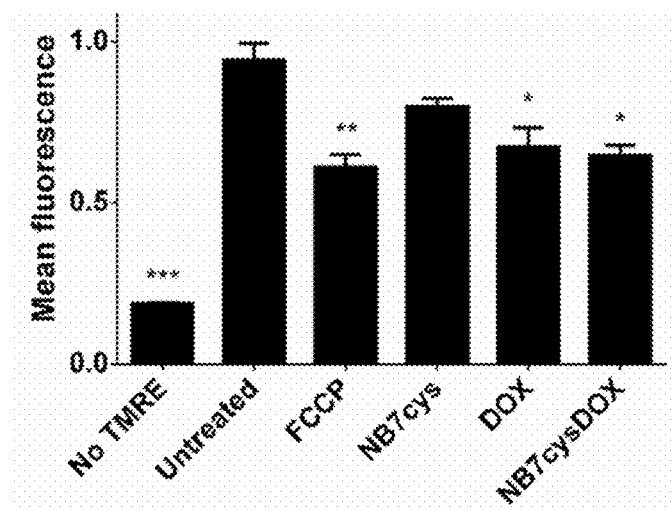

To evaluate the ability of the NB7cysDOX conjugate to internalize specifically to PSMA-expressing cells and the successive detachment of DOX from the conjugate, we incubated PC3-PIP and PC3-flu cells for 15 min with Hoechst 33342 (nuclear staining) and with either 1.5 μg/ml DOX (which is fluorescent) or a molar equivalent of Dylight650-labeled NB7cys or NB7cysDOX (FIG. 5). When incubated alone with the PCa cells, DOX—a small and hydrophobic molecule—diffused spontaneously into both PC3-PIP and PC3-flu cells, where it was found homogeneously scattered throughout the cytosol. Conversely, as expected from its PSMA-dependent internalization mechanism (see FIG. 4A), NB7cys accumulated only in PC3-PIP cells, where it was found mostly in the cell membrane and had begun internalizing into the cytosol. The distribution of NB7cysDOX was very similar to that of NB7cys—namely, in defined regions on the membranes and cytosols of PC3-PIPcells, but not of PC3-flu cells—but DOX was scattered in multiple regions within the cells, mostly separate from NB7cys (although small amounts of NB7cys were found within the DOX clusters). To test whether the DOX released from the internalized conjugate retains its cytotoxic activity, the inventors incubated PC3-PIP cells for 24 h with 1.5 μg/ml DOX or with an equivalent molar amount of NB7cysDOX or NB7cys, counted the number of cells in each well, and compared it to that of untreated cells (FIG. 18A). This assay revealed that the incubation with DOX or, to a greater extent, with NB7cysDOX significantly reduced the number of cells in the well. Next, in a different set of experiments, we incubated PC3-PIP cells for 24 h with either DOX, NB7cys, or NB7cysDOX (as described above), and then labeled the cells with propidium iodide (PI)—a fluorescent marker of late apoptosis and necrosis. A FACS analysis (FIG. 18B) revealed that, whereas treating the cells with NB7cys did not change the PI signal, treating them with either DOX or, to a greater extent, NB7cysDOX considerably increased the signal. Treating PC3-PIP cells with TMRE—a reagent that labels active mitochondria—revealed that DOX and NB7cysDOX similarly reduced the mitochondrial membrane potential (FIG. 18C). Treating the cells with FCCP, which interrupts the mitochondrial membrane potential and served as a positive control, also significantly reduced the mitochondrial membrane potential of the PC3-PIP cells. In contrast, NB7cys alone did not change the TMRE signal, as compared with untreated cells. Taken together, these results indicate that NB7cysDOX is at least as cytotoxic to PSMA+ cells as DOX alone.

Example 9

NB7cysDOX Inhibits Tumor Growth in Mice

To test the activity of NB7cysDOX in vivo, the inventors created PC3-PIP tumor xenografts in athymic nude mice and, once the tumors reached ~200 mm³, the inventors intravenously treated them—twice a week for three weeks—with either saline (control); 2 mg/kg (2.86 µmol/kg) commercial DOX, which was previously shown to be effective in mice and is similar to that used in humans; or 1.4 mg/kg (0.087 µmol/kg) NB7cysDOX, which represents a molar dose of DOX that is 42-fold lower than that used for DOX alone. The inventors measured the size of the tumor before each injection, but some mice had to be euthanized due to ethical considerations (namely, large tumor burden or physical deterioration) by 8 d following treatment initiation; in these mice, we estimated the tumor size in successive time points by extrapolation.

Figure 19A:
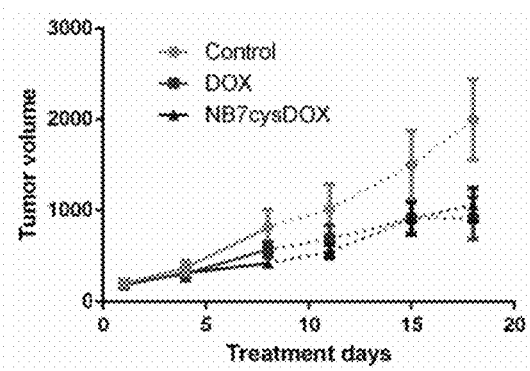
FIGS. 19A-19B include graphs showing in vivo tumor growth inhibition by NB7cysDOX. PC3-PIP xenografts in athymic nude mice were treated with either saline (control), DOX (2 mg/kg), or NB7cysDOX (1.4 mg/kg). (19A) Tumor volume was measured twice a week during the treatment duration. Some mice were euthanized during the trial period due to ethical considerations, and their tumor sizes were estimated by using an equation based on logarithmic tumor growth (see Materials and Methods section). The solid portions of the curves indicate time points in which all animals were included in the analysis, while the dashed portions indicate logarithmically extrapolated data. (19B) Percentage of mice that were included in the experiment at each time point. "1": control (n=7 mice), "2": DOX (n=8 mice), "3": NB7cysDOX (n=8 mice).
Figure 19B:
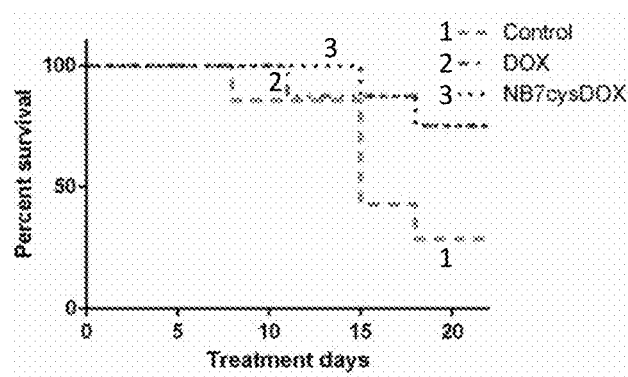

The last time point at which tumors from all live mice were included in the analysis was 8 d following treatment initiation; at that time point, the average tumor size was significantly smaller in mice treated with NB7cysDOX than in those treated with saline (FIG. 6A). An over-time analysis (FIG. 19A) and rate-based growth slopes for treatment/control (T/C; FIG. 6B) revealed that the tumor growth rate was, indeed, lower in mice treated with NB7cysDOX than in those treated with saline. Moreover, although the amount of DOX administered to NB7cysDOX-treated mice was significantly lower than that administered to DOX-treated mice (who received a 2 mg/kg dose of DOX), the tumor growth rate was similar in both groups, indicating the effectiveness of the NB7cysDOX conjugate relative to DOX administered alone. Notably, three mice were excluded from the DOX-treated group for the rate-based analysis. In line with these findings, more mice reached a maximal tumor size—i.e., the size in which mice were euthanized due to ethical considerations—in the saline-treated group than in either the DOX-treated or the NB7cysDOX-treated groups, which were not significantly different from each other (FIG. 19B).

Next, the inventors extracted tumors from the treated mice 4 d after the final dose of NB7cysDOX and labeled them with PE-anti-PSMA and FITC-anti-His. A histological analysis revealed that, while PSMA was localized mostly to the membranes of the tumor cells, NB7cysDOX appeared either colocalized with PSMA or in the cytoplasm (FIG. 6C), indicating that NB7cysDOX indeed reaches and remains within tumors for at least four days. Staining the tumors with H&E revealed that, while tumors obtained from mice treated with saline were crowded and strongly labeled by H&E, tumors from mice treated with DOX or with NB7cysDOX were necrotic, fewer, and with large vacancies between cells (FIG. 6D, top). A TUNEL assay revealed only a few apoptotic cells in tumors obtained from saline-treated mice, as compared with significant apoptosis in tumors obtained from DOX- or NB7cysDOX-treated mice (FIG. 6D, bottom). These findings demonstrate that, while the number of DOX molecules administered to NB7cysDOX-treated mice is less than 3% of that administered to the DOX-treated mice, the cytotoxic effect of the drug is similar in both groups.

TABLE 2

Crystallographic statistics for NB7

| | |
|---|---|
| Structure name | NB7[1] |
| PDB ID | 6XXN |
| Data Collection | |
| Beamline | ID30B |
| Wavelength (Å) | 0.97625 |
| Resolution range (Å) | 47.2-2.65 |
| Space group | $P2_1$ |
| a, b, c (Å) | 53.563, 171.716, 83.479 |
| α, β, γ (°) | 90, 91.81, 90 |
| R-merge | 0.1332 (1.073) |
| R-meas | 0.1512 (1.212) |
| R-pim | 0.067 (0.55) |
| CC1/2 | 0.993 (0.495) |
| Multiplicity | 4.5 (4.7) |
| Completeness (%) | 98.92 (99.42) |
| Mean I/sigma (I) | 8.49 (1.25) |
| Refinement | |
| Reflections used in refinement | 43211 (4306) |
| Reflections used for R-free | 2120 (234) |
| R-work/R-free | 0.18/0.23 |
| Number of non-hydrogen atoms | 7731 |
| Macromolecules | 7615 |
| Ligands | 105 |
| Solvent | 11 |
| Protein residues | 996 |
| RMSD bonds (Å) | 0.011 |
| RMSD angles (°) | 1.63 |
| Ramachandran favored (%) | 95.82 |
| Ramachandran allowed (%) | 2.96 |
| Ramachandran outliers (%) | 1.22 |
| Average B-factor | 54.34 |
| Macromolecules | 53.90 |
| Ligands | 87.43 |
| Solvent | 43.60 |

[1]Numbers in parentheses indicate the highest resolution shell

TABLE 3

Crystallographic statistics for NB8

| | |
|---|---|
| Structure name | NB8[1] |
| PDB ID | 6XXO |
| Data Collection | |
| Beamline | ID30A-3 |
| Wavelength (Å) | 0.9677 |
| Resolution range (Å) | 27.34-1.5 |
| Space group | I222 |
| a, b, c (Å) | 55.945, 68.857, 75.647 |
| α, β, γ (°) | 90, 90, 90 |
| R-merge | 0.0278 (0.105) |
| R-meas | 0.032 (0.12) |
| R-pim | 0.0153 (0.0581) |
| CC1/2 | 0.999 (0.988) |
| Multiplicity | 3.9 (3.9) |
| Completeness (%) | 97.94 (98.3) |
| Mean I/sigma (I) | 28.37 (9.85) |

TABLE 3-continued

Crystallographic statistics for NB8

| Refinement | |
| --- | --- |
| Reflections used in refinement | 23276 (2307) |
| Reflections used for R-free | 1107 (108) |
| R-work/R-free | 0.16/0.18 |
| Number of non-hydrogen atoms | 1227 |
| Macromolecules | 1060 |
| Solvent | 167 |
| Protein residues | 127 |
| RMSD bonds (Å) | 0.007 |
| RMSD angles (°) | 0.93 |
| Ramachandran favored (%) | 97.60 |
| Ramachandran allowed (%) | 1.60 |
| Ramachandran outliers (%) | 0.80 |
| Average B-factor | 17.21 |
| Macromolecules | 15.92 |
| Solvent | 25.38 |

[1]Numbers in parentheses indicate statistics for the highest resolution shell

TABLE 4

Crystallographic statistics table for NB37

| Structure name | NB37[1] |
| --- | --- |
| PDB ID | 6XXP |
| Data Collection | |
| Beamline | ID30A-3 |
| Wavelength (Å) | 0.9677 |
| Resolution range (Å) | 27.41-1.5 |
| Space group | I222 |
| a, b, c (Å) | 55.949, 69.087, 75.869 |
| α, β, γ (°) | 90, 90, 90 |
| R-merge | 0.0529 (0.497) |
| R-meas | 0.061 (0.574) |
| R-pim | 0.029 (0.282) |
| CC1/2 | 0.999 (0.764) |
| Multiplicity | 4.0 (4.0) |
| Completeness (%) | 98.84 (98.89) |
| Mean I/sigma (I) | 14.42 (2.35) |
| Refinement | |
| Reflections used in refinement | 23645 (2310) |
| Reflections used for R-free | 1149 (104) |
| R-work/R-free | 0.173/0.238 |
| Number of non-hydrogen atoms | 1159 |
| Macromolecules | 1035 |
| Solvent | 124 |
| Protein residues | 127 |
| RMSD bonds (Å) | 0.005 |
| RMSD angles (°) | 0.80 |
| Ramachandran favored (%) | 96.80 |
| Ramachandran allowed (%) | 2.4 |
| Ramachandran outliers (%) | 0.80 |
| Average B-factor | 21.25 |
| Macromolecules | 20.28 |
| Solvent | 29.36 |

[1]Numbers in parentheses indicate statistics for the highest resolution shell

TABLE 5

Parameters for the SAXS analysis of PSMA with and without NBs.

| Sample | Method | $R_g$, Å | $D_{max}$, Å |
| --- | --- | --- | --- |
| PSMA | Guinier[1] | 43.1 | |
| | GNOM[2] | 38.7 | 115 |
| | CRYSOL[3] | 43.4 | 125 |
| PSMA + NB7 | Guinier | 48.2 | — |
| | GNOM | 42.4 | 120 |
| PSMA + NB8 | Guinier | 40.5 | — |
| | GNOM | 39.4 | 100 |
| PSMA + NB13 | Guinier | 43.8 | — |
| | GNOM | 40.5 | 120 |
| PSMA + NB37 | Guinier | 40.4 | — |
| | GNOM | 38.6 | 110 |

[1]Determined by linear fitting to the Guinier region.
[2]Determined by using the GNOM software[2]. Results of the coarse search were refined to obtain a smooth P(r).
[3]Determined by using the CRYSOL software[3] for the PSMA monomer [PDB ID 3D7D[4]],

TABLE 6

PSMA-NB7 and PSMA-NB37 interface analysis

| | NB7 | NB37 |
| --- | --- | --- |
| Total Pi interaction | 1 | 1 |
| Total hydrogen bonds | 43 | 15 |
| Total salt bridges | 1 | 0 |
| Ligand contact surface area | 969.34 | 443.72 |
| Ligand polar contact surface area | 548.33 | 218.82 |
| Ligand nonpolar contact surface area | 421.02 | 224.91 |
| Receptor contact surface area | 989.17 | 447.68 |
| Receptor polar contact surface area | 598.62 | 219.73 |
| Receptor nonpolar contact surface area | 390.55 | 227.96 |

Figure 22D:
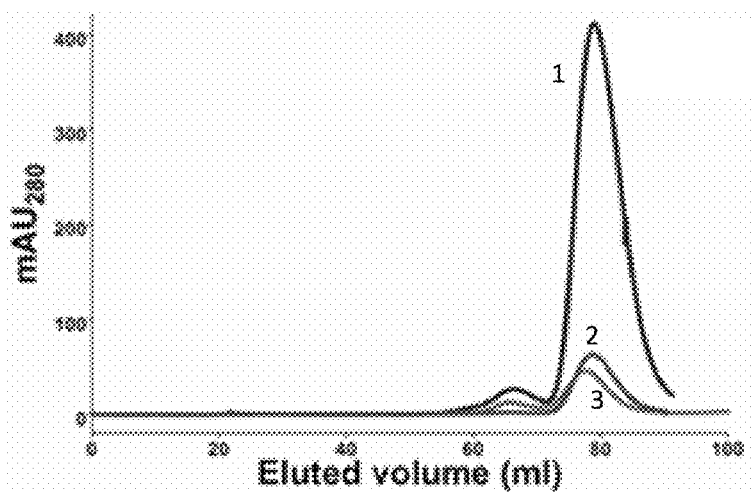
Figure 22E:
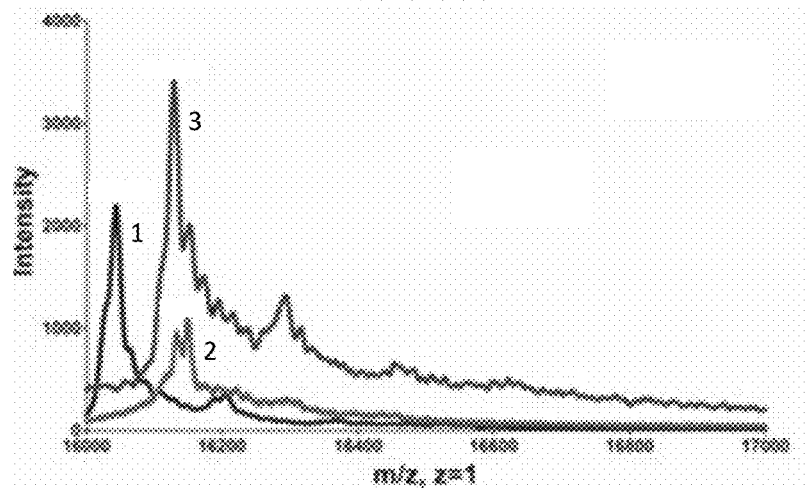
Figure 22F:
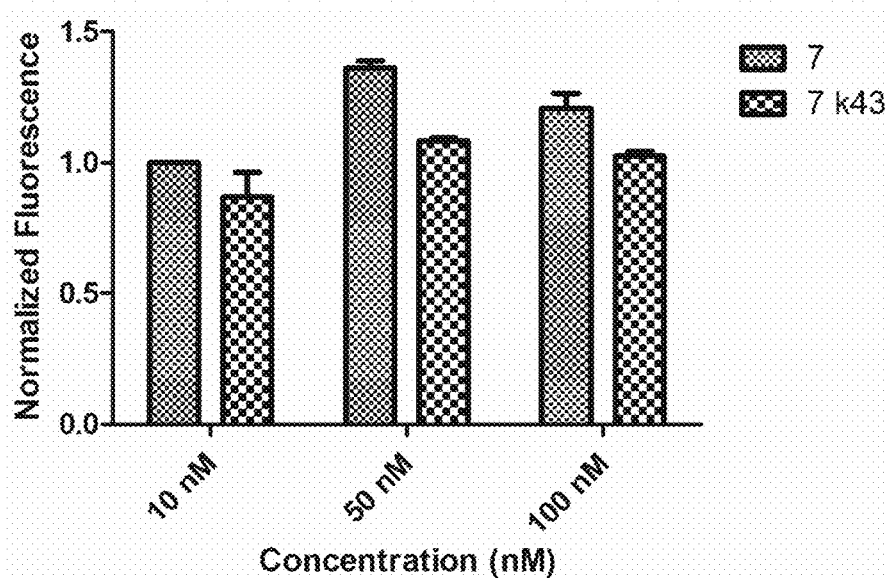

Further, the inventors showed that incorporation of a non-naturally occurring amino acid to the polypeptide of the invention is feasible (FIG. 22). Specifically, the inventors showed that substitution of K43 by K43PrK mutation did not significantly affect NB7 binding of PSMA (FIG. 22E).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An antigen-binding polypeptide comprising a single-chain variable domain (VHH), wherein the single-chain variable domain comprises three heavy chain complementary-determining regions (CDRs-H), wherein CDR-H1 comprises the amino acid sequence GYTDSNYYMS (SEQ ID NO: 1), CDR-H2 comprises the amino acid sequence GVNTGRGSTSYADSVKG (SEQ ID NO: 2), and CDR-H3 comprises the amino acid sequence AACHFCDSLPKTQDEYIL (SEQ ID NO: 3).

2. The antigen-binding polypeptide of claim 1, having a specific binding affinity to a prostate specific membrane antigen (PSMA).

3. The antigen-binding polypeptide of claim 1, comprising the amino acid sequence of (SEQ ID NO: 11)
QVQLQESGGGSVQAGGSLRLSCTAPGYTDSNYYMSWFRQAPGKEREWVA

GVNTGRGSTSYADSVKGRFTISQDNAKNTMFLQMNSLKPEDTAIYYCAV

AACHFCDSLPKTQDEYILWGQGTQVTVSSAAAYPYDVPDYGS.

4. The antigen-binding polypeptide of claim 1, wherein any one of: (i) said antigen-binding polypeptide has a molecular weight of less than 25 kDa; (ii), said antigen-binding polypeptide has a specific binding affinity to a non-catalytic site of PSMA enzyme; and (iii) said antigen-binding polypeptide further comprises at least one non-naturally occurring amino acid.

5. A pharmaceutical composition comprising a therapeutic or diagnostic effective amount of said antigen-binding polypeptide of claim 1, and a pharmaceutically acceptable carrier.

6. A method of targeting PSMA, the method comprising contacting a sample comprising said PSMA with said antigen-binding polypeptide of claim 1, thereby targeting PSMA.

* * * * *

SEQUENCE LISTING

<160> NUMBER OF SEQ ID NOS: 18

<210> SEQ ID NO 1
<211> LENGTH: 10
<212> TYPE: PRT
<213> ORGANISM: Artificial Sequence
<220> FEATURE:

```
<223> OTHER INFORMATION: Synthetic

<400> SEQUENCE: 1

Gly Tyr Thr Asp Ser Asn Tyr Tyr Met Ser
1               5                   10

<210> SEQ ID NO 2
<211> LENGTH: 17
<212> TYPE: PRT
<213> ORGANISM: Artificial Sequence
<220> FEATURE:
<223> OTHER INFORMATION: Synthetic

<400> SEQUENCE: 2

Gly Val Asn Thr Gly Arg Gly Ser Thr Ser Tyr Ala Asp Ser Val Lys
1               5                   10                  15

Gly

<210> SEQ ID NO 3
<211> LENGTH: 18
<212> TYPE: PRT
<213> ORGANISM: Artificial Sequence
<220> FEATURE:
<223> OTHER INFORMATION: Synthetic

<400> SEQUENCE: 3

Ala Ala Cys His Phe Cys Asp Ser Leu Pro Lys Thr Gln Asp Glu Tyr
1               5                   10                  15

Ile Leu

<210> SEQ ID NO 4
<211> LENGTH: 10
<212> TYPE: PRT
<213> ORGANISM: Artificial Sequence
<220> FEATURE:
<223> OTHER INFORMATION: Synthetic

<400> SEQUENCE: 4

Gly Trp Pro Tyr Ser Thr Tyr Ser Met Asn
1               5                   10

<210> SEQ ID NO 5
<211> LENGTH: 14
<212> TYPE: PRT
<213> ORGANISM: Artificial Sequence
<220> FEATURE:
<223> OTHER INFORMATION: Synthetic

<400> SEQUENCE: 5

Gly Ile Ser Ser Thr Met Ser Gly Ile Ile Phe Ala Glu Ser
1               5                   10

<210> SEQ ID NO 6
<211> LENGTH: 15
<212> TYPE: PRT
<213> ORGANISM: Artificial Sequence
<220> FEATURE:
<223> OTHER INFORMATION: Synthetic

<400> SEQUENCE: 6

Arg Arg Asp Tyr Ser Leu Ser Ser Ser Asp Asp Phe Asp Tyr
1               5                   10                  15

<210> SEQ ID NO 7
<211> LENGTH: 7
```

```
<212> TYPE: PRT
<213> ORGANISM: Artificial Sequence
<220> FEATURE:
<223> OTHER INFORMATION: Synthetic

<400> SEQUENCE: 7

Gly Tyr Thr Ala Ser Phe Ser
1               5

<210> SEQ ID NO 8
<211> LENGTH: 18
<212> TYPE: PRT
<213> ORGANISM: Artificial Sequence
<220> FEATURE:
<223> OTHER INFORMATION: Synthetic

<400> SEQUENCE: 8

Gly Val Ala Val Ile Asn Val Gly Val Gly Ser Thr Tyr Tyr Ala Asp
1               5                   10                  15

Ser Val

<210> SEQ ID NO 9
<211> LENGTH: 18
<212> TYPE: PRT
<213> ORGANISM: Artificial Sequence
<220> FEATURE:
<223> OTHER INFORMATION: Synthetic

<400> SEQUENCE: 9

Ser Leu Arg Trp Ser Arg Pro Pro Asn Pro Ile Ser Glu Asp Ala Tyr
1               5                   10                  15

Asn Tyr

<210> SEQ ID NO 10
<211> LENGTH: 26
<212> TYPE: PRT
<213> ORGANISM: Artificial Sequence
<220> FEATURE:
<223> OTHER INFORMATION: Synthetic

<400> SEQUENCE: 10

Gly Ile Ser Ser Thr Met Ser Gly Ile Ile Phe Ala Glu Ser Lys Ala
1               5                   10                  15

Gly Gln Phe Thr Ile Ser Gln Asp Asn Ala
                20                  25

<210> SEQ ID NO 11
<211> LENGTH: 140
<212> TYPE: PRT
<213> ORGANISM: Artificial Sequence
<220> FEATURE:
<223> OTHER INFORMATION: Synthetic

<400> SEQUENCE: 11

Gln Val Gln Leu Gln Glu Ser Gly Gly Gly Ser Val Gln Ala Gly Gly
1               5                   10                  15

Ser Leu Arg Leu Ser Cys Thr Ala Pro Gly Tyr Thr Asp Ser Asn Tyr
                20                  25                  30

Tyr Met Ser Trp Phe Arg Gln Ala Pro Gly Lys Glu Arg Glu Trp Val
                35                  40                  45

Ala Gly Val Asn Thr Gly Arg Gly Ser Thr Ser Tyr Ala Asp Ser Val
                50                  55                  60

Lys Gly Arg Phe Thr Ile Ser Gln Asp Asn Ala Lys Asn Thr Met Phe
```

```
                 65                  70                  75                  80
Leu Gln Met Asn Ser Leu Lys Pro Glu Asp Thr Ala Ile Tyr Tyr Cys
                85                  90                  95

Ala Val Ala Ala Cys His Phe Cys Asp Ser Leu Pro Lys Thr Gln Asp
            100                 105                 110

Glu Tyr Ile Leu Trp Gly Gln Gly Thr Gln Val Thr Val Ser Ser Ala
        115                 120                 125

Ala Ala Tyr Pro Tyr Asp Val Pro Asp Tyr Gly Ser
    130                 135                 140

<210> SEQ ID NO 12
<211> LENGTH: 137
<212> TYPE: PRT
<213> ORGANISM: Artificial Sequence
<220> FEATURE:
<223> OTHER INFORMATION: Synthetic

<400> SEQUENCE: 12

Gln Val Gln Leu Gln Glu Ser Gly Gly Gly Ser Val Gln Ala Gly Gly
1               5                   10                  15

Ser Leu Arg Leu Ser Cys Ala Arg Ser Gly Trp Pro Tyr Ser Thr Tyr
            20                  25                  30

Ser Met Asn Trp Phe Arg Gln Ala Pro Gly Lys Glu Arg Glu Ala Val
        35                  40                  45

Ala Gly Ile Ser Ser Thr Met Ser Gly Ile Ile Phe Ala Glu Ser Lys
    50                  55                  60

Ala Gly Gln Phe Thr Ile Ser Gln Asp Asn Ala Lys Asn Thr Val Tyr
65                  70                  75                  80

Leu Gln Met Asn Asn Leu Lys Pro Glu Asp Thr Ala Ile Tyr Tyr Cys
                85                  90                  95

Ala Ala Arg Arg Asp Tyr Ser Leu Ser Ser Ser Asp Asp Phe Asp
            100                 105                 110

Tyr Trp Gly Gln Gly Thr Gln Val Thr Val Ser Ser Ala Ala Ala Tyr
        115                 120                 125

Pro Tyr Asp Val Pro Asp Tyr Gly Ser
    130                 135

<210> SEQ ID NO 13
<211> LENGTH: 140
<212> TYPE: PRT
<213> ORGANISM: Artificial Sequence
<220> FEATURE:
<223> OTHER INFORMATION: Synthetic

<400> SEQUENCE: 13

Gln Val Gln Leu Gln Glu Ser Gly Gly Gly Ser Val Gln Thr Gly Gly
1               5                   10                  15

Ser Leu Arg Leu Ser Cys Ala Ala Ser Gly Tyr Thr Ala Ser Phe Ser
            20                  25                  30

Trp Ile Gly Tyr Phe Arg Gln Ala Pro Gly Lys Glu Arg Glu Gly Val
        35                  40                  45

Ala Val Ile Asn Val Gly Val Gly Ser Thr Tyr Tyr Ala Asp Ser Val
    50                  55                  60

Lys Gly Arg Phe Thr Ile Ser Arg Asp Asn Thr Glu Asn Thr Ile Ser
65                  70                  75                  80

Leu Glu Met Asn Ser Leu Lys Pro Glu Asp Thr Gly Leu Tyr Tyr Cys
                85                  90                  95
```

Ala Gly Ser Leu Arg Trp Ser Arg Pro Pro Asn Pro Ile Ser Glu Asp
            100                 105                 110

Ala Tyr Asn Tyr Trp Gly Gln Gly Thr Gln Val Thr Val Ser Ser Ala
        115                 120                 125

Ala Ala Tyr Pro Tyr Asp Val Pro Asp Tyr Gly Ser
    130                 135                 140

<210> SEQ ID NO 14
<211> LENGTH: 137
<212> TYPE: PRT
<213> ORGANISM: Artificial Sequence
<220> FEATURE:
<223> OTHER INFORMATION: Synthetic

<400> SEQUENCE: 14

Gln Val Gln Leu Gln Glu Ser Gly Gly Ser Val Glu Ala Gly Gly
1               5                   10                  15

Ser Leu Arg Leu Ser Cys Ala Arg Ser Gly Trp Pro Tyr Ser Thr Tyr
            20                  25                  30

Ser Met Asn Trp Phe Arg Gln Ala Pro Gly Lys Glu Arg Glu Ala Val
        35                  40                  45

Ala Gly Ile Ser Ser Thr Met Ser Gly Ile Ile Phe Ala Glu Ser Lys
50                  55                  60

Ala Gly Gln Phe Thr Ile Ser Gln Asp Asn Ala Lys Asn Thr Val Tyr
65                  70                  75                  80

Leu Gln Met Asn Asn Leu Lys Pro Glu Asp Thr Ala Ile Tyr Tyr Cys
            85                  90                  95

Ala Ala Arg Arg Asp Tyr Ser Leu Ser Ser Ser Ser Asp Phe Asp
            100                 105                 110

Tyr Trp Gly Gln Gly Thr Gln Val Thr Val Ser Ser Ala Ala Ala Tyr
        115                 120                 125

Pro Tyr Asp Val Pro Asp Tyr Gly Ser
    130                 135

<210> SEQ ID NO 15
<211> LENGTH: 140
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (14)..(14)
<223> OTHER INFORMATION: X is Ala or a non-naturally occurring amino
      acid
<220> FEATURE:
<221> NAME/KEY: MISC_FEATURE
<222> LOCATION: (40)..(40)
<223> OTHER INFORMATION: X is Ala or a non-naturally occurring amino
      acid
<220> FEATURE:
<221> NAME/KEY: MISC_FEATURE
<222> LOCATION: (42)..(42)
<223> OTHER INFORMATION: X is Gly or a non-naturally occurring amino
      acid
<220> FEATURE:
<221> NAME/KEY: MISC_FEATURE
<222> LOCATION: (43)..(43)
<223> OTHER INFORMATION: X is Lys or a non-naturally occurring amino
      acid
<220> FEATURE:
<221> NAME/KEY: MISC_FEATURE
<222> LOCATION: (75)..(75)
<223> OTHER INFORMATION: X is Ala or a non-naturally occurring amino
      acid

<400> SEQUENCE: 15

```
Gln Val Gln Leu Gln Glu Ser Gly Gly Gly Ser Val Gln Xaa Gly Gly
1               5                   10                  15

Ser Leu Arg Leu Ser Cys Thr Ala Pro Gly Tyr Thr Asp Ser Asn Tyr
            20                  25                  30

Tyr Met Ser Trp Phe Arg Gln Xaa Pro Xaa Xaa Glu Arg Glu Trp Val
        35                  40                  45

Ala Gly Val Asn Thr Gly Arg Gly Ser Thr Ser Tyr Ala Asp Ser Val
    50                  55                  60

Lys Gly Arg Phe Thr Ile Ser Gln Asp Asn Xaa Lys Asn Thr Met Phe
65                  70                  75                  80

Leu Gln Met Asn Ser Leu Lys Pro Glu Asp Thr Ala Ile Tyr Tyr Cys
                85                  90                  95

Ala Val Ala Ala Cys His Phe Cys Asp Ser Leu Pro Lys Thr Gln Asp
            100                 105                 110

Glu Tyr Ile Leu Trp Gly Gln Gly Thr Gln Val Thr Val Ser Ser Ala
        115                 120                 125

Ala Ala Tyr Pro Tyr Asp Val Pro Asp Tyr Gly Ser
    130                 135                 140
```

<210> SEQ ID NO 16
<211> LENGTH: 137
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (14)..(14)
<223> OTHER INFORMATION: X is Ala or non-naturally occurring amino acid
<220> FEATURE:
<221> NAME/KEY: MISC_FEATURE
<222> LOCATION: (40)..(40)
<223> OTHER INFORMATION: X is Ala or non-naturally occurring amino acid
<220> FEATURE:
<221> NAME/KEY: MISC_FEATURE
<222> LOCATION: (42)..(42)
<223> OTHER INFORMATION: X is Gly or non-naturally occurring amino acid
<220> FEATURE:
<221> NAME/KEY: MISC_FEATURE
<222> LOCATION: (43)..(43)
<223> OTHER INFORMATION: X is Lys or non-naturally occurring amino acid
<220> FEATURE:
<221> NAME/KEY: MISC_FEATURE
<222> LOCATION: (75)..(75)
<223> OTHER INFORMATION: X is Ala or non-naturally occurring amino acid

<400> SEQUENCE: 16

```
Gln Val Gln Leu Gln Glu Ser Gly Gly Gly Ser Val Gln Xaa Gly Gly
1               5                   10                  15

Ser Leu Arg Leu Ser Cys Ala Arg Ser Gly Trp Pro Tyr Ser Thr Tyr
            20                  25                  30

Ser Met Asn Trp Phe Arg Gln Xaa Pro Xaa Xaa Glu Arg Glu Ala Val
        35                  40                  45

Ala Gly Ile Ser Ser Thr Met Ser Gly Ile Ile Phe Ala Glu Ser Lys
    50                  55                  60

Ala Gly Gln Phe Thr Ile Ser Gln Asp Asn Xaa Lys Asn Thr Val Tyr
65                  70                  75                  80

Leu Gln Met Asn Asn Leu Lys Pro Glu Asp Thr Ala Ile Tyr Tyr Cys
                85                  90                  95

Ala Ala Arg Arg Asp Tyr Ser Leu Ser Ser Ser Ser Asp Asp Phe Asp
            100                 105                 110
```

Tyr Trp Gly Gln Gly Thr Gln Val Thr Val Ser Ser Ala Ala Ala Tyr
            115                 120                 125

Pro Tyr Asp Val Pro Asp Tyr Gly Ser
    130                 135

<210> SEQ ID NO 17
<211> LENGTH: 140
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (40)..(40)
<223> OTHER INFORMATION: X is Ala or non-naturally occurring amino acid
<220> FEATURE:
<221> NAME/KEY: MISC_FEATURE
<222> LOCATION: (42)..(42)
<223> OTHER INFORMATION: X is Gly or non-naturally occurring amino acid
<220> FEATURE:
<221> NAME/KEY: MISC_FEATURE
<222> LOCATION: (43)..(43)
<223> OTHER INFORMATION: X is Lys or non-naturally occurring amino acid

<400> SEQUENCE: 17

Gln Val Gln Leu Gln Glu Ser Gly Gly Gly Ser Val Gln Thr Gly Gly
1               5                   10                  15

Ser Leu Arg Leu Ser Cys Ala Ala Ser Gly Tyr Thr Ala Ser Phe Ser
            20                  25                  30

Trp Ile Gly Tyr Phe Arg Gln Xaa Pro Xaa Xaa Glu Arg Glu Gly Val
            35                  40                  45

Ala Val Ile Asn Val Gly Val Gly Ser Thr Tyr Tyr Ala Asp Ser Val
        50                  55                  60

Lys Gly Arg Phe Thr Ile Ser Arg Asp Asn Thr Glu Asn Thr Ile Ser
65                  70                  75                  80

Leu Glu Met Asn Ser Leu Lys Pro Glu Asp Thr Gly Leu Tyr Tyr Cys
                85                  90                  95

Ala Gly Ser Leu Arg Trp Ser Arg Pro Pro Asn Pro Ile Ser Glu Asp
            100                 105                 110

Ala Tyr Asn Tyr Trp Gly Gln Gly Thr Gln Val Thr Val Ser Ser Ala
            115                 120                 125

Ala Ala Tyr Pro Tyr Asp Val Pro Asp Tyr Gly Ser
        130                 135                 140

<210> SEQ ID NO 18
<211> LENGTH: 137
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (14)..(14)
<223> OTHER INFORMATION: X is Ala or non-naturally occurring amino acid
<220> FEATURE:
<221> NAME/KEY: MISC_FEATURE
<222> LOCATION: (40)..(40)
<223> OTHER INFORMATION: X is Ala or non-naturally occurring amino acid
<220> FEATURE:
<221> NAME/KEY: MISC_FEATURE
<222> LOCATION: (42)..(42)
<223> OTHER INFORMATION: X is Gly or non-naturally occurring amino acid
<220> FEATURE:
<221> NAME/KEY: MISC_FEATURE
<222> LOCATION: (43)..(43)
<223> OTHER INFORMATION: X is Lys or non-naturally occurring amino acid

```
<220> FEATURE:
<221> NAME/KEY: MISC_FEATURE
<222> LOCATION: (75)..(75)
<223> OTHER INFORMATION: X is Ala or non-naturally occurring amino acid

<400> SEQUENCE: 18

Gln Val Gln Leu Gln Glu Ser Gly Gly Gly Ser Val Glu Xaa Gly Gly
1               5                   10                  15

Ser Leu Arg Leu Ser Cys Ala Arg Ser Gly Trp Pro Tyr Ser Thr Tyr
            20                  25                  30

Ser Met Asn Trp Phe Arg Gln Xaa Pro Xaa Xaa Glu Arg Glu Ala Val
        35                  40              45

Ala Gly Ile Ser Ser Thr Met Ser Gly Ile Ile Phe Ala Glu Ser Lys
    50                  55                  60

Ala Gly Gln Phe Thr Ile Ser Gln Asp Asn Xaa Lys Asn Thr Val Tyr
65                  70                  75                  80

Leu Gln Met Asn Asn Leu Lys Pro Glu Asp Thr Ala Ile Tyr Tyr Cys
                85                  90                  95

Ala Ala Arg Arg Asp Tyr Ser Leu Ser Ser Ser Ser Asp Asp Phe Asp
            100                 105                 110

Tyr Trp Gly Gln Gly Thr Gln Val Thr Val Ser Ser Ala Ala Ala Tyr
        115                 120                 125

Pro Tyr Asp Val Pro Asp Tyr Gly Ser
        130                 135
```